(12) United States Patent
Shinohara et al.

(10) Patent No.: US 8,792,050 B2
(45) Date of Patent: Jul. 29, 2014

(54) CAMERA BODY, IMAGING UNIT MOUNTED/REMOVED ON/FROM THE CAMERA BODY AND IMAGING APPARATUS

(75) Inventors: Junichi Shinohara, Yokohama (JP); Atsushi Sato, Yokohama (JP); Takashi Tada, Kawasaki (JP); Ryota Kaga, Tokyo (JP); Shu Kambe, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 455 days.

(21) Appl. No.: 13/202,241

(22) PCT Filed: Feb. 18, 2010

(86) PCT No.: PCT/JP2010/052907
§ 371 (c)(1),
(2), (4) Date: Aug. 18, 2011

(87) PCT Pub. No.: WO2010/095759
PCT Pub. Date: Aug. 26, 2010

(65) Prior Publication Data
US 2011/0298970 A1 Dec. 8, 2011

(30) Foreign Application Priority Data

Feb. 19, 2009 (JP) ................................. 2009-036053
Mar. 9, 2009 (JP) ................................. 2009-054704
Mar. 13, 2009 (JP) ................................. 2009-060674
Mar. 18, 2009 (JP) ................................. 2009-065371

(51) Int. Cl.
*H04N 5/225* (2006.01)
(52) U.S. Cl.
USPC ....................................................... 348/373

(58) Field of Classification Search
USPC .................................................. 348/373–375
See application file for complete search history.

(56) References Cited

U.S. PATENT DOCUMENTS

| 4,945,368 A | 7/1990 | Ishino et al. |
| 5,070,356 A | 12/1991 | Nakamura et al. |
| 5,150,143 A | 9/1992 | Ohno et al. |
| 5,192,860 A | 3/1993 | Shinohara et al. |
| 5,192,964 A | 3/1993 | Shinohara et al. |
| 5,270,755 A | 12/1993 | Ohno et al. |
| 5,293,034 A | 3/1994 | Ohno et al. |
| 5,309,190 A | 5/1994 | Shinohara et al. |

(Continued)

FOREIGN PATENT DOCUMENTS

| JP | 11-88818 A | 3/1999 |
| JP | 2000-106640 A | 4/2000 |

(Continued)

*Primary Examiner* — Gevell Selby
(74) *Attorney, Agent, or Firm* — Dickstein Shapiro LLP

(57) ABSTRACT

An imaging apparatus comprising an imaging unit in which an optical system and an imaging device are provided, a camera body formed with a concave portion on/from which the imaging unit is mounted/removed, the imaging apparatus photographing the subject image by mounting the imaging unit on the camera body, wherein the concave portion includes three walls of a back wall portion, a side wall portion, and an upper wall portion, viewed from the subject side in a direction of an optical axis of the optical system, wherein the apparatus includes a locking member and a locking member to be locked, wherein an unlocking member for unlocking a lock of the camera body and the imaging unit by means of the locking member is disposed in an intersection portion of the side and upper wall portions, and wherein at least three wall portions which compose the concave portion, are opened.

15 Claims, 43 Drawing Sheets

(56) References Cited

U.S. PATENT DOCUMENTS

| | | |
|---|---|---|
| 5,682,563 A | 10/1997 | Shinohara et al. |
| 5,917,545 A * | 6/1999 | Kowno et al. ............... 348/231.9 |
| 5,995,760 A * | 11/1999 | Inoue et al. .................... 396/531 |
| 6,707,490 B1 | 3/2004 | Kido et al. |
| 6,885,819 B2 | 4/2005 | Shinohara |
| 7,042,495 B2 * | 5/2006 | Nakamura .................. 348/207.1 |
| 7,106,959 B2 | 9/2006 | Sato |
| 7,259,923 B2 | 8/2007 | Nuno et al. |
| 7,280,147 B2 | 10/2007 | Kitajima et al. |
| 7,286,164 B2 | 10/2007 | Shinohara et al. |
| 7,301,579 B2 | 11/2007 | Shinohara et al. |
| 7,365,790 B2 | 4/2008 | Shinohara |
| 7,372,486 B2 | 5/2008 | Shinohara et al. |
| 7,477,454 B2 | 1/2009 | Shinohara et al. |
| 7,483,056 B2 | 1/2009 | Shinohara et al. |
| 7,505,216 B2 | 3/2009 | Nuno |
| 7,643,750 B2 | 1/2010 | Irisawa et al. |
| 2002/0089678 A1* | 7/2002 | Aoto et al. ...................... 358/1.6 |
| 2002/0176020 A1 | 11/2002 | Kawaguchi et al. |
| 2004/0062545 A1 | 4/2004 | Ushiro |
| 2005/0012846 A1 | 1/2005 | Shinohara |
| 2005/0200737 A1 | 9/2005 | Shinohara et al. |
| 2007/0058972 A1* | 3/2007 | Misawa ......................... 396/541 |
| 2007/0086772 A1 | 4/2007 | Shinohara |
| 2007/0166027 A1* | 7/2007 | Misawa ......................... 396/529 |
| 2007/0268371 A1* | 11/2007 | Misawa et al. ............ 348/207.99 |
| 2008/0024654 A1 | 1/2008 | Shinohara |
| 2008/0036901 A1 | 2/2008 | Shinohara et al. |
| 2008/0043287 A1 | 2/2008 | Shinohara et al. |
| 2008/0218622 A1 | 9/2008 | Shinohara |

FOREIGN PATENT DOCUMENTS

| | | |
|---|---|---|
| JP | 2000-187268 A | 7/2000 |
| JP | 2000-358176 A | 12/2000 |
| JP | 2001-109044 A | 4/2001 |
| JP | 2002-341423 A | 11/2002 |
| JP | 2003-32531 A | 1/2003 |
| JP | 2003-156790 A | 5/2003 |
| JP | 2004-7121 A | 1/2004 |
| JP | 2004-133043 A | 4/2004 |
| JP | 2004-193771 A | 7/2004 |
| JP | 3579403 B2 | 10/2004 |
| JP | 2004-364177 A | 12/2004 |
| JP | 2005-341119 A | 12/2005 |
| JP | 2005-354177 A | 12/2005 |
| JP | 2006-119546 A | 5/2006 |
| JP | 2006-147868 A | 6/2006 |
| JP | 2006-317710 A | 11/2006 |
| JP | 2007-173909 A | 7/2007 |
| JP | 2007-174040 A | 7/2007 |
| JP | 2011-78073 A | 4/2011 |
| WO | WO 2010/061960 A1 | 6/2010 |

* cited by examiner ized with this back wall portion. Accordingly, this housing part is opened in a front wall portion and the other sidewall portion, and a fitted portion of the imaging unit can be inserted from this open sidewall portion into the housing part.

CAMERA BODY, IMAGING UNIT MOUNTED/REMOVED ON/FROM THE CAMERA BODY AND IMAGING APPARATUS

TECHNICAL FIELD

The present invention relates to an imaging apparatus composed of a combination of an imaging unit and a camera body on/from which the imaging unit is mounted/removed, a camera body for the imaging apparatus, and an improvement of the imaging unit mounted/removed on/from the camera body.

BACKGROUND ART

An imaging apparatus in which an imaging unit is mounted/removed on/from a camera body has heretofore been known (for reference, see Japanese Patent Application Publication No. 2007-173909).

In this conventional imaging apparatus, a camera body includes a concave portion or a housing part for attachably and detachably housing the imaging unit. This housing part includes a back wall portion as well as an upper wall portion, a lower wall portion, and one sidewall portion which are integrated with this back wall portion. Accordingly, this housing part is opened in a front wall portion and the other sidewall portion, and a fitted portion of the imaging unit can be inserted from this open sidewall portion into the housing part.

On the contrary, the imaging unit can be detached from the camera body by pulling the imaging unit out of the housing part through the open sidewall portion.

DISCLOSURE OF THE INVENTION

However, according to this conventional imaging system, the housing part is surrounded on four sides by the wall portions, namely, by the back wall portion, the upper wall portion, the lower wall portion, and one of the sidewall portions, and the camera body and the imaging unit are inevitably put into a one-to-one relationship. Therefore, this imaging system has limited design freedom for the shape of the imaging unit.

Further, it is desirable that the miss operation or malfunctioning of the imaging unit to the camera body is prevented and an attachable and detachable operation is easily performed.

The present invention is made in view of the foregoing. An object of the present invention is to provide a camera body in which an erroneous operation of an imaging unit to the camera body is prevented and an attachable and detachable operation can be easily performed, the imaging unit which is attachably and detachably mounted/removed on/from the camera unit, and an imaging apparatus in which the camera body can be easily combined with various imaging units by making a relationship between the camera body and the imaging units more flexible.

In order to achieve the object, according to one aspect of the present invention, a camera body formed with a concave portion on/from which an imaging unit is attachably and detachably mounted/removed, the imaging unit being provided in a rectangular case with an optical system, an imaging device and a unit side connector portion, and a body side connector portion which is connectable to the unit side connector portion, the camera body being integrated with the imaging unit and used as an imaging apparatus for photographing the subject, wherein the concave portion includes three wall portions of a back wall portion which a back face of the case faces, a side wall portion which a left side face of the case faces, and an upper wall portion which an upper face of the case faces, when the imaging unit is mounted on the concave portion when viewed from the subject side in a direction of an optical axis of the optical system, wherein the camera body includes a locking member for locking the imaging unit in cooperation with a locking member to be locked formed in the imaging unit, wherein an unlocking operation member for unlocking a lock of the camera body and the imaging unit by means of the locking member is disposed in an intersection portion of the side wall portion and the upper wall portion, and wherein at least three wall portions which composes the concave portion are opened, is provided.

According to another aspect of the present invention, an imaging apparatus comprising an imaging unit in which an optical system and an imaging device are provided, a camera body formed with a concave portion on/from which the imaging unit is attachably and detachably mounted/removed, the imaging apparatus photographing the subject image by mounting the imaging unit on the camera body, wherein the concave portion includes three walls of a back wall portion which a back face of the case faces, a side wall portion which a left side face of the case faces, and an upper wall portion which an upper face of the case faces, when the imaging unit is mounted on the concave portion viewed from the subject side in a direction of an optical axis of the optical system, wherein the apparatus includes a locking member for locking the imaging unit in cooperation with a locking member to be locked formed in the imaging unit, wherein an unlocking member for unlocking a lock of the camera body and the imaging unit by means of the locking member is disposed in an intersection portion of the side wall portion and the upper wall portion, and wherein at least three wall portions which compose the concave portion, are opened, is provided.

PREFERRED EXAMPLE OF THE INVENTION

First Example

Brief Description of Camera Body 1 and Imaging Unit 2

Figure 1A:
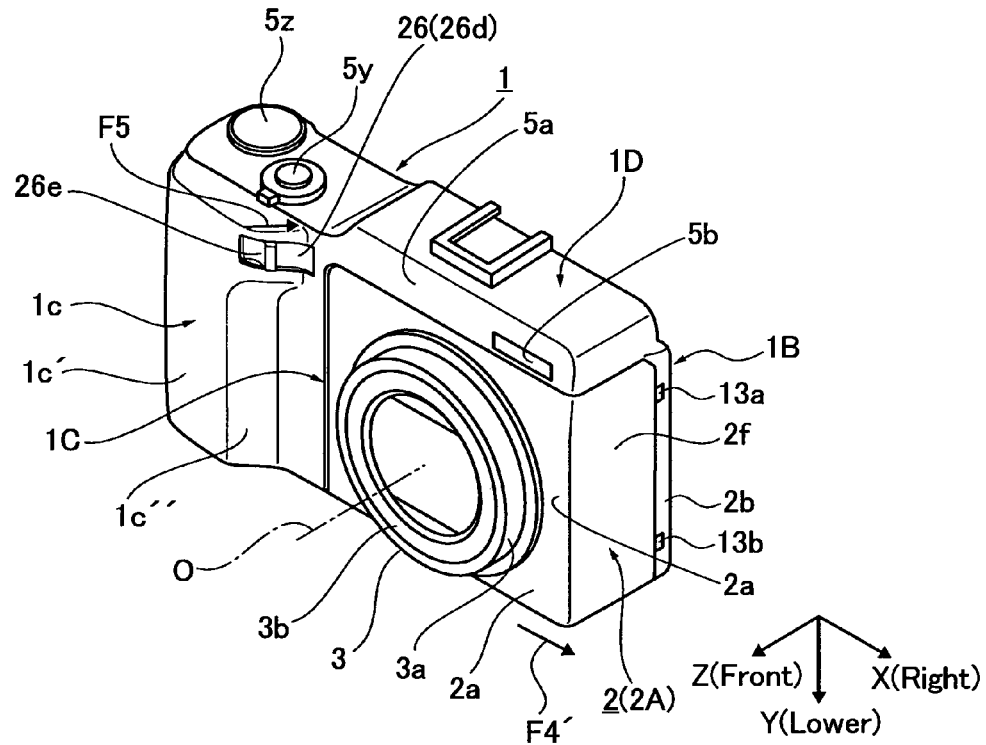
FIG. 1A is an explanatory view for illustrating a mounting state of an imaging unit and a camera body to which the present invention is applied, and is an external appearance view when an imaging apparatus consisting of the camera body and the imaging unit is viewed from a front side.
Figure 1B:
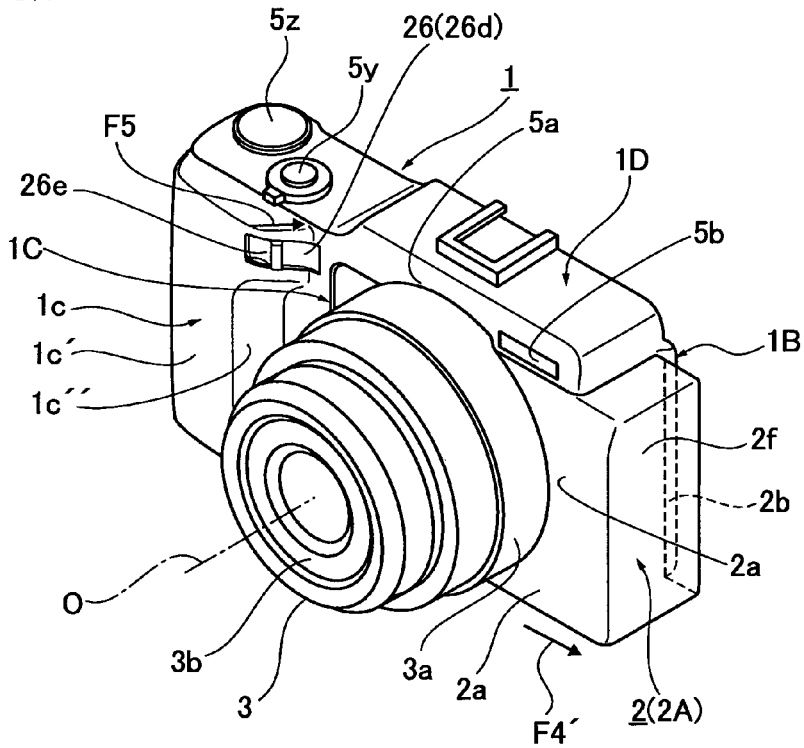
FIG. 1B is an explanatory view for illustrating a mounting state of another imaging unit and the camera body to which the present invention is applied, and is an external appearance view when the imaging apparatus consisting of the camera body and another imaging unit is viewed from the front side.
Figure 2:
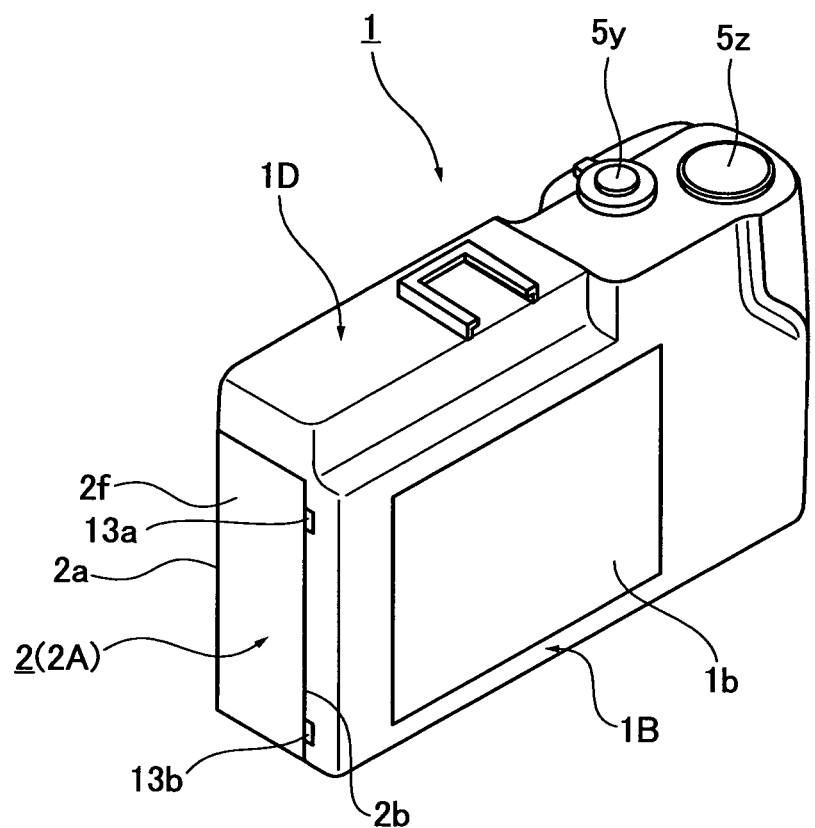
FIG. 2 is an external appearance view when the imaging unit shown in FIG. 1 is viewed from a back side.

FIGS. 1A, 1B and 2 illustrate a state of mounting (attaching) an imaging unit having a rectangular solid-shaped case on (to) a body portion of an imaging apparatus such as a camera body, the imaging unit being one example of an external unit according to the present invention.

Figure 3:
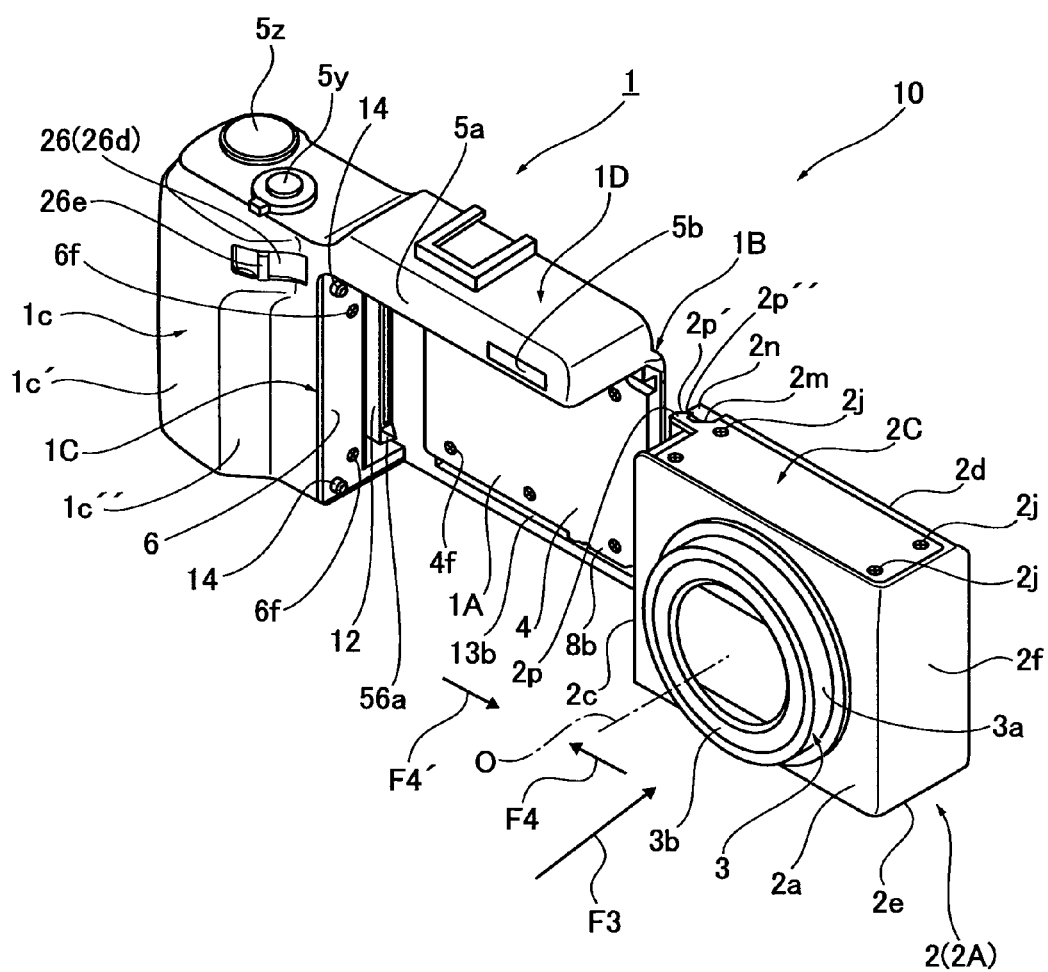
FIG. 3 is an explanatory view for illustrating a state prior to mounting the imaging unit on the camera body shown in FIG. 1 or a state after removing the imaging unit from the camera body shown in FIG. 1, and is a perspective view when the camera body and the imaging unit are viewed from a right oblique direction toward the camera body and the imaging unit.
Figure 4:
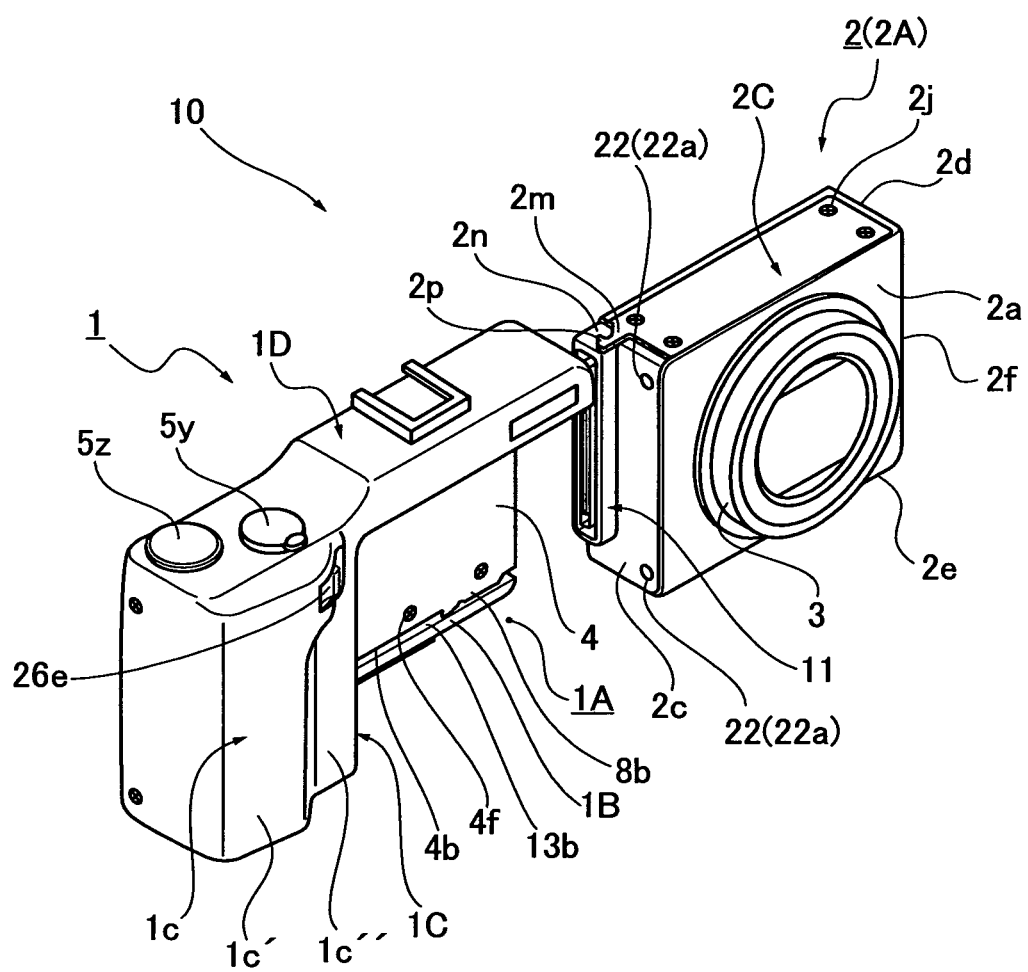
FIG. 4 is an explanatory view for illustrating a state prior to mounting the imaging unit on the camera body shown in FIG. 1 or a state after removing the imaging unit from the camera body shown in FIG. 1 and is a perspective view when the camera body and the imaging unit are viewed from a left oblique direction toward the camera body and the imaging unit.

In these FIGS. 1A, 1B and 2, reference numeral 1 denotes a camera body and reference numeral 2 denotes an imaging unit. The imaging apparatus 10 is composed by mounting the imaging unit 2 on the camera body 1 (a concave portion 1A described later). The imaging unit 2 comprises a rectangular solid-shaped case 2A. Here, the imaging unit 2 includes an interchangeable lens barrel unit equipped with an imaging optical system and an imaging device. The imaging unit 2 includes a lens barrel 3 in front thereof 2a. The imaging unit 2 is configured to removably mount on the camera body 1, as shown in FIGS. 3 and 4. The lens barrel 3 is comprised of a guide tube 3a and a movable barrel 3b. The movable barrel 3b is advancively and retractively disposed into the guide tube 3a in the direction toward which the optical axis extends. The movable barrel 3b is provided with a lens system such as a zooming lens and so on. An imaging optical system including the lens system images the subject image on the imaging device. The imaging units 2 each having different size may be replaceably mounted on the camera body 1 (See FIG. 1B). The imaging unit 2 shown in FIG. 1B may have an imaging device having a different size and a lens barrel 3 having a different size. FIG. 1B shows a state in which an imaging unit 2 including a lens barrel 3 and a case 2A each having a different size of the lens barrel 3 and the case 2A in the imaging unit 2 shown in FIG. 1A, is mounted on the camera body 1.

(Description of Detailed Structure of Camera Body)

Figure 5:
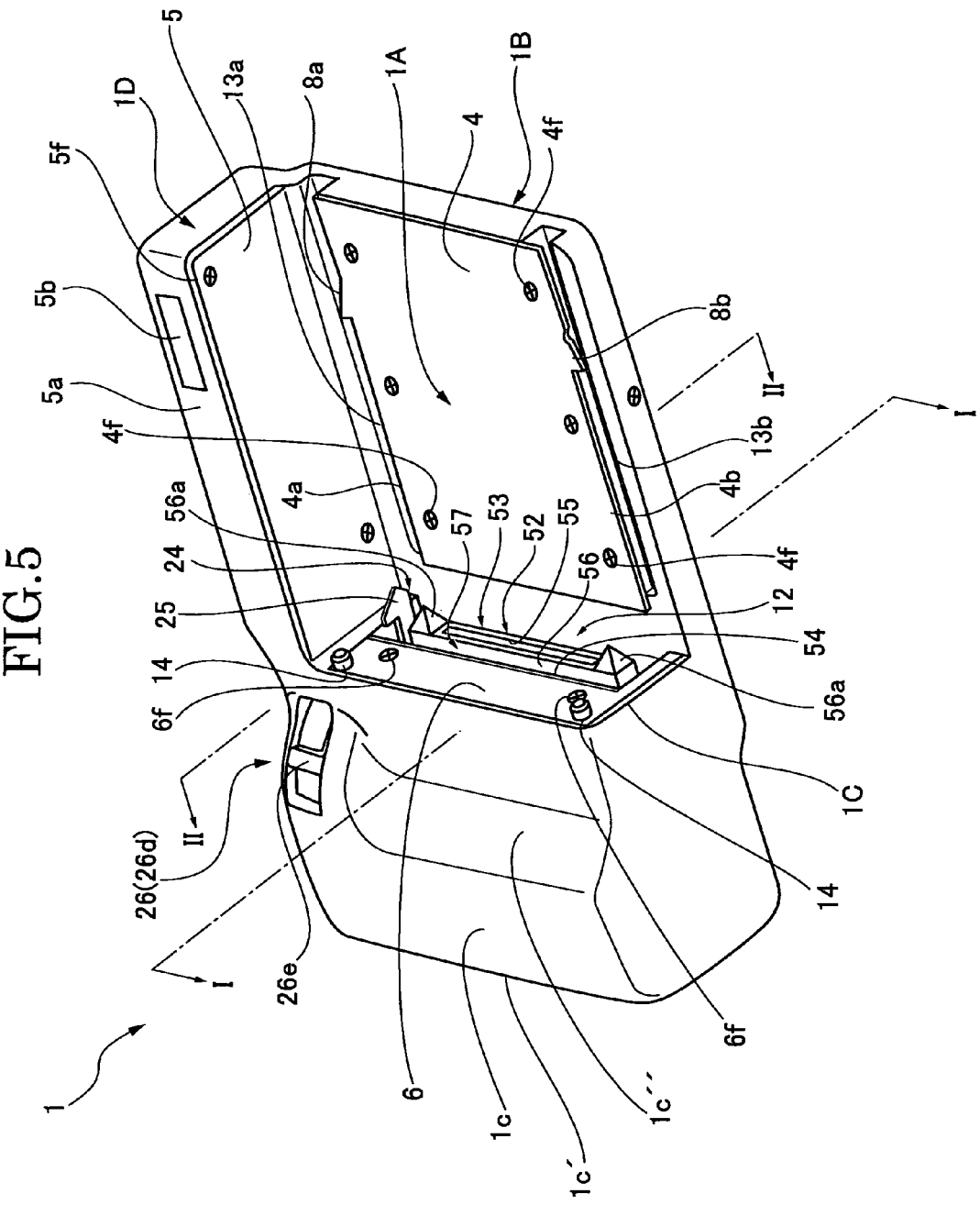
FIG. 5 is an external appearance view for illustrating the camera body to which the present invention is applied, and is a view when the camera body is viewed from the front side.

The camera body 1 has a concave portion 1A as a space to dispose the case 2A, as shown in FIGS. 3 to 5. The concave portion 1A is composed of three walls including a back wall portion 1B (a back face wall structure) made of resin, a side wall portion 1C (a side face wall structure), and an upper wall portion 1D (a side face wall structure). The back wall portion 1B and the side wall portion 1C cross at right angles with each other. The upper wall portion 1D are perpendicular to both the back wall portion 1B and the side wall portion 1C.

Figure 6:
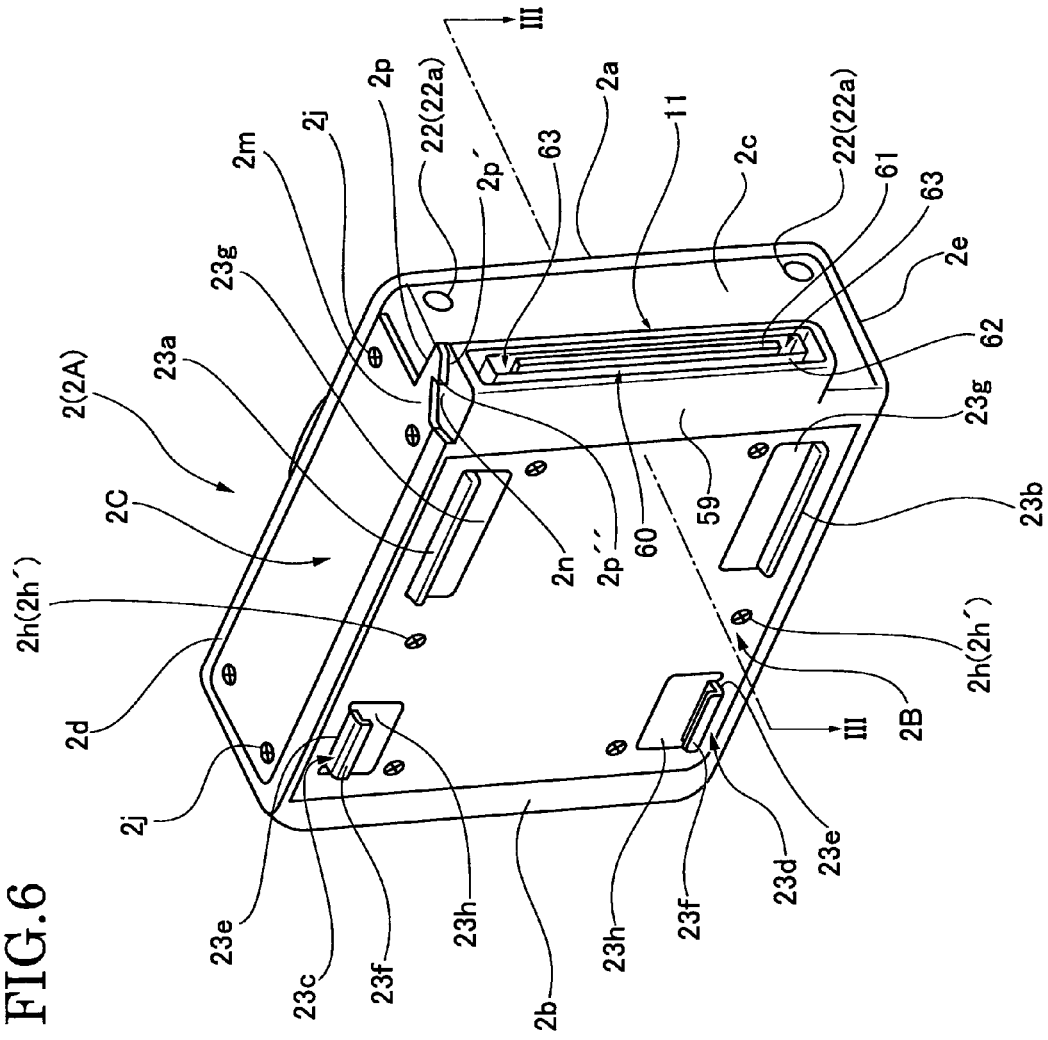
FIG. 6 is an external appearance view for illustrating the imaging unit to which the present invention is applied, and is a view when the imaging unit is viewed from the back side.

When the imaging unit 2 is viewed from a front side or the subject side along the optical axis of the optical system by mounting or disposing the imaging unit 2 on the concave portion 1A, the back wall portion 1B is opposed to the back face 2b of the case 2A (See FIG. 6). When the imaging unit 2 is viewed from a front side by disposing the imaging unit 2 on the concave portion 1A, the side wall portion 1C is opposed to a left side face 2c of the case 2A. When the imaging unit 2 is viewed from a front side by disposing the imaging unit 2 on the concave portion 1A, the upper face portion 2d is opposed to an upper face 2d of the case 2A.

The back wall portion 1B, the side wall portion 1C and the upper wall portion 1D are integrally formed with each other. The contour of the concave portion 1A is defined by its back wall portion 1B, its side wall portion 1C and its upper wall portion 1D. The concave portion 1A is opened, when the case 2A is disposed, toward three directions consisting of a lower direction toward which a lower face 2e of the case 2A is directed (Y direction), a right direction toward which a right side face 2f of the case 2A is directed (X direction) and a front direction toward which a front face 2a of the case 2A is directed (Z direction).

In proper positions of the back wall portion 1B, the side wall portion 1C and the upper wall portion 1D are provided with an operational portion for electrically operating the camera body 1 and the imaging unit 2. In this Example 1, on the upper wall portion 1D are provided with a release button 5y and a dial 5z as the operational portion, as shown in FIGS. 1 to 4.

The back wall portion 1B is provided with a sheet metal member 4 as a back face wall. The sheet metal member 4 and the back face 2b of the imaging unit 2 face each other when setting the imaging unit to the camera body 1. The sheet metal member 4 plays a role in reinforcing the back wall portion 1B. The sheet metal member 4 exhibits a substantially rectangular contour corresponding to a back face shape of the case 2A.

Figure 8:
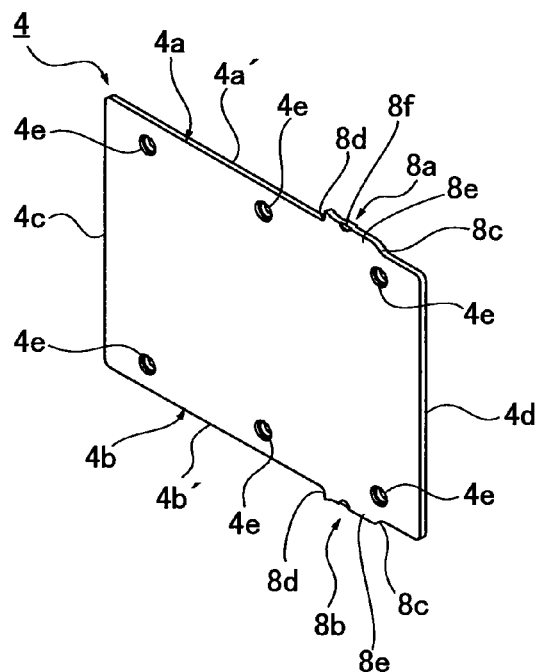
FIG. 8 is a perspective view for illustrating an external appearance of a sheet metal member shown in FIG. 7, and is a view when the sheet metal member is viewed from the front side of the camera body.
Figure 9:
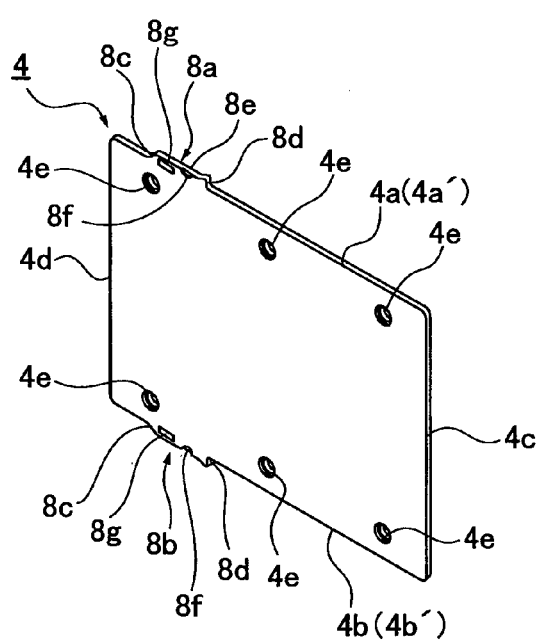
FIG. 9 is a perspective view illustrating an external appearance of the sheet metal member shown in FIG. 7, and is a view when the sheet metal member shown in FIG. 7 is viewed from the back side.

The sheet metal member 4 is, for example, formed by pressing. The sheet metal 4 comprises an upper side portion 4a, a lower side portion 4b, a left side portion 4c, and a right side portion 4d, as shown in FIGS. 8 and 9. The upper side portion 4a and the lower side portion 4b extend parallel and in right and left direction with each other. The left side portion 4c and the right side portion 4d extend parallel and in upper and lower direction with each other.

An upper edge wall 4a' of the upper side portion 4a and a lower edge wall 4b' of the lower side portion 4b play a roll in an edge wall which guides the imaging unit 2 in the right and left direction. The sheet metal member 4 is provided with screw holes 4e which are spaced in the right and left direction of the respective upper side portion 4a and the lower side portion 4b of the sheet metal member 4. The sheet metal member 4 is fixed to the back wall portion 1B by means of screws 4f, as shown in FIGS. 3 to 5, and 7.

The sheet metal member 5 is fixed to the upper wall portion 1D by means of screws 5f, as shown in FIG. 5. The sheet metal member 5 faces the upper face 2d of the case 2 when setting (mounting) to (on) the concave portion 1A of the case 2A. The sheet metal member 5 appears to be raised forward from the back wall portion 1B when the upper wall portion 1D is positioned in the upper side and the sheet metal member 5 is looked in the face from side directions.

At a right side on a front face 5a of the upper wall portion 1D is provided with a strobe emitting portion 5b as an illuminating device. Meanwhile, herein, the storobe emitting portion 5b is explained as being provided on the upper wall portion 1D but the same may be provided on the side wall portion 1C. By providing the storobe emitting portion 5b on the upper wall portion 1D, it is possible to illuminate the subject from an upper side than that of the optical axis O and thus properly illuminate the subject.

The sheet metal member 6 is fixed to the side wall portion 1C by means of screws 6f, as shown in FIGS. 3 and 5. The sheet metal member 5 faces the left side face 2c of the case 2 when setting to the concave portion 1A of the case 2A and is abut against the left side face 2c when the case 2A is mounted on the concave portion 2A. The sheet metal member 6 appears to be raised forward when the back wall portion 1B is positioned in the lower side, the upper wall portion 1D is positioned in the right side and further the front side thereof is positioned in the upper side, finally the sheet metal member 6 is looked in the face.

The camera body 1 comprises a grip portion 1c, which is connected to the side wall portion 1C, as shown in FIGS. 1, 3 to 5, and 7. The grip portion 1c includes, when a direction from a back face side to a front face side is defined as a front direction, an expanded portion (a convex portion for gripping) 1c' which is expanded in a front direction toward the subject along the optical axis of the optical system and a recessed portion for resting fingers (a concave portion for gripping) 1c" which exists between the expanded portion 1c' and the concave portion 1A. The recessed portion for resting fingers 1c" is adjacent to the expanded portion 1c'. It is possible to rest the middle to little fingers on the recessed portion for putting fingers 1c" when grasping the grip portion 1c by the right hand.

A storage chamber is formed inside the grip portion 1c. In this storage chamber, a battery and various electronics required for the imaging device are built-in. Namely, in this storage chamber, the battery, a circuit for controlling the imaging unit 2 by the operation of the operational portion, a circuit for processing an image taken by the imaging unit 2, a recording medium for recording and storing the image taken by the imaging unit 2 and processed by the processing circuit, a circuit for power supply, a circuit for controlling a strobe, a circuit board for mounting parts for the circuits constituting the above and so on are housed.

On the back face of the back wall portion 1B is provided a display face 1b as a display device which displays an image based upon an image data taken by the imaging unit 2 as shown in FIG. 2. The image recorded and stored in the recording medium is replayed and displayed on the display face 1b. Although the size of the back wall portion 1B is substantially defined by the size of the display face 1b, the display face 1b may or may not be provided on the back wall portion 1B.

In the Example 1, a liquid crystal display as a display face is provided on the back wall portion 1B. Further, the sheet metal member 4 is provided on the side in which the liquid crystal display of the back wall portion 1B is not provided. With this arrangement, it is possible to enlarge the size of the sheet metal member 4. Whereby, it is possible to widen the gap between engagement grooves in an up and down direction, or, the gap between inserting grooves in the up and down direction, thereby enhancing the prevention of backlash.

The imaging unit 2 is provided with an attachment plug as a unit side connector portion 11 (hereinafter, referred only to the connector portion 11) which extends upwardly and downwardly in the left side face 2c facing the sheet metal member 6, as shown in FIGS. 4 and 6. The connector portion 11 is fixed to a connector circuit board 50 on which electrical circuits are wired (a plug circuit board set) (See FIGS. 22 and 23). The plug circuit board set is disposed within the imaging unit by means of a floating structure. The connector portion 11 protrudes outwardly from the left side face 2c.

The floating structure plays a roll in absorbing and relieving the installation errors between the connector portions 11 and 12, and relieving a stress applied upon fitting the connector portion 11 and the connector portion 12, when the imaging unit is mounted on the camera body 1 and the connector portion 11 and the connector portion 12 described later are electrically connected.

Figure 19:
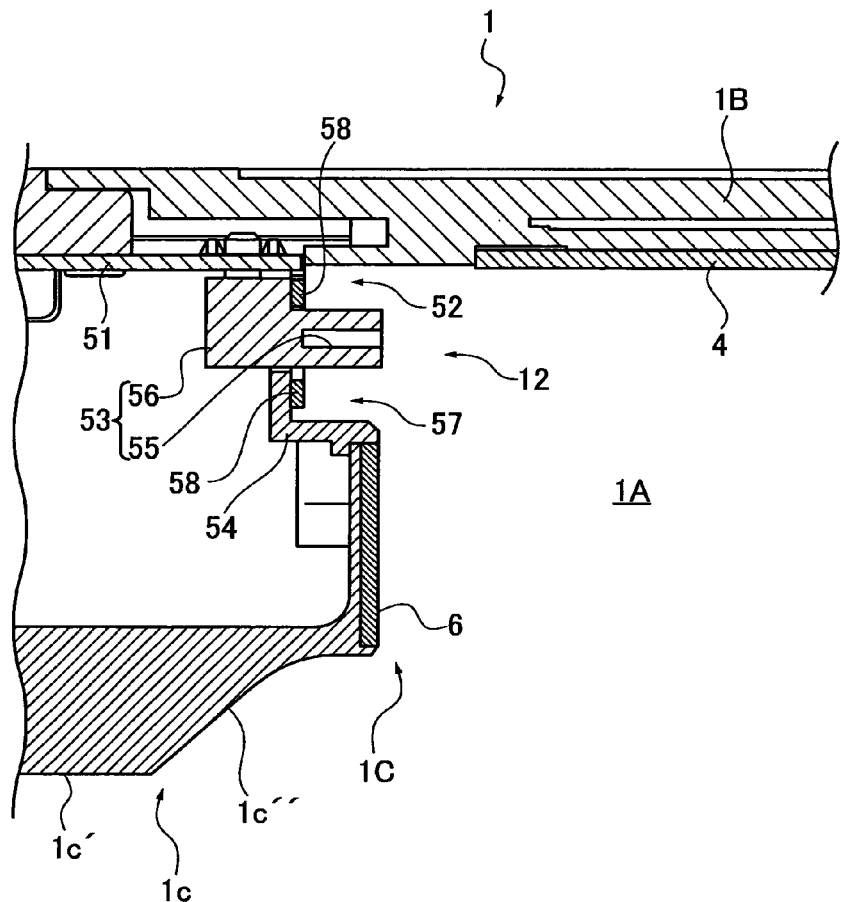
FIG. 19 is a schematic cross sectional view taken along line I-I of FIG. 5.

The camera body 1 is provided with a body side connector portion 12 which is adjacent to the sheet metal member 6 and extends upwardly and downwardly (hereinbelow, referred only to the connector portion 12), as shown in FIGS. 3 and 5. The connector portion 12 is fixed to the connector circuit board 51 on which electrical circuits are wired (a plug circuit board set) (See FIGS. 19 and 23). The connector portions 11 and 12 are provided with, for example, commercially available bay connectors. The structures of both the connector portions 11 and 12 and their peripheries will be described in detail later.

The connector portion 12 is disposed in such a manner that it does not casually contact a raising base portion of the side wall portion 1C which appears to be appears to be raised forward from the back wall portion 1B, when the sheet metal 6 is looked in the face after the back wall portion 1B is positioned in the lower side and the upper wall portion 1D is positioned in the right side as well as the front side is positioned in the upper side. The connector portion 12 includes a cover member 12b which covers a connector terminal. The cover member 12b plays a role in preventing the electric circuits and electric devices and so on from electrostatically broken due to the discharge of static electricity accumulated in a human body by means of human hand's contact, when mounting the imaging unit 2 on the camera body 1.

The connector portion 12 exposes toward the concave portion 1A. The connector portion 12 is fitted into the connector portion 11 along with the movement toward a direction from the right to the left with respect to the camera body 1, of the imaging unit 2, upon mounting and setting the imaging unit 2 on and to the camera body 1, and finally the camera body 1 and the imaging unit 2 are electrically connected. Meanwhile, the setting of the imaging unit 2 to the camera body 1 will be described in detail later.

Figure 7:
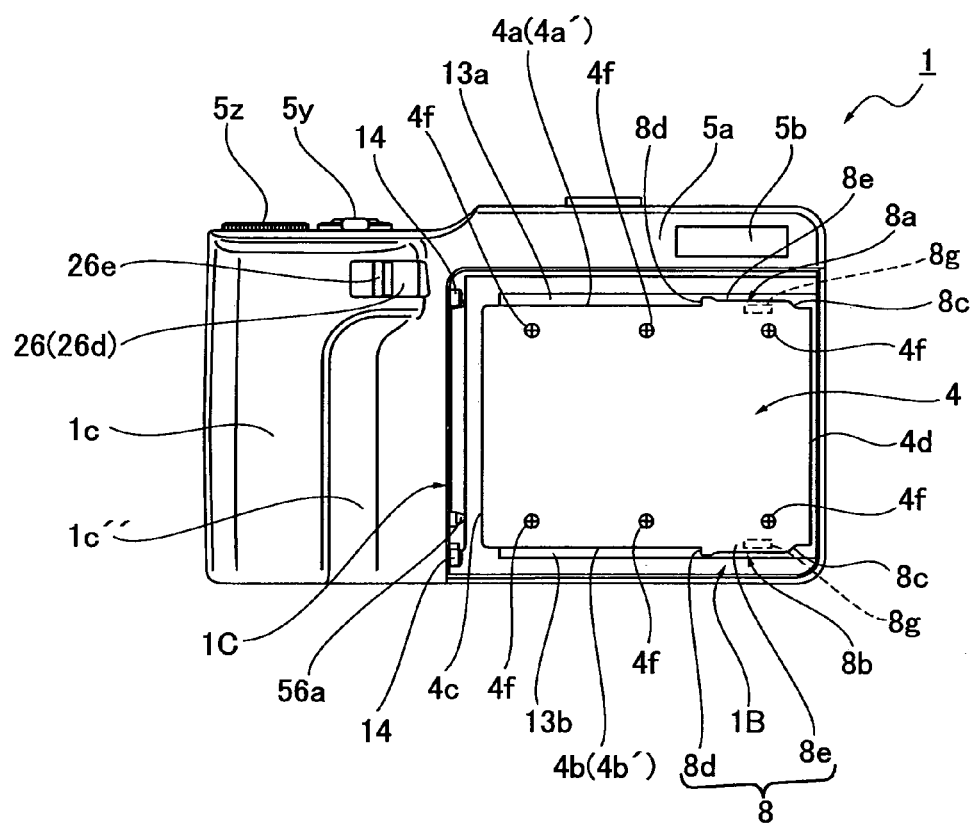
FIG. 7 is a view for illustrating the camera body to which the present invention is applied, when the camera body is viewed from the front side.

The back wall portion 1B is formed with a pair of inserting grooves 13a, 13b which extends in the right-and-left direction, as shown in FIG. 7. The pair of inserting grooves 13a, 13b is formed in an upwardly and downwardly spaced manner with each other. The pair of inserting grooves 13a, 13b is disposed along an upper edge wall 4a' and a lower edge wall 4b'. The inserting grooves 13a, 13b regulate the positional relationship of the connector portion 12 of the camera body 1 with respect to the connector portion 11 in the imaging unit 2 and play a role as a guide groove for guiding the imaging unit 2 in the right-and-left direction. Meanwhile, the upper edge wall 4a' and the lower edge wall 4b' play a role as a sliding contact portion with which a sliding contact rib formed in a back face of the imaging unit 2 (described later) is brought into sliding contact.

The upper side portion 4a and the lower side portion 4b of the sheet metal member 4 are formed with engagement sheet portions 8a, 8b in a side close to the right side portion 4d, as shown in FIGS. 8 and 9. The engagement sheet portion 8a protrudes upwardly from the upper edge wall 4a'. The engagement sheet portion 8b protrudes downwardly from the lower edge wall 4b'. A pair of engagement sheet portions 8a, 8b are disposed in an upwardly and downwardly spaced manner. The engagement sheet portions 8a, 8b engage engagement claws (described later) formed in a back side of the imaging unit 2 and play a role in preventing the backlash in a front-and-behind direction.

Figure 10:
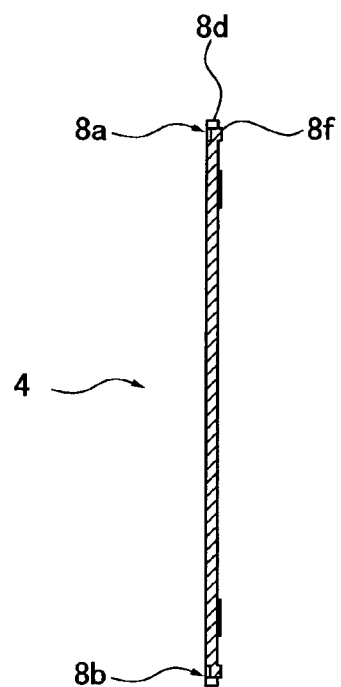
FIG. 10 is a cross sectional view illustrating the sheet metal member shown in FIGS. 8 and 9.
Figure 11:
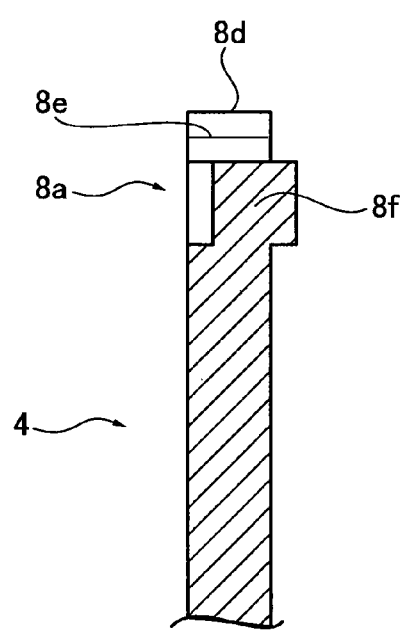
FIG. 11 is a partial enlarged cross sectional view illustrating the sheet metal member shown in FIG. 10.
Figure 12:
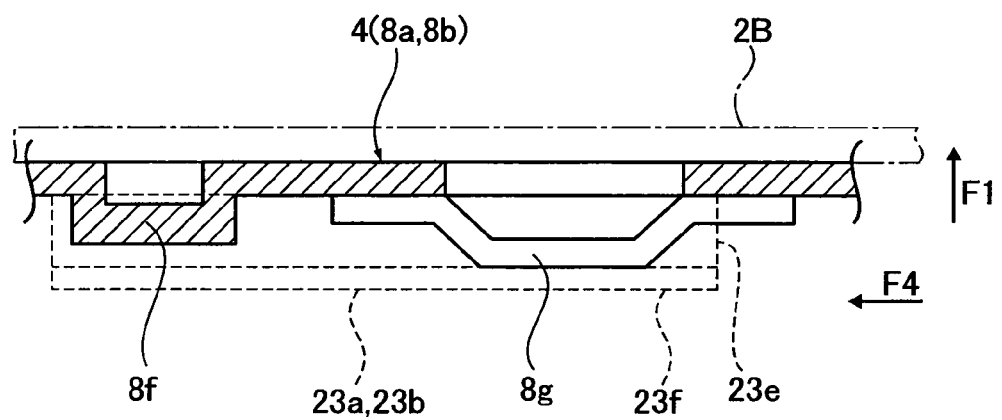
FIG. 12 is a partial enlarged cross sectional view for illustrating an engagement relationship of an engagement sheet portion shown in FIGS. 8 and 9, and the imaging unit.

The engagement sheet portions 8a, 8b have an inclined wall 8c in a side close to the right side portion 4d and a stopper wall 8d in a side close to the left side portion 4c. An engagement wall 8e is present between the inclined wall 8c and the stopper wall 8d. The engagement wall 8e is formed with a protrusion 8f by mean of half-cut device, as shown in FIGS. 10 and 11. The protrusion 8f is provided in a front side of the engagement sheet portions 8a, 8b and protrudes toward the inserting grooves 13a, 13b. An energizing leaf spring 8g which is adjacent to the protrusion 8f and serves as an engagement and energizing member is provided as shown in FIGS. 9 and 12. The energizing leaf spring 8g is provided in a front side of the engagement sheet portions 8a, 8b and faces the inserting groove 13a as an upper concave groove and the inserting groove 13b as a lower concave groove. The right-hand side of these grooves are opened toward the outside. The dispositional position of the energizing leaf spring 8g is closer to the right side portion 4f than that of the protrusion 8f. The energizing leaf spring 8g plays a role in energizing the imaging unit 2 mounted on the camera body 1 toward the back wall portion 1B as described later. The protrusion 8f plays a role in reducing backlash in a front-and-behind direction when putting on and taking off the imaging unit 2 with respect to the camera body 1. The inserting grooves 13a, 13b also play a role in serving as an engagement groove with which a pair of engagement claws (described later) engages.

Under the condition that the imaging unit 2 is mounted on the camera body 1 and the imaging unit 2 is locked against the camera body 1, when a force which is directed toward a front side (a direction indicated by an arrow F1 in FIG. 12) is applied to the imaging unit 2, the engagement sheet portions 8a, 8b plays a role in preventing the drawing by means of the force in cooperation with a pair of engagement claws (described later) as an engagement and fixing member provided on the imaging unit 2.

Namely, under the condition that the engagement and energizing member is inserted into the engagement grooves, when the imaging unit 2 is approached toward the side wall portion 1C, the engagement and energizing member plays a role in energizing the engagement and energizing member toward the optical axis of the optical system. Although the engagement and energizing member is explained as one pair, that is to say, two, the number of members may be one or three. If the number of members is larger than two, it is preferred that the engagement and energizing member is configured to space in a direction perpendicular with respect to a direction toward which the imaging unit 2 is approached to the side wall portion 1C (up and down direction (See an arrow Y)). The engagement grooves are disposed in a position corresponding to that of the engagement and energizing member. Further, herein, although the description is explained as the engagement and energizing member and the engagement grooves are provided on the camera body 1 and the engagement and fixing member is provided on the imaging unit 2, the vise-versa structure may be possible. The structural constitution of the guide member and the guide groove is also similar to above.

Figure 20:
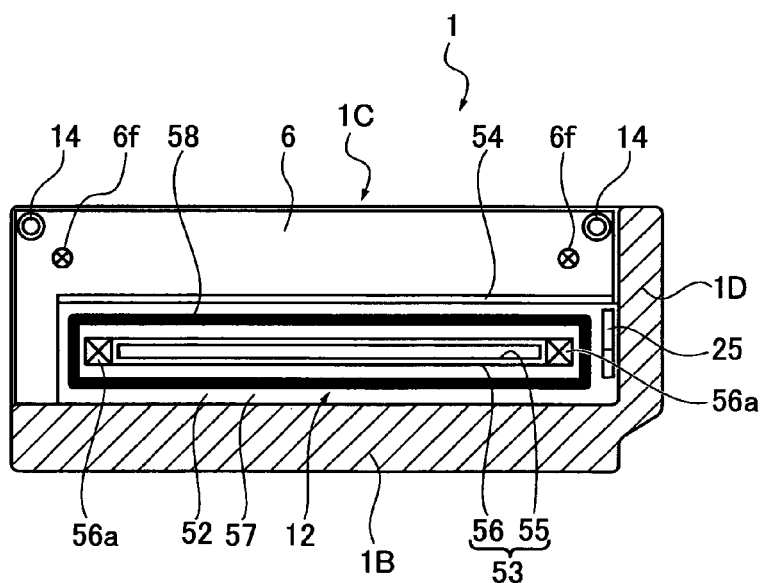
FIG. 20 is a schematic cross sectional view taken along line II-II of FIG. 5.
Figure 21:
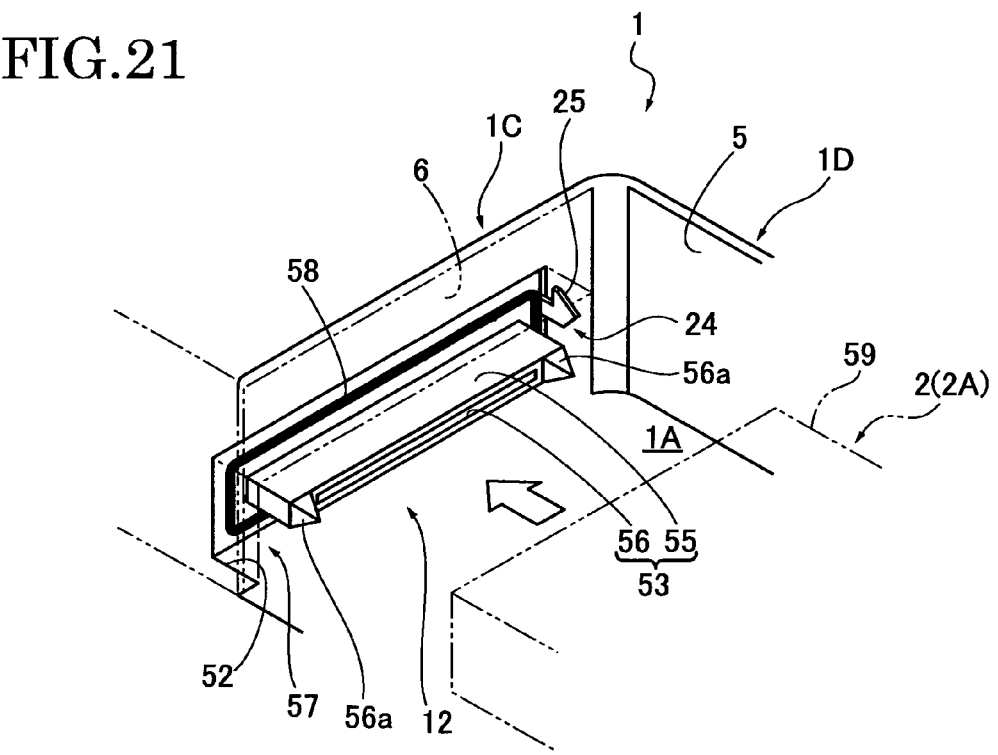
FIG. 21 is a schematic perspective view illustrating the structure of a connector portion in the camera body according to the First Example.

The side wall portion 1C is formed with a pair of auxiliary fitting protrusions 14, 14 (fitting concave portions) which are spaced in an upwardly and downwardly direction, as shown in FIGS. 3, 5 and 7. The fitting protrusion 14 is positioned above the connector portion 12 when the side wall portion 1C is looked in face after the back wall portion 1B is positioned in the lower side and the upper wall portion 1D is positioned in the right side as well as the front side is positioned in the upper side (See FIG. 20 and so on). The pair of auxiliary fitting protrusions 14, 14 has a function of preventing the connector terminal in the connector portion 12 of the camera body 1 and the connector terminal in the connector portion 11 of the imaging unit 2 from being destroyed in cooperation with a pair of auxiliary fitting holes when an unexpected twisting force is applied to the imaging unit 2.

The connector portion 12 is provided on the side surface of the side wall portion 1C where an elongate grip portion which extends in an upward and downward direction is formed. With this arrangement, it is possible to dispose more larger connector than usual. Accordingly, it is possible to enhance the data transfer speed between the imaging unit and the camera body.

(Description of the External Contour of the Imaging Unit 2)

As shown in FIGS. 4 and 6, a pair of auxiliary fitting protrusions 22, 22 (fitting concave portions) are formed on the left side face 2c which faces the sheet metal member 6 abuts against the sheet metal member 6 when the case 2c is mounted on the imaging unit 2. The pair of auxiliary fitting protrusions 14, 14 are fitted into the pair of auxiliary fitting protrusions 22, 22 when the mounting unit 2 is set to the camera body 1. A shock absorbing member 22a made of such as sponge, rubber and so on is disposed at the bottom portion of each of the pair of auxiliary fitting protrusions 22, 22. Meanwhile, the structure in which the pair of auxiliary fitting protrusions 22, 22 is formed on the side wall portion 1C and the pair of auxiliary fitting protrusions 14, 14 is formed on the left side face 2c of the case 2A may be employed. Further, herein, although the fitting convex portion and the fitting concave portion are explained as they are paired or the number of them being two, each of the fitting convex portion and the fitting concave portion may be one or larger than three. If a plurality of fitting convex portion and fitting concave portion are formed, it is preferred that they are arranged in such a manner that they are spaced in a direction perpendicular to a direction toward which the imaging unit 2 approaches the side wall portion 1C.

The back face 2b of the case 2A is provided with a rectangular sheet metal member 2B, as shown in FIG. 6. The sheet metal member 2B is formed with a screw hole 2h' in an appropriate position therein and fixed to the back face 2b of the case 2A by means of a set screw 2h. The sheet metal member 2B is formed with a pair of sliding contact ribs 23a, 23b and a pair of engagement claws 23c, 23d as an engagement and fixing member. The pair of sliding contact ribs 23a, 23b are facing with each other in an upwardly and downwardly spaced manner and extends in a right-and-left direction.

The pair of engagement claws 23c, 23d are formed by louvering. The pair of engagement claws 23c, 23d include a louvered portion 23e and a bent portion 23f. The pair of engagement claws 23c, 23d are similarly arranged in a spaced manner toward an upward and downward direction and opposed with each other. The area in which the pair of sliding contact ribs 23a, 23b are formed and another area in which the pair of engagement claws 23c, 23d are formed in the sheet metal member 2B correspond to a rectangular elongate hole 23g and a rectangular elongate hole 23h, respectively. The pair of sliding contact ribs 23a, 23b are inserted into the inserting grooves 13a, 13b and are adapted to slidably contact the upper edge wall 4a' and the lower edge wall 4b', respectively. The pair of engagement claws 23c, 23d are configured to be engageable with the energizing leaf spring 8g.

The sheet metal member 2C is fixed to an upper face 2d of the case 2d, as shown in FIG. 6. The sheet metal member 2C includes an extended plate portion 2m (extended portion) which is outwardly extended beyond the left side face 2c of the case 2A. The extended plate portion 2m extends along an upper face of the connector portion 11 (a connector cover portion 59 described later). The extended sheet metal portion 2m is formed with a notch portion 2n and a claw to be locked 2p. A locking claw as a locking member (described later) enters into the notch portion 2n. A notch portion of the locking member (described later) enters into the claw to be locked 2p. The claw to be locked 2p includes an inclined wall 2p'. The imaging unit 2 is fixed to the camera body 1 by the engagement of the locking member and the member to be locked.

(Locking Mechanism 24 and Unlocking Mechanism 24')

Figure 13:
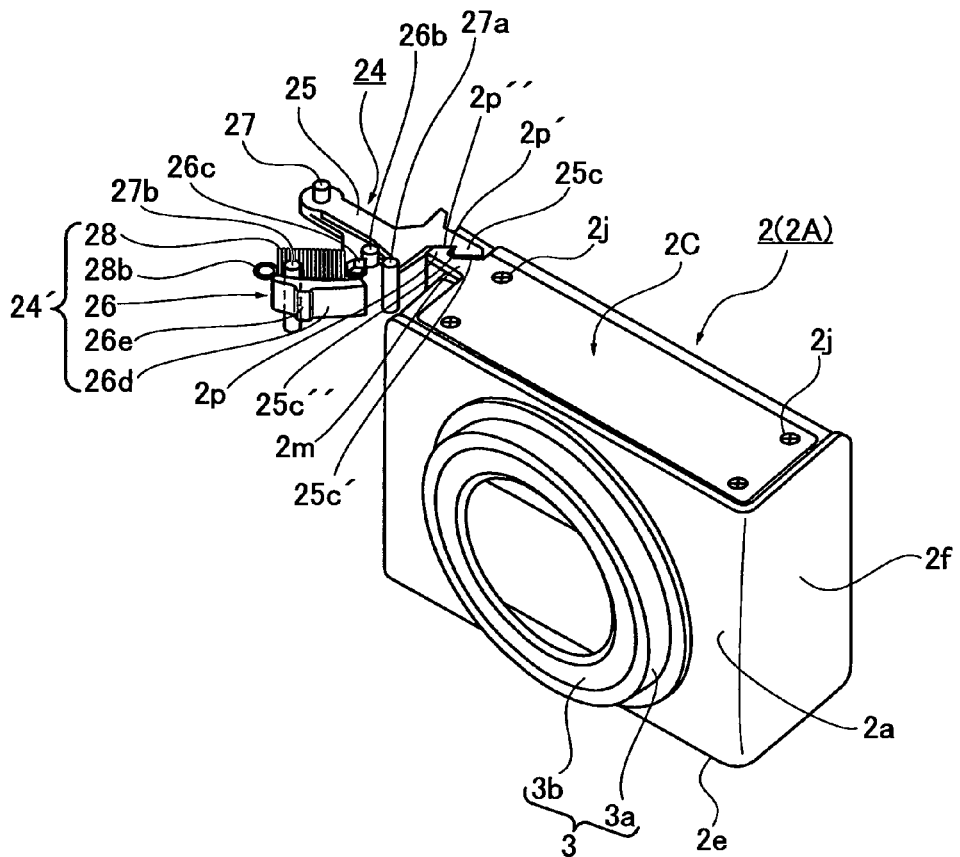
FIG. 13 is a perspective view for illustrating a meshing relationship of the imaging unit shown in FIG. 1, and a member for use in both locking and unlocking.
Figure 14:
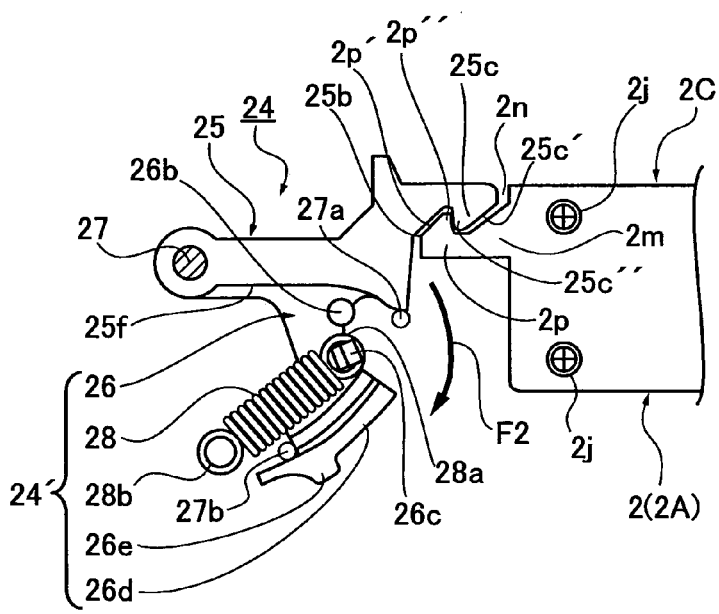
FIG. 14 is a partial enlarged view illustrating a meshing relationship of the member for use in both locking and unlocking shown in FIG. 13, and a member to be locked.

The camera body 1 is provided with a locking mechanism 24 as shown in FIGS. 13 and 14. The locking mechanism 24 is positioned at an intersection of the side wall portion 1C and the upper wall portion 1D. The locking mechanism 24 has a function of locking the imaging unit 2. As shown in FIG. 5, the locking mechanism 24 is positioned near an upper left corner of the case 2A, when the case 2A is viewed from a front side with the case 2A being disposed at the concave portion 1A.

The locking mechanism 24 is mainly comprised of a locking member (locking plate) 25 (See FIGS. 15 and 16), a supporting shaft 27, and a stopper 27a. The stopper 27a is fixed to the camera body 1. The locking member 25 plays a role in locking the imaging unit 2 in cooperation with the claw to be locked 2p as the member to be locked. The unlocking mechanism 24' is mainly comprised of an unlocking operation member (an unlocking plate) 26 (See FIGS. 17 and 18), a supporting shaft 27, and a stopper 27. The stopper 27b is fixed to the camera body 1. The unlocking operation member 26 plays a role in unlocking the imaging unit 2 against the camera body 1 by means of the locking member 25.

When the camera body 1 is viewed from a front side, since the unlocking operation member is provided at a similar position compared with that of a removing button at an exchanging barrel unit of a single-lens reflex camera, if user accustomed to the conventional exchanging lens type single-lens reflex camera uses the camera, it is possible to easily perform attachable/detachable operation and thus miss operation or malfunctioning is not likely to happen. Accordingly, it is possible to provide a camera body in which the risk due to the miss operation is reduced and the imaging unit is easily attached/detached to/from the camera body.

Figure 15:
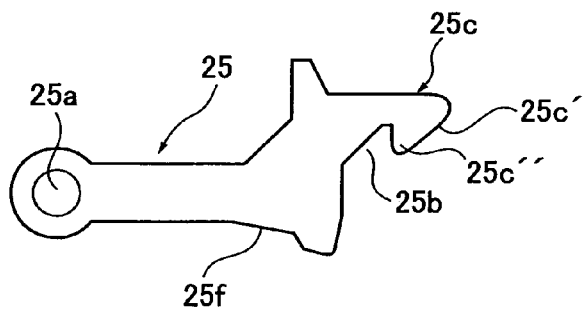
FIG. 15 is a plan view illustrating a locking member shown in FIG. 14.
Figure 16:
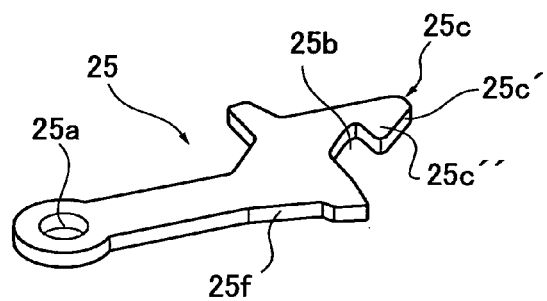
FIG. 16 is a perspective view illustrating the locking member shown in FIG. 15.

The locking member 25 includes a shaft hole 25a, a notch portion 25b, and a locking claw 25c, as shown in FIGS. 15 and 16. A support shaft 27 is inserted through the shaft hole 25a (See FIGS. 13 and 14). A tip end 25" of the locking claw 25 is directed forward if the direction from the back side to the front side of the camera body 1 is defined as a forward direction. Meanwhile, a tip end 2p" of the claw to be locked 2p is directed to a direction facing the back wall portion 1B with the imaging unit 2 being disposed at the concave portion 1A. Namely, the tip end 2p" of the claw to be locked 2p is directed backward if the direction from the front side to the back side of the camera body 1 is defined as a backward direction.

The locking member 25 is rotatably urged around the supporting shaft 27 toward a front direction (toward a direction of an arrow F2 in FIG. 14) by means of an urging device not shown. The stopper 27a plays a role in controlling the rotation stopping position of the locking member 25 by means of an urging device thereof. The locking claw 25c is maintained with the same being abut against the stopper by rotatably urging of the urging device, when the locking claw 25c and the claw to be locked 2p are not engaged.

The unlocking operation member 26 is spaced away from the stopper 27a. The locking claw 25c is formed with an inclined wall 25c'. The inclined wall 25c' engages with the inclined wall 2p' to generate a component force which causes the locking member 25 to be backwardly pivoted around the supporting shaft 27 as a fulcrum, when moving the imaging unit 2 from the right to the left with respect to the camera body 1 and mounting the imaging unit 2 on the camera body 1.

Figure 17:
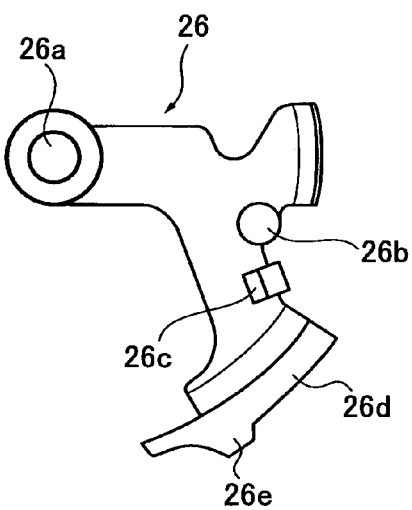
FIG. 17 is a plan view illustrating the unlocking member shown in FIG. 14.
Figure 18:
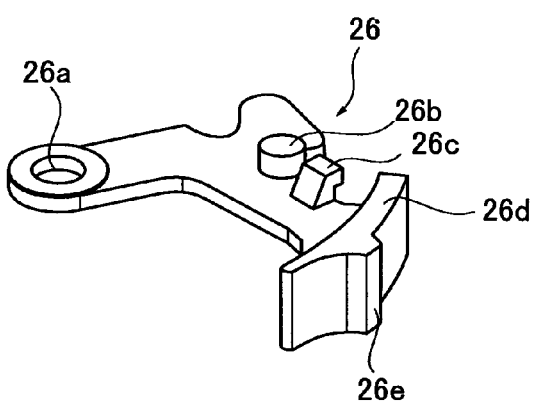
FIG. 18 is a perspective view illustrating the unlocking member shown in FIG. 17.

The unlocking operation member 26 comprises a shaft hole 26a, an unlock projection 26b, an engagement projection 26c, and an unlock button 26d, as shown in FIGS. 17 and 18. The supporting shaft 27 which rotatably supports the locking member 25 is inserted through the shaft hole 26a. The supporting shaft 27 is inserted through the shaft hole 25a and the shaft hole 26a, and fixed to the camera body 1. The unlock projection 26b plays a role in abutting against the side face 25f of the locking member 25 and rotating the locking member 25 toward an unlocked direction (a direction opposite to F2). One end 28a of a spring for unlocking 28 engages the engagement projection 26c. The other end 28b of the unlocking spring 28 engages the engagement projection (not shown) provided at a proper position inside the side wall portion 1C. The unlocking spring 28 plays a role in rotatably urging the unlocking operation member 26 around the supporting shaft 27 toward a front direction of the camera body 1.

The stopper 27b plays a role in controlling the rotation stopping position of the unlocking member 26 due to the rotatable urging force produced by the unlocking spring 28. The unlocking operation member 26 is abut against the stopper 27b when not operating. When operating the unlocking operation member 26, the unlocking operation member 26 is spaced away from the stopper 27b and rotated toward a direction approaching the stopper 27a. The rotating amount of the unlocking operation member 26 toward an operational direction is controlled by means of the stopper 27a.

The unlock button 26d is positioned above the recessed portion for resting fingers 1c" when a side in which the upper wall portion 1D is present, is directed upward. Namely, the recessed portion for resting fingers 1c" is positioned at a side below the unlocking operation member 26. The unlock button 26d includes a recessed portion for resting fingers 26e which outwardly protrudes from the grip portion 1c.

Since a position above the gripping convex portion 1c' is a position for non-obstructively grasping the grip portion when photographing and difficult to operate unexpectedly, it is possible to provide a camera body in which the risk due to the miss operation is further reduced and the imaging unit is easily attached/detached to/from the camera body.

Further, since the unlocking operation member is provided at a position above the gripping convex portion 1c' and difficult for fingers to abut thereagainst when grasping the gripping convex portion 1c', it is possible to further reduce the apprehension due to the miss operation.

In this Example 1, the unlock button 26d is rotated following an external contour of the gripping portion 1c. The locking member 25 and the unlocking operation member 26 are overlapped with each other and rotated around the supporting shaft as a fulcrum. The locking member 25 is rotated in a plane substantially the same as a rotational plane of the lock button 26.

(Description of and Dust-Protection and Waterproof Structure of Connector Portion)

Next, a dust-protection and waterproof structure of connector portions 11 and 12 will be described.

As mentioned above, the camera body 1 is provided with the connector portion 12, as shown in FIGS. 5, and 19 to 21. The connector portion 12 is configured in such a manner that a connector main body 53 is fitted into a fitting groove portion 52 formed in the side wall portion 1C. For this reason, the fitting groove portion 52 is present at a position to which the connector main body 53 in the connector portion 12 is installed.

The fitting groove 52 is a recessed portion which is positioned at the lower side such as an forwardly raised base portion which appears to be raised forward from the back wall portion 1B when the back wall portion 1B is positioned in the lower side, the upper wall portion 1D is positioned in the right side and the front side thereof is positioned in the upper side, and finally the sheet metal 6 is looked in the face, and provided in a dented manner from the sheet metal member 6 or the side wall portion 1C to the interior. An external contour of the fitting groove 52 is defined in cooperation with a connector cover material 54 provided to the side wall portion 1C and the side wall portion 1C as well as the back wall portion 1B. The side of the concave portion 1A or the right side (X direction) of the fitting groove 54 is opened. The fitting groove 52 is sized to be capable of forming an interval (gap) around the connector main body 53 with the connector main body 53 being disposed interior. For this reason, the connector portion 12, in particular the connector main body 53, enables the connection (electrical connection) with a connector main body 60 of the connector portion 11 described later by relatively moving the imaging unit 2 in the right and left direction and the prevention of unexpected contacts.

As mentioned above, the connector main body 53 disposed in the fitting groove 52 is electrically connected to the connector main body 60 of the connector portion 11 described later of the imaging unit 2, in order to enable data transfer between the camera body 1 and the imaging unit 2. The connector main body 53 is configured in such a manner that the connector terminal 55 is covered with a coating member 56.

The connector terminal 55 is a connector terminal which enables the electrical connection with a connector terminal 61 of the connector main body 60 in the connector portion 11 described later by relatively moving the imaging unit 2 in the right and left direction. In the Example 1, a female connector is used. The connector terminal 55 is electrically connected to a connector circuit board 51 fixed to the camera body 1. The connector circuit board 51 is wired with an electrical circuit such as a circuit for controlling the imaging unit 2 by operating the operating portion, a process circuit for processing an image photographed by the imaging unit 2 and so on.

The coating member 56 exhibits a substantially long shape which enables to coat the connector terminal 55 and is provided with a pair of positioning protrusions 56a, 56a at an upper and lower both ends (at both ends when viewed from Y direction). The coating member 56 plays a role in preventing the electric circuits and electric devices and so on from electrostatically being destroyed due to the discharge of static electricity accumulated in a human body by means of human hand's contact, when mounting the imaging unit 2 on the camera body 1.

In the fitting grove portion 52 of the connector portion 12, a fitting groove 57 is formed in such a manner that the fitting groove 57 surrounds the connector main body 53 in an area due to the difference depending upon their circumferential length between the fitting groove portion 52 and the connector main body 53 and is formed in this area. The fitting groove 57 is configured and sized in such a manner that a connector cover 59 of the connector portion 11 in the imaging unit 2 surrounds the mutually connected connector main body 53 and the connector main body 60 of the connector portion 11 described later and is capable of entering the interior. A sealing member 58 is fitted in a bottom wall face (a wall face positioned interior when viewed from the concave portion 1A).

The sealing member 58 has dust-protection and waterproof (drip-proof) functions of preventing the dust, the liquid and so on from being attracted and attached to the connector main body 53 in the connector portion 12 (the connector terminal 55) and the connector main body 60 in the connector portion 12, which are in a mutually connected (electrically connected) state. In the Example 1, the sealing member 58 is formed in a sheet-like member composed of a material having an elasticity such as a rubber (a resin material) or a sponge (a spongy resin material) and exhibits an annular shape which surrounds the connector main body 53 at the bottom wall face of the fitting groove 57 (See FIGS. 20 and 21). The thickness of the sealing member 58 will be described later. As mentioned above, the connector portion 11 of the imaging unit 2 is connected to the connector portion 12.

Figure 22:
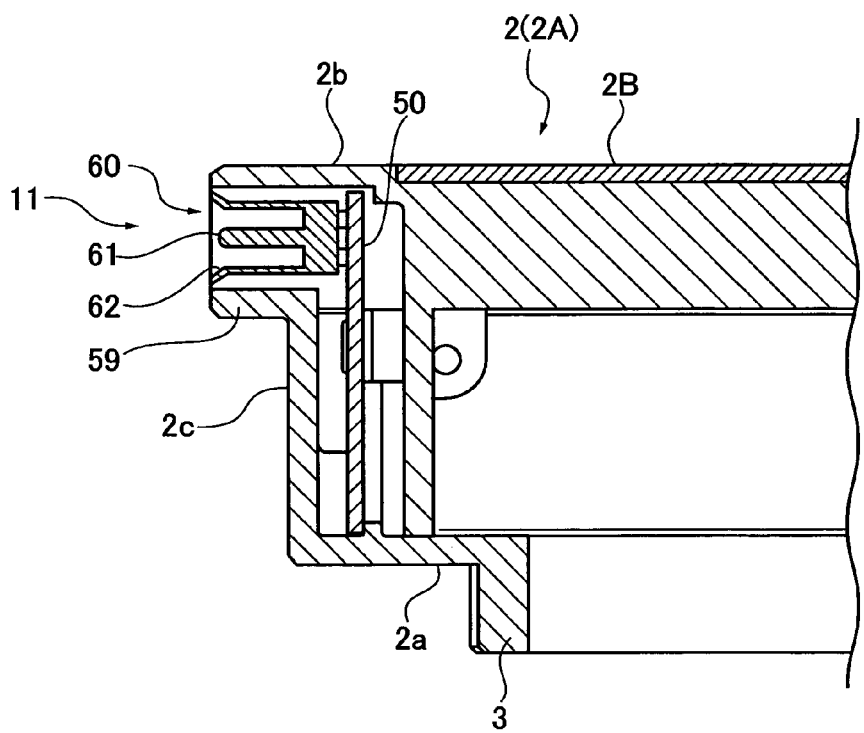
FIG. 22 is a schematic cross sectional view taken along line III-III of FIG. 6.
Figure 23:
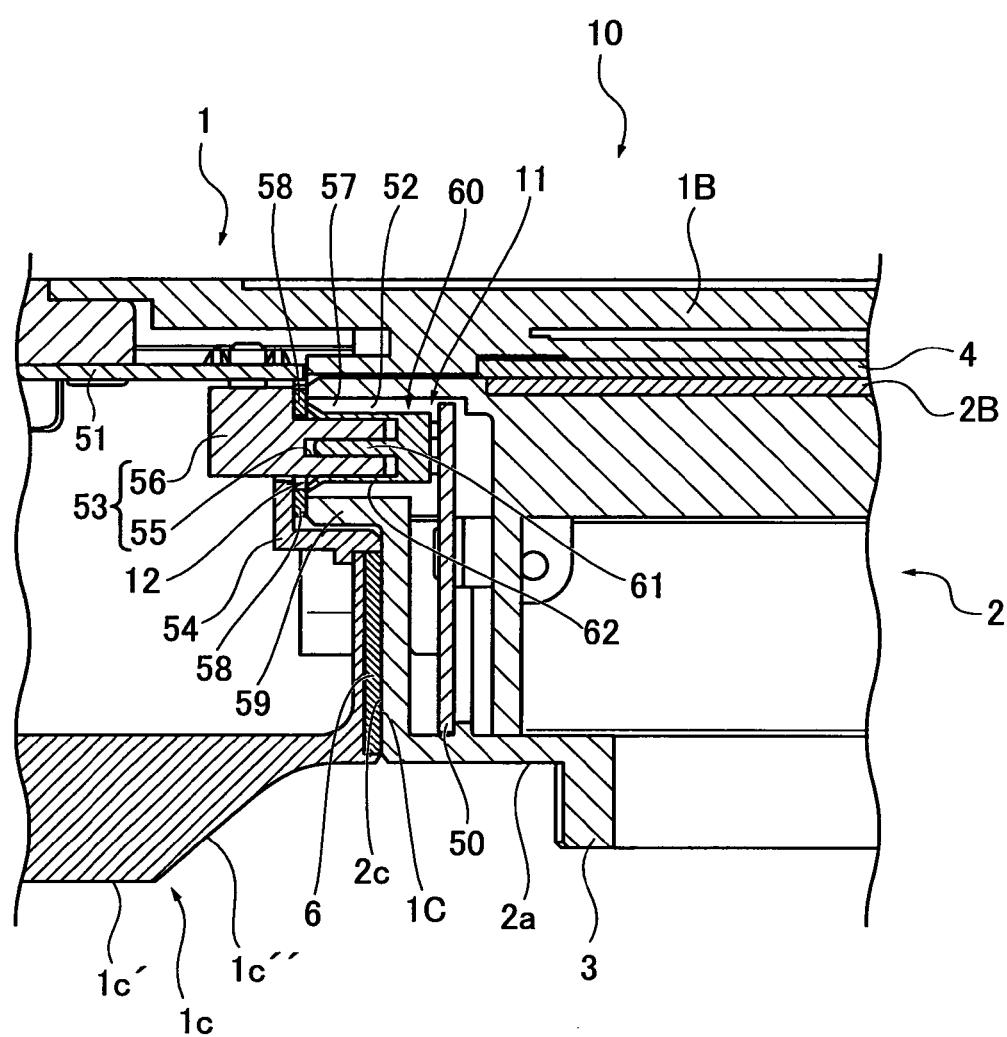
FIG. 23 is a cross sectional view similar to FIGS. 19 and 22 for illustrating a state that the connector portion of the camera body and a connector portion of the imaging unit are joined together.

The connector portion 11 is configured in such a manner that the connector main body 60 is disposed in the connector cover portion 59 which protrudes outwardly from the left side face 2c of the imaging unit 2 and extends in an upward and downward direction, as shown in FIGS. 4, 6 and 22.

The connector cover portion 59 is formed by a pair of upward and downward extending walls which protrude in a direction that the imaging unit 2 is approached from the left side face 2c to the side wall portion 1C and a pair of front and back extending walls which protrude in a direction that the imaging unit is approached from the left side face 2c to the side wall portion 1C so that an upper end and a lower end of the connector cover portion 59 are built thereover, and extends in a front and back direction (in a state that the imaging unit 2 is mounted on the camera body 1), and the same exhibits an elongate, rectangular and annular shape in an upwardly and downwardly direction. In the Example 1, the upward and downward extending wall is positioned in the back face side 2b among the pair of upward and, has a positional relationship in such a manner that it is flushed with the back face 2b (forming substantially the same plane), in order to correspond to the positional relationship of the connector portion 12 within the concave portion 1A of the camera body 1. The connector cover portion 59 is sized and configured in such a manner that a circumferential surface thereof is positioned inwardly of the fitting groove 57 in the connector portion 12, namely, it plays inside the fitting groove 57 in the connector portion 12. The connector main body 60 is disposed with being inwardly spaced from the connector cover portion 59.

As mentioned above, the connector main body 60 is electrically connected to the connector main body 53 of the connector portion 12 in the camera body 1. The connector main body 60 is configured in such a manner that the connector terminal 61 is surrounded by a surrounding member 62.

The connector terminal 61 is a connector terminal which is capable of establishing electrical connection with the connector terminal 55 of the connector main body 53 in the connector portion 12 by relatively moving the connector terminal 61 in a right and left direction (X direction). In the Example 1, a male type connector which is protruded in a left direction (a reverse direction relative to an arrow X) is used. The connector 61 is electrically connected to the connector circuit board 50 fixed to the imaging unit 2. The connector circuit board 50 is wired with an electric circuit such as a circuit for driving responding to control instructions from the camera body 1, a circuit for transferring photographed image data to the camera body 1 and so on.

The surrounding member 62 plays a role in preventing the electric circuits and electric devices and so on from electrostatically being destroyed due to the discharge of static electricity accumulated in a human body by means of human hand's contact, when mounting the imaging unit 2 on the camera body 1. The surrounding member 62 exhibits an annular shape which is spaced away from the connector terminal 61 and surrounds the same, and is configured to be capable of internally receiving the coating member 56 of the connector portion 12 in the camera body 1. Owing to this interval or gap, at both ends in an upwardly and downwardly direction (both ends when viewed from Y direction) in the connector portion 11 are formed with a pair of positioning holes 63, 63 which correspond to a pair of positioning protrusions 56a, 56a of the connector portion 12 between the connector terminal 61 and the surrounding member 62. For this reason, the connector main body 60 facilitates the insertion of the connector terminal 61 into the connector terminal 55 of the connector portion 12 so as to establish an electrical connection, by the guiding action of the pair of positioning hole 63, 63 and the pair of positioning protrusions 56a, 56a, while the connector main body 60 makes the connected state under which the coating member 56 is inwardly fitted into the surrounding member 62. (See FIG. 23).

As mentioned above, the connector portion 11 is joined to the connector portion 12 of the camera body 1, when the imaging unit 2 is properly mounted on the camera body 1. Herein, when the imaging unit 2 is mounted on the concave portion 1A of the camera body 1, the left side portion 2c of the case 2A is abut against the side wall portion 1C or the sheet metal member 6 to thereby position the imaging unit 2 in the right and left direction within the concave portion 1A. In this state, as mentioned above, the connector cover portion 59 of the connector portion 11 is located inside the fitting groove 57 without contacting the connector main body 60 and the connector main body 53 since the connector cover portion 59 is spaced away from the connector main body 60 and surrounds the connector main body 53, and is sized and configured that it plays inside the fitting groove 57 of the connector portion 12. The connector cover portion 59 is sized and configured to have a length that the connector cover portion 59 does not reach a bottom wall portion of the fitting groove 57 but brings the connector cover portion 59 into press-contact with the sealing member 58 provided in the fitting groove 57. Namely, when the imaging unit 2 is properly mounted on the concave portion 1A of the camera body 1, the sealing member 58 is thickly sized and configured to be brought into press-contact with a leading edge of the connector cover portion 59 with a pressing force sufficient to prevent the dust, the liquid and so on from being forcibly entered inwardly of the connector cover portion 59 of the connector main body 60 in the connector portion 11.

(Procedures for Mounting the Imaging Unit 2 on the Camera Body 1)

Next, procedures for mounting the imaging unit 2 to the camera body 1 (concave portion 1A) will be described.

The back wall portion 1B of the camera body 1 is adapted to be positioned in the lower side. For example, the camera body 1 is put on the left hand to be in a horizontal state. The imaging unit 2 is approached toward the camera body 1 from a direction indicated by an arrow F3 shown in FIG. 3 (a direction from an upper side to a lower side) to insert the pair of sliding contact ribs 23a, 23b into the pair of inserting contact grooves 13a, 13b, respectively.

Next, the imaging unit 2 is moved toward a direction indicated by an arrow F4 shown in FIG. 3 (a direction from right to left) to the camera body 1. Namely, the imaging unit 2 is moved toward the side wall portion 1C. In brief, the imaging unit 2 is approached to the side wall portion 1C from a direction perpendicular to the optical axis of the lens system. In this instance, the imaging unit 2 is moved while the sliding contact ribs 23a, 23b are brought into sliding contact with the upper edge wall 4a' and the lower edge wall 4b', with the pair of sliding contact ribs 23a, 23b remaining to be inserted into the pair of inserting grooves 13a, 13b, respectively. During this movement, the pair of engagement claws 23c, 23d approach the engagement plate portions 8a, 8b. The pair of engagement claws 23c, 23d are guided along the inclined wall 8c and face the engagement wall 8e upon abutting against the engagement plate portions 8a, 8b.

During mounting the imaging unit 2 on the camera body 1, the backlash of the camera body 1 with respect to the imaging unit 2 in an upward and downward direction can be reduced with the help of the actions of the sliding contact ribs 23a, 23b. If the imaging unit 2 is moved from the right to the left with respect to the camera body 1, the engagement claws 23c, 23d abut against the energizing leaf spring 8g. The imaging unit 2 is attracted and attached to the back wall portion 1B with the help of the action of the energizing leaf spring 8g. Whereby the backlash of the imaging unit 2 in an upward and downward direction can be reduced. Further, during moving operation, since the front and back movement of the engagement claws 23c, 23d are regulated by means of the protrusion 8f shown in FIG. 12 (a direction indicated by an arrow F1 shown in FIG. 12), the backlash of the imaging unit 2 in an upward and downward direction can be further reduced.

The auxiliary fitting protrusion 14 is fitted into the auxiliary fitting hole 22 concurrently with the abutment of the pair of energizing leaf spring 8g and the pair of engagement claws 23c, 23d. Upon the sliding contact ribs 23a, 23b being brought into sliding contact with the upper edge wall 4a' and the lower edge wall 4b' and moved, the left side face 2c of the case 2A is attachable/detachable to/from the side wall portion 1C while an engageable position of the auxiliary fitting protrusion 14 to the auxiliary fitting hole 22 remains unchanged. The positioning of the imaging unit 2 is made in the right and left direction (X direction) within the concave portion 1A by abutting the left side face 2c of the case 2A against the side wall portion 1C or the sheet metal member 6. Further, upon the sliding contact ribs 23a, 23b being brought into sliding contact with the upper edge wall 4a' and the lower edge wall 4b' and moved, the left side face 2c of the case 2A is attachable/detachable to/from the side wall portion 1C while an engageable (joinable) position of the connector portion 11 and the connector portion 12 remains unchanged. The sliding contact ribs 23a, 23b serves as a guiding device when the imaging unit 2 is mounted on the camera body 1.

The auxiliary fitting protrusion 14 and the auxiliary fitting hole 22 makes the substantial positioning control of the connector portion 11 with respect to the connector portion 12. Next, the connector cover 59 of the connector portion 11 plays in the fitting groove 57 of the connector portion 12, and the connector main body 60 of the connector portion 11 faces the connector main body 53 of the connector 12 at a proper position by the guiding action of the pair of positioning hole 63, 63 and the pair of positioning protrusions 56a, 56a. Next, the imaging unit 2 is positioned within the concave portion 1A in the right and left direction, the connector main body 60 of the connector portion 11 is properly connected to the connector main body 53 of the connector 12 and thus the camera body 1 and the imaging unit 2 are electrically and communicatibly connected. In this instance, the tip end of the connector cover 9 of the connector portion 11 is brought into press contact with the sealing member 58 provided in the fitting groove 57 of the connector portion 12. Whereby the sealing member 58 is compressed between the tip end of the connector cover portion 59 and the fitting groove 57. Meanwhile, when fitting the auxiliary fitting protrusion 14 and the auxiliary fitting hole 22, since a shock absorbing member 22a is provided at the bottom portion of the auxiliary fitting hole 22, a shock motion due to the impact of the camera body 1 and the imaging unit 2 can be reduced. The backlash in a front and back direction can be reduced with the help of the auxiliary fitting protrusion 14 and the auxiliary fitting hole 22.

On the one hand, when the inclined wall 2p' of the claw to be locked 2p abuts against the inclined wall 25' of the locking claw 25c and the thus caused a component force is greater than a rotational urging force of the locking member 25 by means of not shown energizing member, the locking member 25 is rotated in a direction opposed to a direction (a direction indicated by an arrow F2 in FIG. 14) toward which the rotational urging force of the locking member 25 around the supporting shaft 27 operates.

Next, if the inclined wall 2p' of the claw to be locked 2p gets over, the locking member 25 returns to its original position. As a result, the locking claw 25c enters the notch portion 2n and the claw to be locked 2p enters the notch portion 25b. Whereby, the locking claw 25c and the claw to be locked 2p are engaged with each other, the imaging unit 2 is locked against the camera body 1 in the right and left direction. The backlash of the camera body 1 and the imaging unit 2 in the right and left direction is constrained by the locking claw 25c as a locking claw and the claw to be locked 2p as a member to be locked.

As such, the imaging unit 2 may be properly mounted on (the concave portion 1A of) the camera body 1.

In this Example 1, since, when the imaging unit 2 is properly mounted on the concave portion 1A of the camera body 1, in the connector portions 11 and 12 which are connected with each other, a tip end of the connector cover portion 59 of the connector portion 11 presses contact with the sealing member 58 provided the fitting groove 57 of the connector portion 12, it is possible to prevent the dust, the liquid and so on from being forcibly entered inwardly of the connector cover portion 59 of the connector main body 60 in the connector portion 12 from the concave portion 1A. Whereby, it is possible to make dust-protected and waterproofed (dripproofed) between both connector portions 11 and 12.

Further, a dust-proof, waterproof (drip-proof) structure of the connector portion 1 in the Example 1 makes dust-proof and waterproof (drip-proof) between the connector portions 11 and 12 which are connected with each other and thus the structure aims at a considerably narrow area. Thus, it is possible to make the structure a simple and compact one. Namely, the side wall portion 1C of the camera body 1 is formed with a fitting groove portion 52 and the connector portion 12 is formed with a fitting groove 57, as well as the fitting groove 57 of the connector portion 12 is provided with the sealing member 58 which is brought into press contact with the fitting groove 57 of the connector portion 12. Thus, this realizes a simple structure.

Further, in the dust-protection and waterproof (drip-proof) structure of the connector portion, since a part or parts which compose(s) the structure is/are not provided in a sliding face to make a relative movement (slide movement) in order to mount the imaging unit 2 on the concave portion 1A in the camera body 1 of the imaging unit 2, it is possible to prevent the relative movement (slide movement) from being obstructed when the imaging unit 2 is mounted on the concave portion 1A in the camera body 1.

Next, in the dust-protection and waterproof (drip-proof) structure, the left side face 2c of the case 2A abuts against the side wall portion 1C or the sheet metal member 6 and thus the imaging unit 2 is positioned within the concave portion 1A in the right and left direction (X direction), as well as the tip end of the connector cover portion 9 of the connector portion 11 is not configured to reach the fitting groove 57 of the connector portion 12 (if the sealing member 58 is not present, the former is never abut against the latter). For example, if an excess force is applied when the imaging unit 2 is mounted on the camera body 1, since the force acts in such a manner that the left side face 2c of the case 2A presses the side wall portion 1C or the sheet metal member 6, it is possible to prevent the forcible force from being applied to the connector portions 11 and 12.

In the dust-protection and waterproof (drip-proof) structure of the connector portion, the sealing member 58 is provided on the camera body 1. Thus, every the imaging unit 2 to be exchanged does not need to equip with such sealing member 58. For this reason, the structure of the imaging unit 2 is further simplified and thus it is possible to reduce the costs.

In the dust-protection and waterproof (drip-proof) structure of the connector portion, the sealing member 58 is provided in the fitting groove portion 52 (a bottom wall face of the fitting groove 57) which is configured to be inwardly of the concave portion 1A (recessed). For this reason, an unexpected contact is prevented and it is possible to obtain the advantageous merits of proper dust-proof and waterproof (drip-proof) over a long period of time.

For these reasons, the adoption of the dust-protection and waterproof (drip-proof) structure of the connector portion specially need not the adoption of a large-scale structure. For this reason, this does not cause an increase in the size of the imaging unit 2 and the camera body 1 and thus it is possible to obtain the advantageous merits of positive dust-protection and waterproof (drip-proof) only by mounting the imaging unit 2 on the camera body 1. Also for this reason, it is possible to enhance the durability of the imaging unit 2 and the camera body 1, in particular the connector portions 11 and 12, as well as electrical components which leads to these components.

In addition, in the Example 1, in a state that the imaging unit 2 is locked against the camera body 1, the pair of engagement claws 23c, 23d are securely engaged with the engagement plate portions 8a, 8b. Since the pair of engagement plate portions 8a, 8b are formed at positions which are spaced away in the right and left direction with respect to the pair of auxiliary fitting protrusions 14, 14, if the imaging unit 2 is pull out toward a front side with respect to the camera body 1, a force accompanied by the pulling-out is dispersed and the pulling-out is securely prevented. Further, it is possible to prevent the forcible force accompanied by the pulling-out from being applied to the connector portions 11 and 12.

In the Example 1, if a user will forcibly pull out the imaging unit 2 toward the lower right by holding a lower side portion of the right side of the imaging unit 2 by his hands, the pulling-out is prevented by the pair of auxiliary fitting protrusions 14, 14 and the pair of engagement claws 23c, 23d, as well as the locking mechanism 24. Whereby, the application of the forcible force accompanied by the pulling-out is prevented from being applied.

In the Example 1, since the mechanical fixing of the camera body 1 and the imaging unit 2 by means of the locking mechanism 24 and the electrical connection by the connector portions 11 and 12 are completed almost at the same time, it is possible to briefly and easily perform the mounting operation of the imaging unit 2 on the camera body 1.

(Procedures for Removing the Imaging Unit 2 from the Camera Body 1)

Next, the procedures for removing the imaging unit 2 from the camera body 1 (the concave portion 1A thereof) will be described.

In a state that the imaging unit 2 is disposed in the concave portion 1A, when the imaging unit 2 is viewed from a front side, the unlock button 26d is operated or shifted toward the right direction (a direction of an arrow F5 shown in FIG. 5). Whereby, the unlocking operation member 26 is rotated around the supporting shaft 27 as a fulcrum in a direction opposed to the rotatable urging force of the unlocking spring 28 (a direction opposed to an arrow F2 indicated in FIG. 14). Then, the unlock protrusion 26b abuts against the side face 25f of the locking member 25. The locking member 25 is rotated around the supporting shaft 27 as a fulcrum in a direction toward which the locking member 25 is away from the notch portion 2n by the rotation in a direction opposed to that of the rotatable urging force of the unlocking spring 28 (a direction opposed to an arrow F2 indicated in FIG. 14). Whereby, the engagement of the locking claw 25c and the claw to be locked 2p is released. Namely, the lock of the imaging unit 2 against the camera body 1 is released. In this state, the imaging unit 2 is moved from the camera body 1 in a direction from the left to the right (a direction of an arrow F4' indicated in FIGS. 1 and 3). Then, the engagement of the connector portions 11 and 12 is released and the engagement of the auxiliary fitting protrusions 14, 14 and the auxiliary fitting holes 22, 22 is also released.

The imaging unit 2 is moved from the left to the right (in FIGS. 1 and 3) until the sliding contact ribs 23a, 23b abut against the stopper wall 8d. After that, the imaging unit 2 is moved away from the back wall portion 1B (a direction opposed to a direction indicated by F3 in FIG. 3). Whereby, the removal of the imaging unit 2 relative to the camera body 1 is completed. Meanwhile, the unlocking operation member 26 returns to its original position by means of the urging force of the unlocking spring 28 once the fingers are separated from the unlock button 26d. Further, the locking member 25 is also returned to its original position by means of the not shown rotatable urging force.

As such, in the Example 1, since a state in which the upper wall portion 1D is positioned in the upper side and the lens system is used toward the subject which is located in the front side of the camera, is defined as a normal using state. Even if the photographer grasps the grip portion 1c by his right hand, since, in this normal using state, the right direction which is difficult for the user to operate is adapted to be an unlock operating direction, it is possible to reduce the possibility that the imaging unit 2 is fallen down from the camera body 1 due to the miss operation caused when using the camera.

As such, in the Example 1, the dust-proof and waterproof (drip-proof) structure of the connector portion does not have any serious effect to the removal of the imaging unit 2 from the camera body 1. For this reason, the prevention of the dust, the liquid and so on from being attracted and attached inwardly to the connector cover portion 59 of the connector main body 60 in the connector portion 12 from the concave portion 1A is possible, while the imaging unit 2 can be easily removed from the camera body 1.

Further, in the Example 1, since a state in which the upper wall portion 1D is positioned in the upper side and the lens system is used toward the subject which is located in the front side of the camera, is defined as a normal using state, as well as, in this normal using state, the right direction which is difficult for the user to operate is adapted to be an unlock operating direction, it is possible to reduce the possibility that the imaging unit 2 is fallen down from the camera body 1 due to the miss operation caused when using the camera.

Second Example

Next, an imaging unit 10H (a camera body 1H and an imaging unit 2H) according to a second Example of the present invention will be described below. The dust-proof and waterproof (drip-proof) structures of the connector portion in the camera body 1H and the imaging unit 2H of the second Example are different from those of the first Example, respectively. The essential structures of the camera body 1H and the imaging unit 2H of the second Example are similar to the camera body 1 and the imaging unit 2 of the first Example and thus the same functional parts as those of the first Example have the same reference numerals as those of the first Example to thereby omit the detailed description thereabout.

Figure 24:
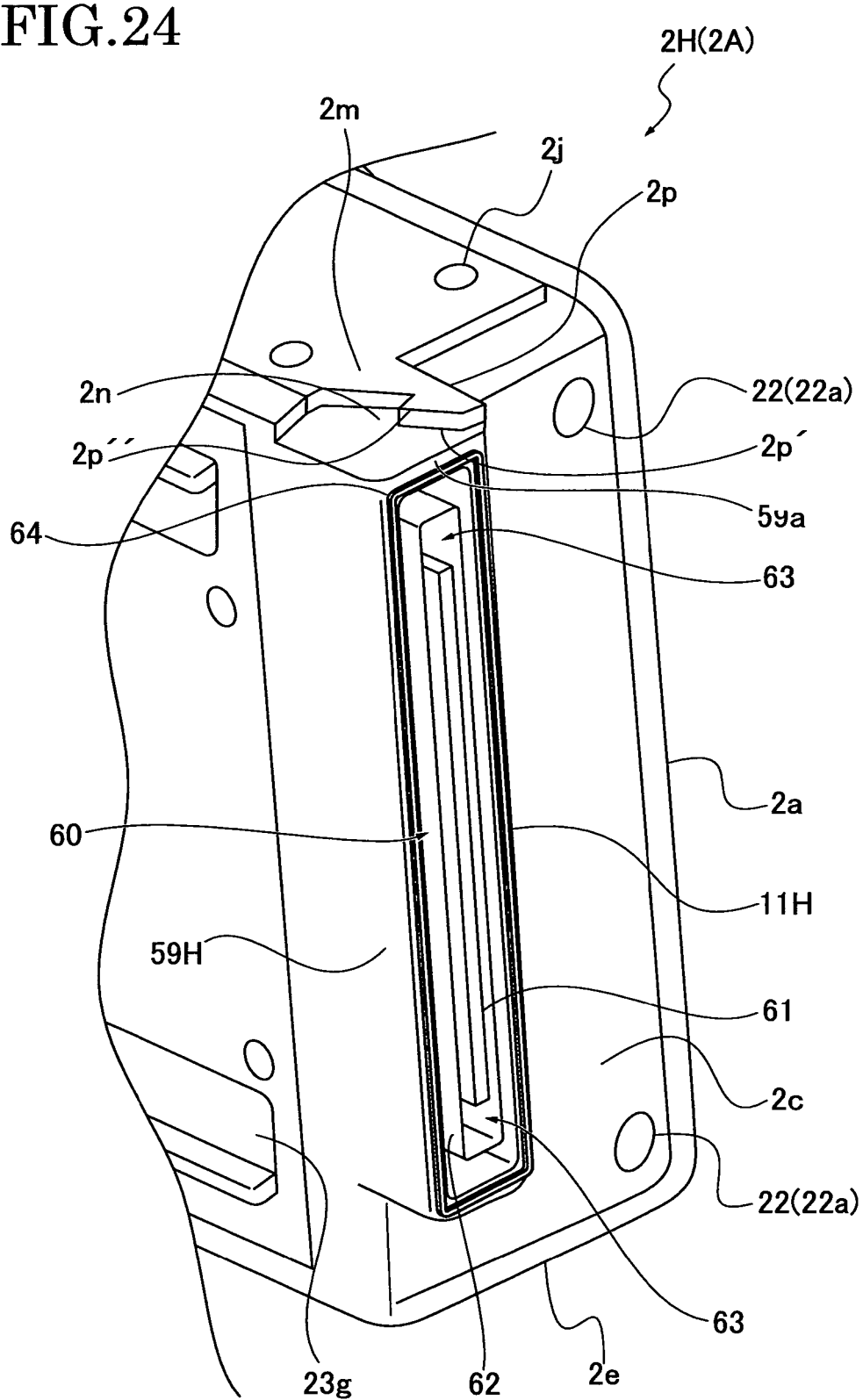
FIG. 24 is a perspective view similar to FIG. 6 illustrating the imaging unit in the Second Example.
Figure 25:
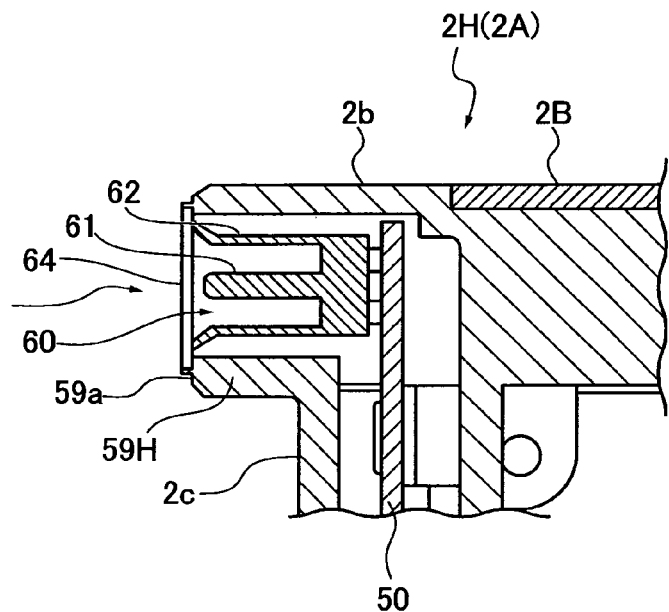
FIG. 25 is a cross sectional view enlarging a periphery thereof for illustrating a rib in the imaging unit according to the Second Example and similar to FIG. 19.

As shown in FIGS. 24 and 25, a rib 64 is provided at a tip end of a connecter cover portion 59H of a connector portion 11H in the imaging unit 2H. The connector cover portion 59H and the leading face 59a exhibit a long, elongate and annular shape in an upward and downward direction when the left side face 2c of the imaging unit 2 is looked in face. The leading face 59a of the long, elongate and annular shaped connector cover portion 59H is provided with a rib 64. The rib 64 has a width narrower than that of the leading face 59a and formed at the middle position across the widthwise direction of the annular shaped leading face 59a. The rib 64 is protruded from the leading face 59a of the connector cover portion 59H in the same direction as a directionward which the connector cover portion 59H extends and extends around the entire circumference of the connector cover portion 59H.

Although the camera body 1 has the same structure as that of the camera body 1 according to the first Example of the present invention, a sealing member 58H (See FIG. 26) is configured to have a different thickness from that of the sealing member 58 according to the first Example. This is why the leading end of the connector cover portion 59H of the connector portion 11H in the imaging unit 2H is provided with the rib 64.

Figure 26:
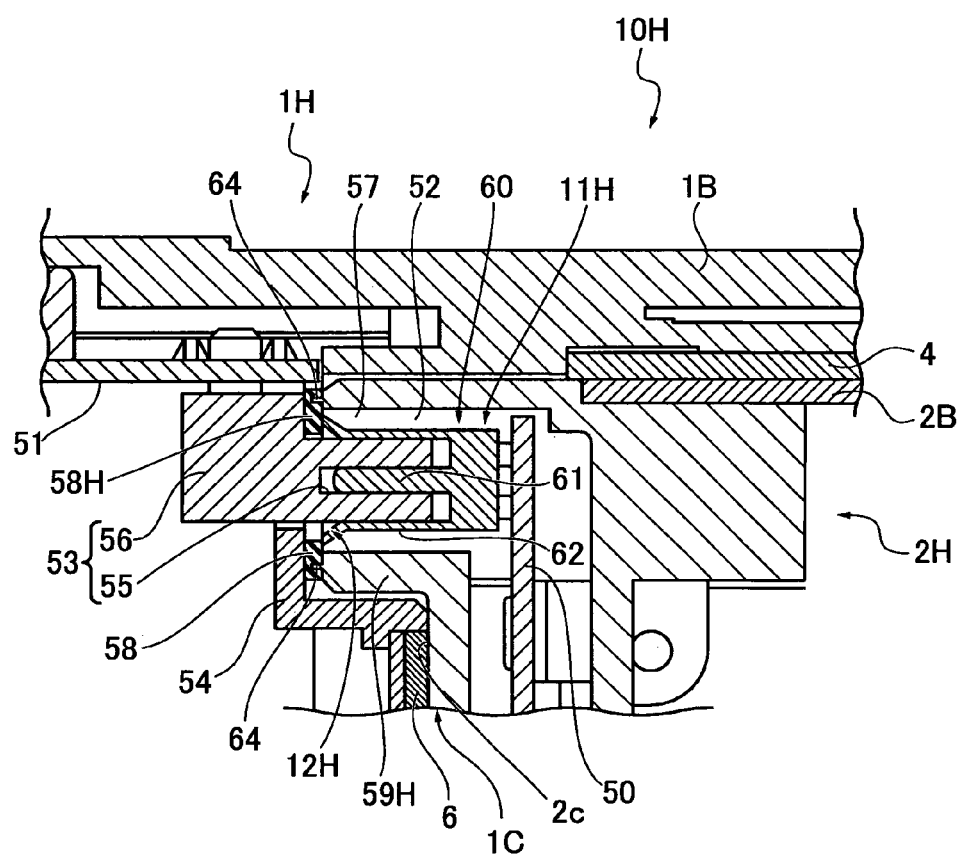
FIG. 26 is a cross sectional view similar to FIG. 23 for illustrating a state that the connector portion of the camera body and the connector portion of the imaging unit according to the Second Example are joined together.

As shown in FIG. 26, the imaging unit 2 according to the second Example is mounted on/removed from the camera body 1 similar to the first Example. In a state that the imaging unit 2H is mounted on the concave portion 1A of the camera body 1, the connector cover portion 59H of the connector portion 11H in the imaging unit 2H is loosely fitted into the fitting groove portion 57 of the connector portion 12 in the camera body 1H, the connector main body 60 of the connector portion 11H is properly connected to the connector main body 53 of the connector portion 12 by the guiding action of the pair of positioning holes 63, 63 and the pair of positioning protrusions 56a, 56a and thus the camera body 1H and the imaging unit 2H are electrically and communicatably connected with each other. The leading end of the connector cover portion 59H of the connector portion 11H is then press-contacted with the sealing member 58H provided in the fitting groove 57H of the connector portion 12 and the leading end or the rib 64 of the connector cover portion 59H is sunk into the sealing member 58H (the sealing member 58 is partially compressed). As such, it is possible to securely seal between the leading end of the connector cover portion 59H and the sealing member 58H by sinking the leading end or the rib 64 of the connector cover portion 59H into the sealing member 58H. For this reason, in an annular area in which the leading end or the rib 64 of the connector cover portion 59H is sunk into the sealing member 58H, it is possible to prevent the dust, the liquid and so on from being entered from the concave portion 1A inwardly of the connector cover portion 59H of the connector main body 60H of the connector portion 11H in the imaging unit 2H. From the above, the sealing member 58H of the camera body 1H according to the second Example may be set to a thickness sufficient to seal between the connector portions 11 and 12 due to the sinking of the rib 64.

In the camera body 1H and the imaging unit 2H according to the second Example, essentially it is possible to obtain the similar advantageous merits to those of the camera body 1 and the imaging unit 2 according to the first Example. In addition thereto, since the connector cover portion 59H of the imaging unit 2 may only be sunk into the sealing member 58H of the camera body 1H, it is possible to further reduce the relative pressing force of the imaging unit 2H into the camera body 1H toward the mounting direction. Whereby, the mount of the imaging unit 2H on the camera body 1H and the removal of the imaging unit 2 from the camera body 1 can be easily facilitated.

Third Example

Next, an imaging unit 10I (a camera body 1I and an imaging unit 2I) according to a third Example of the present invention will be described below. The dust-proof and water-proof (drip-proof) structures of the connector portion in the camera body 1I and the imaging unit 2I of the third Example are different from those of the first and second Examples, respectively. The essential structures of the camera body 1I and the imaging unit 2I of the third Example are similar to the camera body 1 and the imaging unit 2 of the first Example and thus the same functional parts as those of the first Example have the same reference numerals as those of the first Example to thereby omit the detailed description thereabout.

Figure 27:
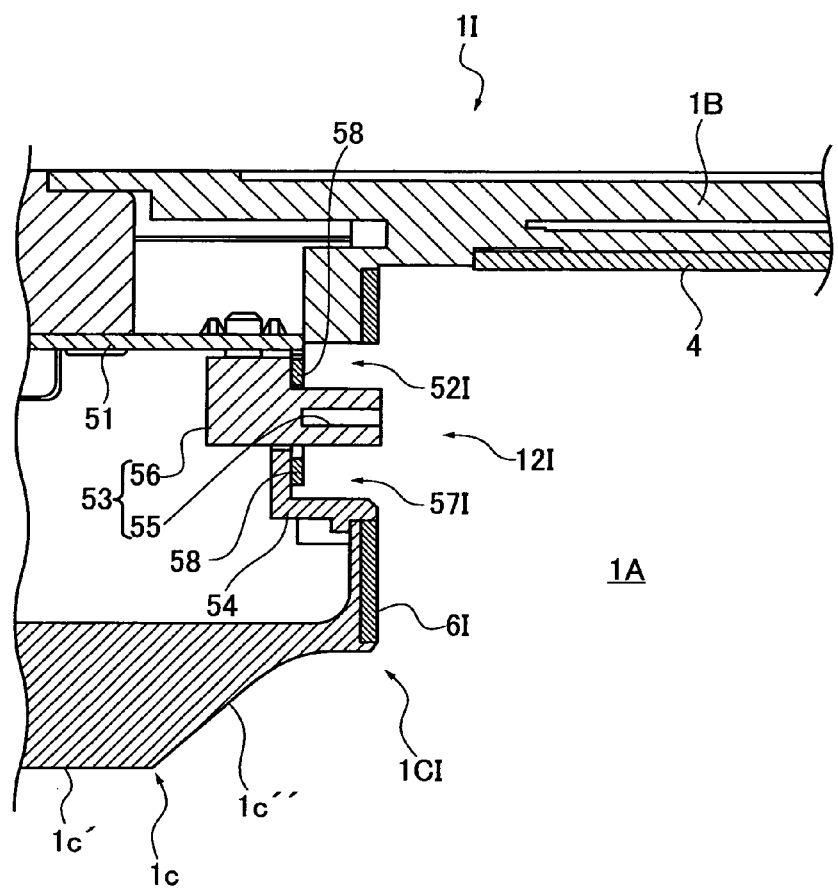
FIG. 27 is a cross sectional view similar to FIG. 19 for illustrating the connector portion in the camera body according to the Third Example.
Figure 28:
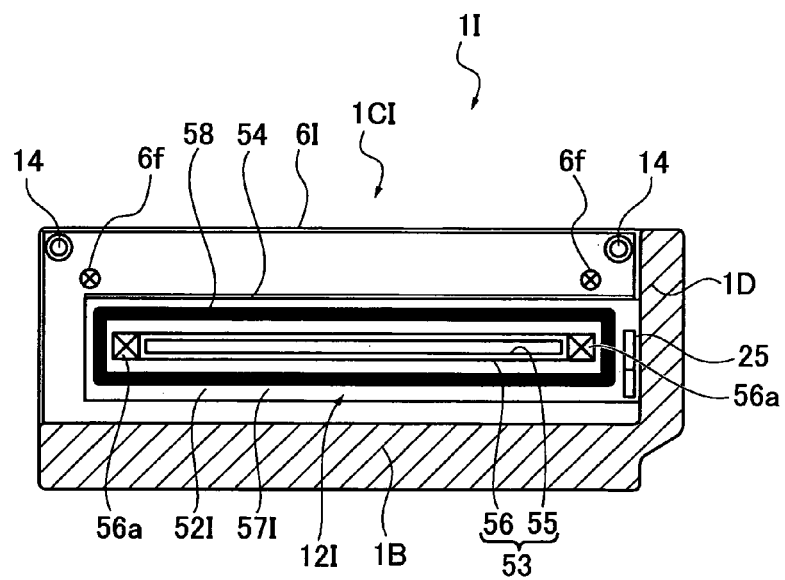
FIG. 28 is a cross sectional view similar to FIG. 20 for illustrating the connector portion in the camera body according to the Third Example.

As shown in FIGS. 27 and 28, in the camera body 1I, the position at which the fitting groove portion 52I is formed, where the connector main body 53 of the connector portion 12I is disposed, is different from the first Example. Specifically, the fitting groove portion 52I is positioned in the middle position from the back wall portion 1B to the side wall portion 1D (a position is spaced away from the back wall portion 1B toward the subject side), when the back wall portion 1B is positioned in the lower side, the upper wall portion 1D is positioned in the right side and further the front side thereof is positioned in the upper side, finally the sheet metal member 6 is looked in the face. For this reason, when looking in the face, the sheet metal member 61 exhibits a generally U-shape (rectangular with one end thereof being opened) which avoids the fitting groove portion 52I and covers the side wall portion 1CI. The connector main body 53 which is disposed in the fitting groove portion 52I is similar to that according to the first Example except that the positional relationship is different.

Figure 29:
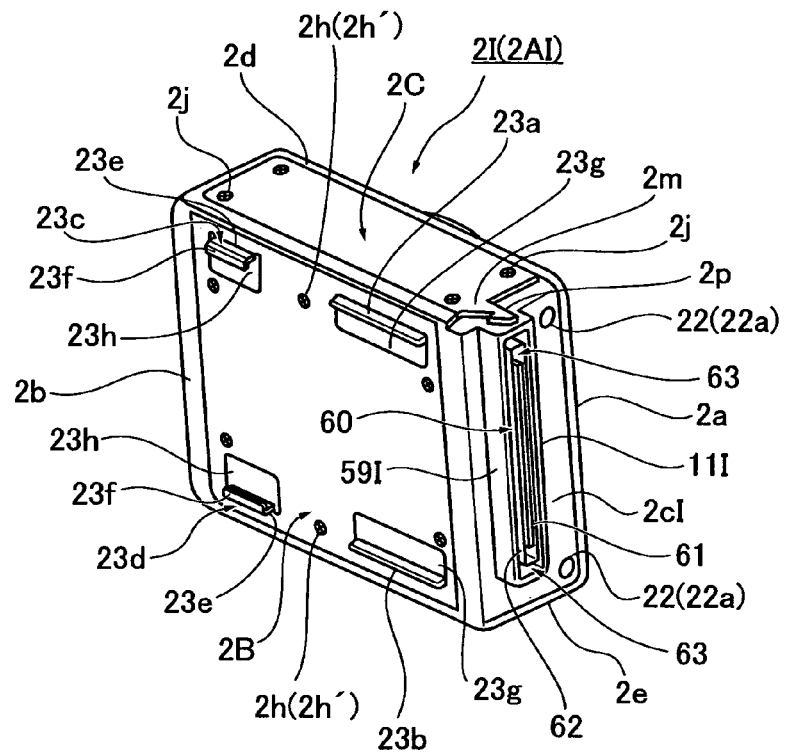
FIG. 29 is a perspective view similar to FIG. 6 illustrating the imaging unit according to the Third Example.
Figure 30:
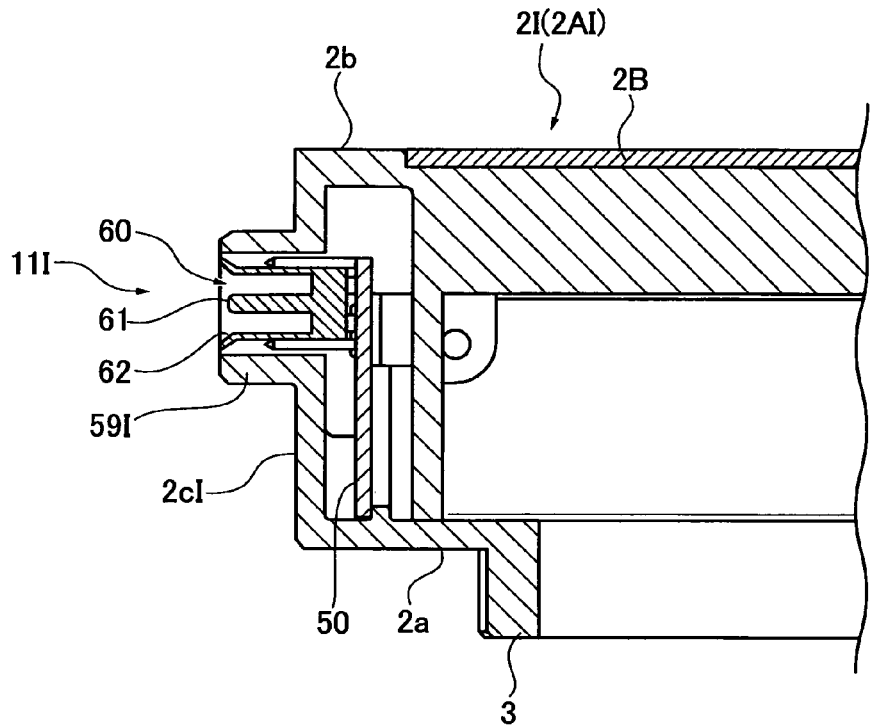
FIG. 30 is a cross sectional view similar to FIG. 19 for illustrating the imaging unit according to the Third Example.

As shown in FIGS. 29 and 30, the connector portion 11I of the imaging unit 2I is adapted to the structure of the connector portion 12I of the camera body 1I. Although an essential structure of the connector portion 11I is similar to that of the first Example but a position of the left side face 2cI is different from that of the first Example. Specifically, when the left side face 2cI is looked in the face, the connector cover portion 59I in which the connector main body 60 is disposed, is positioned in the middle (the middle position between the back face 2bI and the front face 2a in the case 2AI) of the front and back direction (Z direction) of the camera body 1I. The spaced amount of the connector cover portion 59I from the back face 2b agree with that of the fitting groove portion 52I of the connector portion 12I in the camera body 1I from the back wall portion 1B.

Figure 31:
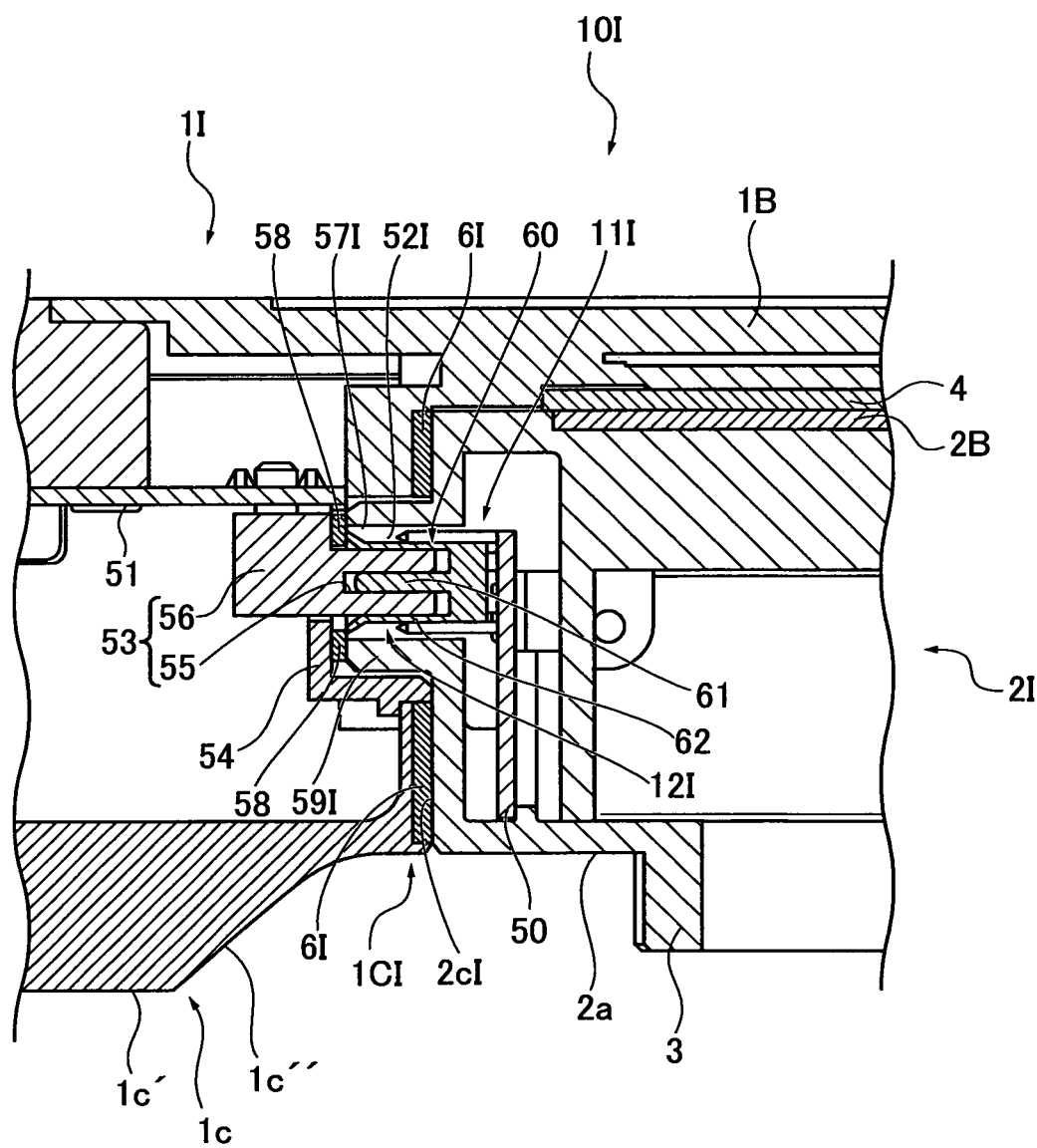
FIG. 31 is a cross sectional view similar to FIG. 23 for illustrating a state that the connector portion of the camera body and the connector portion in the imaging unit according to the Third Example are joined together.

As shown in FIG. 31, similar to the first Example, the camera body 1I and the imaging unit 2I according to the third Example are configured to be capable of mounting/removing the imaging unit 2I on/from the camera body 1I. In a state that the imaging unit 2I is mounted on the camera body 1I, similar to the first Example, the left side face 2cI of the case 2AI is abut against the side wall portion 1CI or the sheet metal member 6I and the positioning of the imaging unit 2I in the right and left direction (X direction) is made. Further, in a state that the imaging unit 2I is mounted on the concave portion 1A of the camera body 1I, the connector cover portion 59I of the connector portion 11I in the imaging unit 2I is loosely fitted into the fitting groove portion 57 of the connector portion 12I in the camera body 1I, the connector main body 60 of the connector portion 11I is properly connected to the connector main body 53 of the connector portion 12I by the guiding action of the pair of positioning holes 63, 63 and the pair of positioning protrusions 56a, 56a and thus the camera body 1I and the imaging unit 2I are electrically and communicatably connected with each other. The leading end of the connector cover portion 59I of the connector portion 11I is then press-contacted with the sealing member 58I provided in the fitting groove 57I of the connector portion 12I (the sealing member 58I is partially compressed). As such, it is possible to prevent the dust, the liquid and so on from being forcibly entered inwardly of the connector cover portion 59I of the connector main body 60I in the connector portion 11I of the imaging unit 2I from the concave portion 1A of the camera body 1I.

Figure 32:
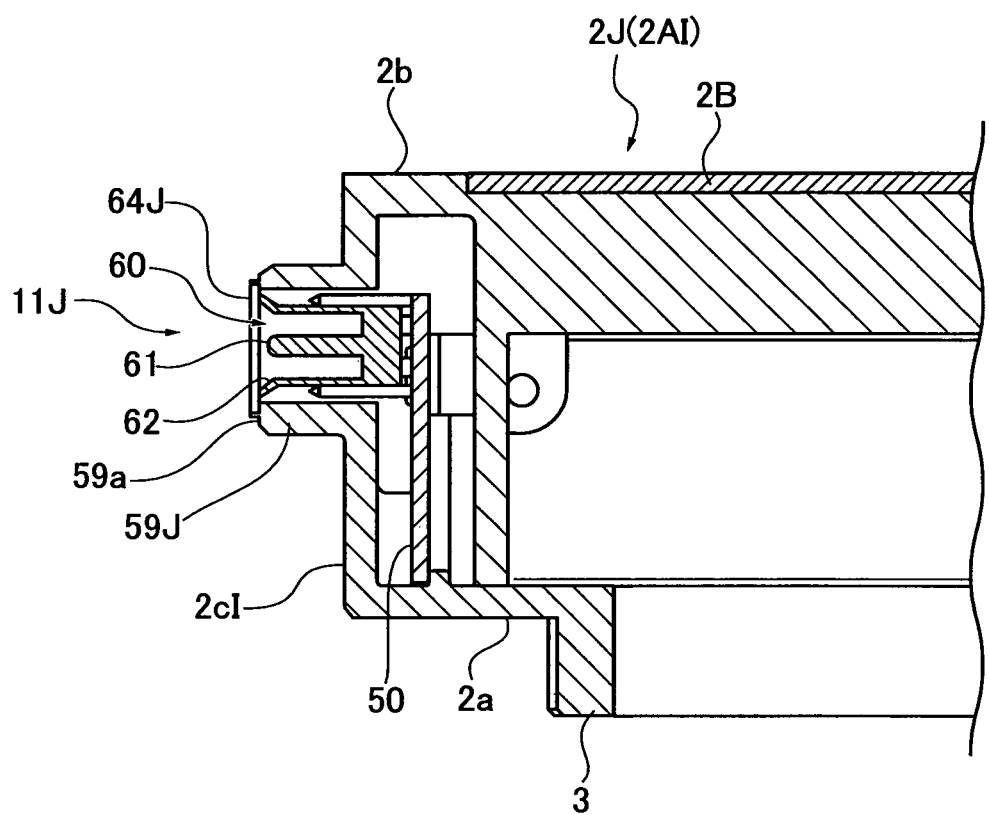
FIG. 32 is a cross sectional view similar to FIG. 19 for illustrating the imaging unit according to the Fourth Example.

In the camera body 1I and the imaging unit 2I according to the third Example, basically, it is possible to obtain the similar advantageous merits to the camera body 1 and the imaging unit 2 according to the first Example. In addition thereto, the following advantageous merits are obtained. In a state that the imaging unit 2I is properly mounted on the concave portion 1A of the camera body 1I, the position of the imaging unit 2I within the concave portion 1A is similar to that according to the first Example, the left side face 1CI of the case 2AI is abut against the side wall portion 1C or the sheet metal member 61, and the positioning of the imaging unit 2I within the concave portion 1A is made. The left side face 2cI and the side wall portion 1CI (sheet metal member 6I) abut against both side of the mutually connected portions 11 and 12 when viewed from the front and back direction (Z direction) in such a manner that they sandwich the connector portions 11 and 12 (when FIG. 32 is looked in the face, the upper side and the lower side of the connector portions 11I and 12I). For this reason, in the dust-proof and waterproof (drip-proof) structures of the connector portions according to the third Example, since the left side face 2cI of the case 2AI is adapted to be abut against the side wall portion 1CI or the sheet metal member 6I, it is possible to enhance the stability of the imaging unit 2I within the concave portion 1A (the case 2AI). From the above, it is possible to effectively prevent the forcible force from being applied to the connector portions 11 and 12.

Fourth Example

Next, an imaging unit 10J (a camera body 1J and an imaging unit 2J) according to a fourth Example of the present invention will be described below. The dust-proof and waterproof (drip-proof) structures of the connector portion in the camera body 1J and the imaging unit 2J of the fourth Example are different from those of the first to third Examples, respectively. The essential structures of the camera body 1J and the imaging unit 2J of the fourth Example are similar to the camera body 1I and the imaging unit 2I of the third Example and thus the same functional parts as those of the third Example have the same reference numerals as those of the third Example to thereby omit the detailed description thereabout.

As shown in FIG. 32, a rib 64J is provided at a tip end of a connecter cover portion 59J of a connector portion 11J of the imaging unit 2J. The connector cover portion 59J and the leading face 59a exhibit a long, elongate and annular shape in an upward and downward direction when the left side face 2cI of the imaging unit 2J is looked in the face. The leading face 59a of the long, elongate and annular shaped connector cover portion 59J is provided with the rib 64. The rib 64J has a width narrower than that of the leading face 59a and formed at the middle position across the widthwise direction of the annular shaped leading face 59a. The rib 64J is protruded from the leading face 59a of the connector cover portion 59J in the same direction as a directionward which the connector cover portion 59J extends and extends around the entire circumference of the connector cover portion 59J.

Although the camera body 1J has the same structure as that of the camera body 1I according to the third Example of the present invention, a sealing member 58J (See FIG. 33) is configured to have a different thickness from that of the sealing member 58I according to the third Example. This is why the leading end of the connector cover portion 59J of the connector portion 11J in the imaging unit 2J is provided with the rib 64J.

Figure 33:
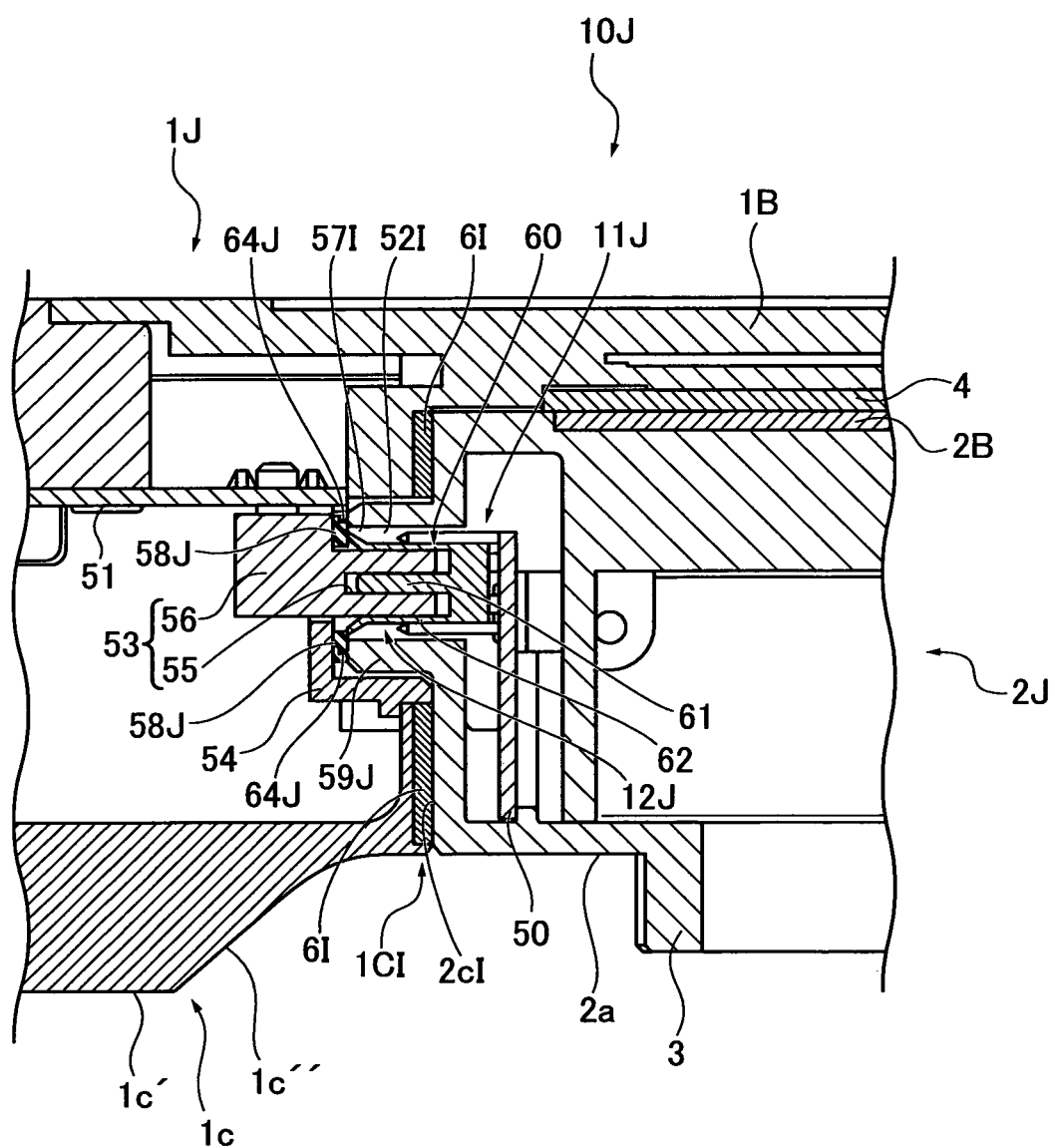
FIG. 33 is a cross sectional view similar to FIG. 23 for illustrating a state that the connector portion in the camera body and the connector portion in the imaging unit are joined together.

As shown in FIG. 33, in the camera body 1J and the imaging unit 2J according to the fourth Example, basically, similar to the camera body 1I and the imaging unit 2I according to the third Example, it is possible to mount/remove the imaging unit 2J on/from the camera body 1J. In a state that the imaging unit 2J is mounted on the concave portion 1A of the camera body 1J, the connector cover portion 59J of the connector portion 11J in the imaging unit 2J is loosely fitted into the fitting groove 57I of the connector portion 12J in the camera body 1J. The connector main body 60 of the connector portion 11J is properly connected to the connector main body 53 of the connector portion 12J by the guiding action of the pair of positioning holes 63, 63 and the pair of positioning protrusions 56a, 56a and thus the camera body 1J and the imaging unit 2J are electrically and communicatably connected with each other. The leading end of the connector cover portion 59J of the connector portion 11H is then press-contacted with the sealing member 58J provided in the fitting groove 57I of the connector portion 12J and the leading end or the rib 64J of the connector cover portion 59J is sunk into the sealing member 58J (the sealing member 58J is partially compressed). As such, it is possible to securely seal between the leading end of the connector cover portion 59J and the sealing member 58J by sinking the leading end or the rib 64J of the connector cover portion 59J into the sealing member 58J. For this reason, in an annular area in which the leading end or the rib 64J of the connector cover portion 59J is sunk into the sealing member 58J, it is possible to prevent the dust, the liquid and so on from entering from the concave portion 1A of the camera body 1J inwardly of the connector cover portion 59J of the connector main body 60J of the connector portion 11J in the imaging unit 2J. From the above, the sealing member 58J of the camera body 1J according to the third Example may be set to a thickness sufficient to seal between the connector portions 11J and 12J due to the sinking of the rib 64J.

In the camera body 1J and the imaging unit 2J according to the fourth Example, basically, it is possible to obtain the similar advantageous merits to the camera body 1I and the imaging unit 2I according to the third Example. In addition thereto, since the rib 64J of the connector cover portion 59J in the imaging unit 2J may be only sunk into the sealing member 58J of the camera body 1J, it is possible to further reduce the relative pressing force of the camera body 1J and the imaging unit 2J toward the mounting direction. Whereby, the mount of the imaging unit 2J on the camera body 1J and the removal of the imaging unit 2J from the camera body 1J can be easily facilitated.

Fifth Example

Next, an imaging unit 10K (a camera body 1K and an imaging unit 2K) according to a fifth Example of the present invention will be described below. The dust-proof and waterproof (drip-proof) structures of the connector portion in the camera body 1K and the imaging unit 2K of the fifth Example are different from those of the first to fourth Examples, respectively. The essential structures of the camera body 1K and the imaging unit 2K of the fifth Example are similar to the camera body 1I and the imaging unit 2I of the third Example and thus the same functional parts as those of the third Example have the same reference numerals as those of the third Example to thereby omit the detailed description thereabout.

Figure 34:
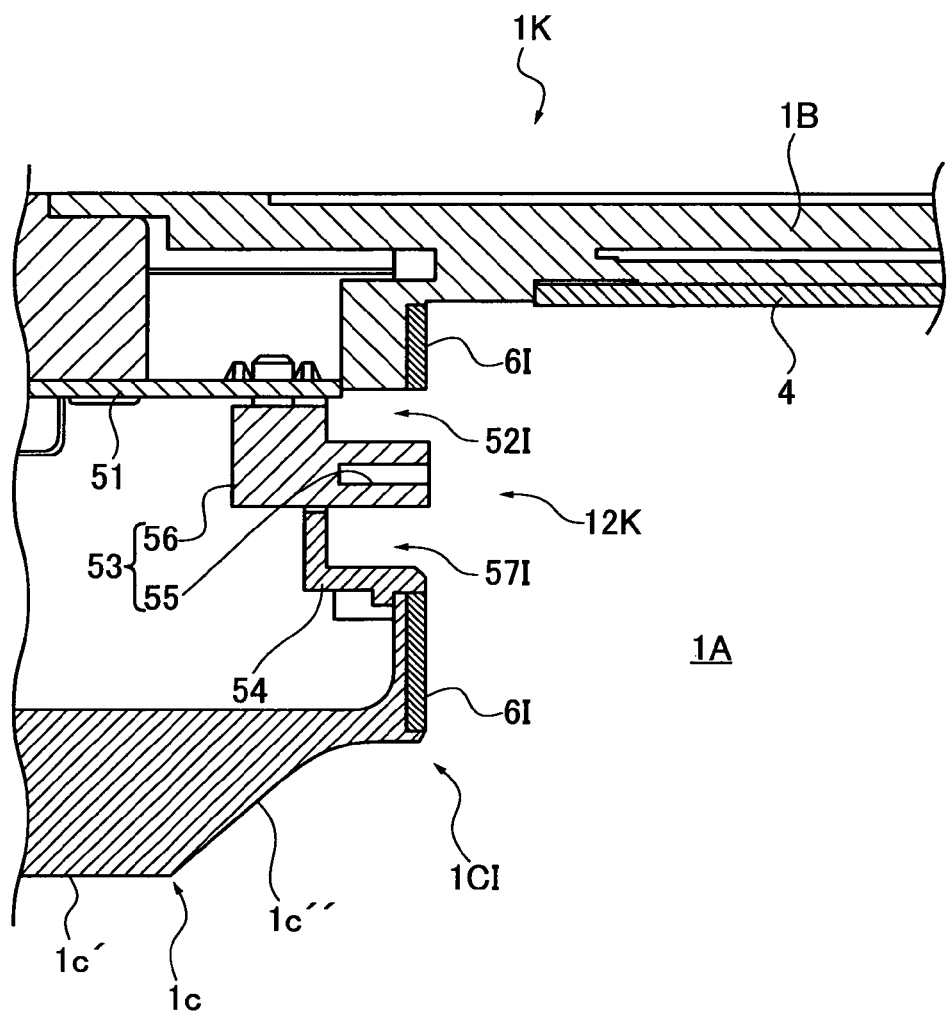
FIG. 34 is a cross sectional view similar to FIG. 19 for illustrating the connector portion in the camera body according to the Fifth Example.

As shown in FIG. 34, the camera body 1k is configured in such a manner that, in the connector 12I of the camera body 1I according to the third Example, the connector portion 12K is not provided with the sealing member (58I).

Figure 35:
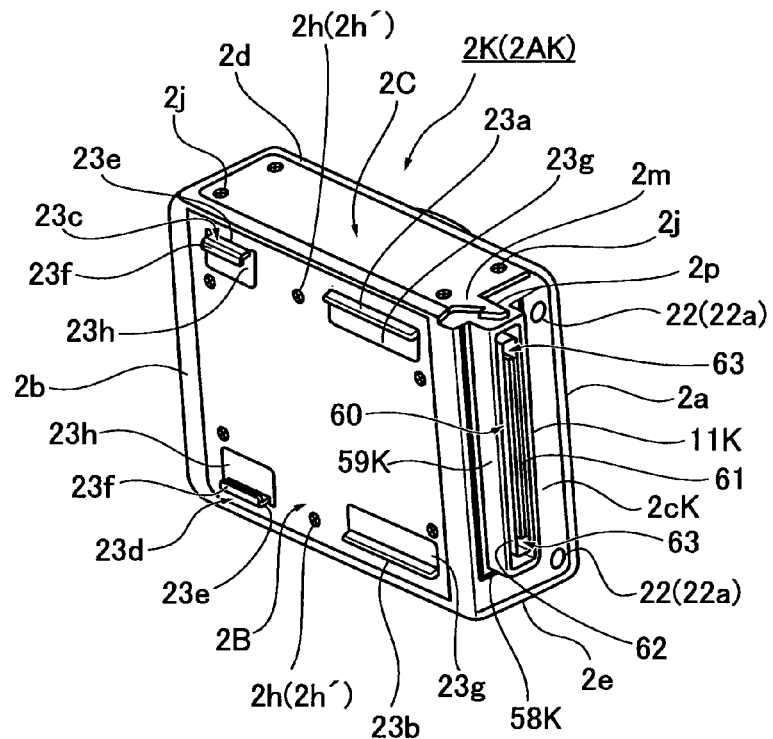
FIG. 35 is a schematic perspective view similar to FIG. 6 illustrating the imaging unit according to the Fifth Example.
Figure 36:
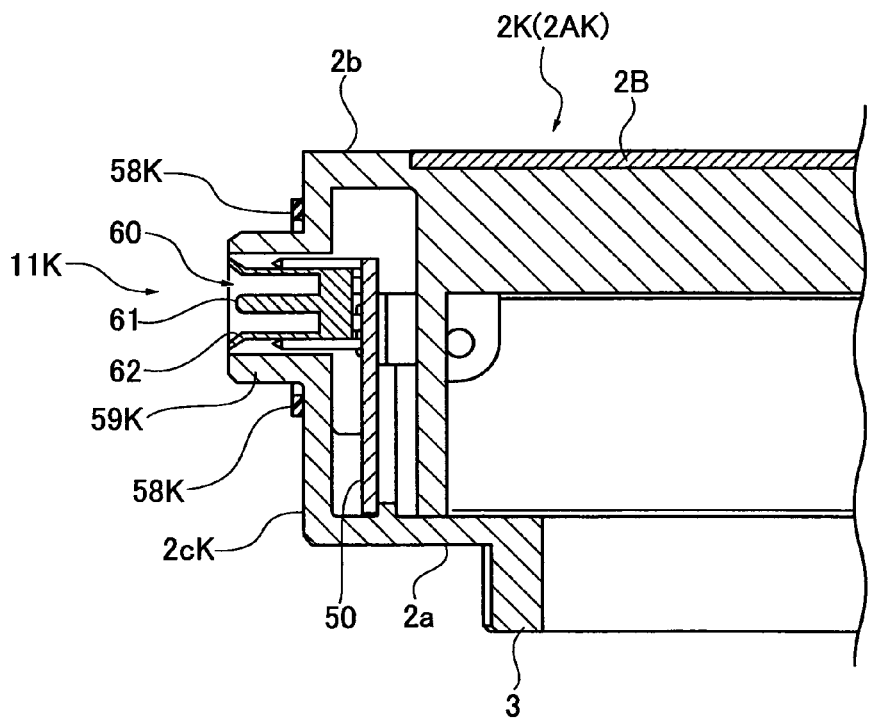
FIG. 36 is a cross sectional view similar to FIG. 19 for illustrating the imaging unit according to the Fifth Example.

As shown in FIGS. 35 and 36, in a left side face 2cK of a case 2AK, the imaging unit 2K is provided with a sealing member 58K so as to surround a connector portion 59K of a connector portion 11K. The sealing member 58K is the same as that used for the connector portion in the camera body according to the first to fourth Examples. The sealing member 58K is positioned at a position so that the sealing member 58K is brought into press-contact with the side wall portion 1CI or the sheet metal member 6I, when the imaging unit 2K is mounted on the concave portion 1A of the camera body 1K. Herein, the sealing member 58K is, from the standpoint that it may be smaller if it may be abut against the side wall portion 1C or the sheet metal member 6I, preferably close to a base portion of the connector cover portion 59K.

Figure 37:
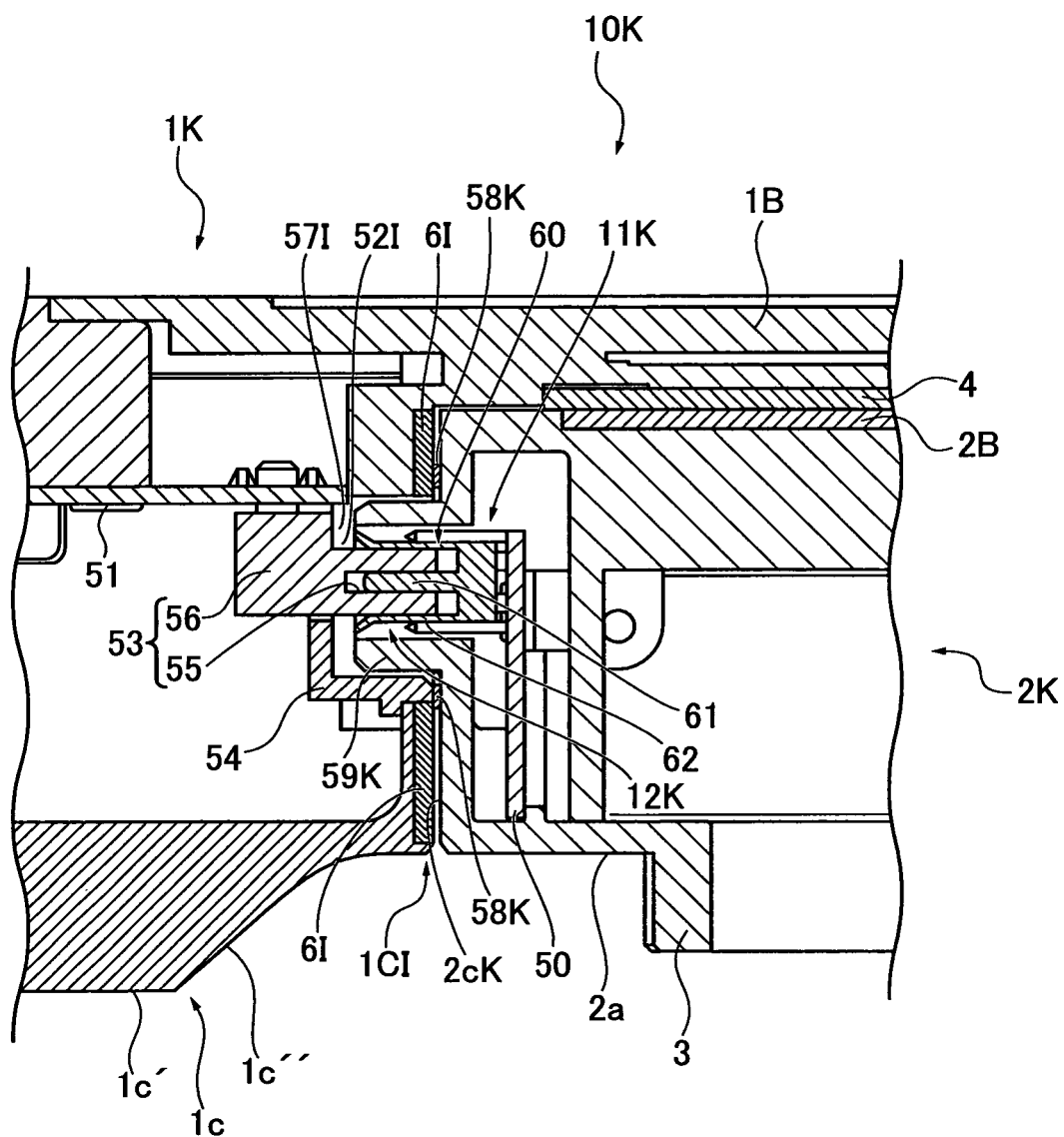
FIG. 37 is a cross sectional view similar to FIG. 23 for illustrating a state that the connector portion in the camera body and the connector portion in the imaging unit according to the Fifth Example are joined together.

As shown in FIG. 37, in the camera body 1K and the imaging unit 2K according to the fifth Example, the imaging unit 2k is mounted/removed on/from the camera body 1K similar to the third Example. In a state that the imaging unit 2K is mounted on the camera body 1K, similar to the third Example, the left side face 2cK of the case 2AK is abut against the side wall portion 1CK or the sheet metal member 6K and the positioning of the imaging unit 2K in the right and left direction (X direction) is made. Further, in a state that the imaging unit 2K is mounted on the concave portion 1A of the camera body 1K, the connector cover portion 59K of the connector portion 11K in the imaging unit 2K is loosely fitted into the fitting groove portion 57 of the connector portion 12 in the camera body 1K, the connector main body 60 of the connector portion 11K is properly connected to the connector main body 53 of the connector portion 12 by the guiding action of the pair of positioning holes 63, 63 and the pair of positioning protrusions 56a, 56a and thus the camera body 1K and the imaging unit 2K are electrically and communicatably connected with each other. In this instance, the peripheral portion of the connector portion 12, specially, in the side wall portion 1CI (the sheet metal member 6I) of the camera body 1K, a portion or portions corresponding to the periphery of an opening portion of the fitting groove portion 52I of the connector portion 12 is abut against the sealing member 58K provided around the periphery of the connector cover portion 59K of the connector portion 11K (the sealing member 58K is compressed). As such, it is possible to securely seal between the peripheral portion and the sealing member 58K by pressing the peripheral portion of the connector portion 12 contact with the sealing member 58K. For this reason, in a press-contact portion which surrounds the connector cover portion 59K, it is possible to prevent the dust or the liquid and so on from being entered from the concave portion 1A of the camera body 1K inwardly of the fitting groove portion 52I of the connector portion 12 in the camera body 1K.

In the camera body 1K and the imaging unit 2K according to the fifth Example, essentially it is possible to obtain the similar advantageous merits to those of the camera body 1I and the imaging unit 2I according to the third Example. In addition thereto, since the sealing member 58K is provided on the imaging unit 2k, for example, in a case if a new imaging unit 2K is mounted in order to make a version up, it is possible to seal by means of the new sealing member 58K to thereby obtain the further secure advantageous merits of dust-proof and waterproof (drip-proof).

Figure 38:
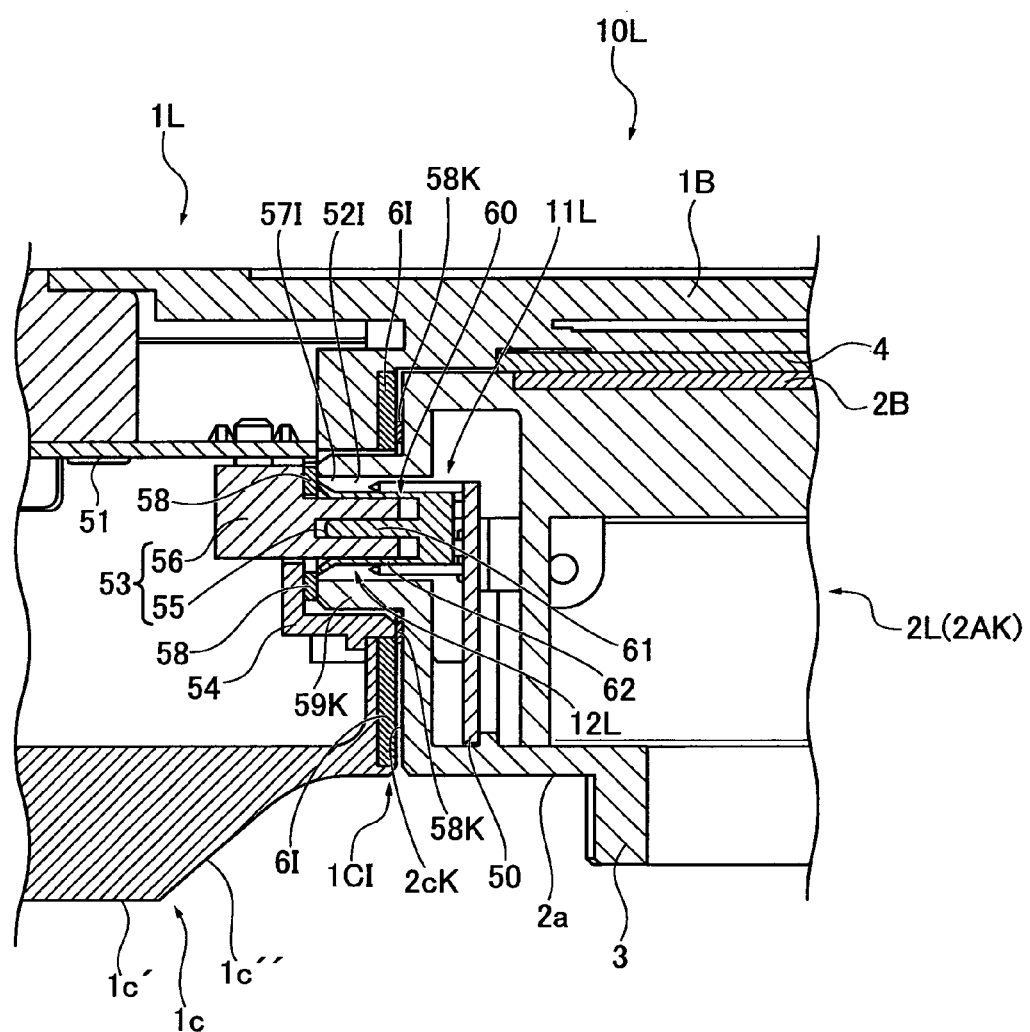
FIG. 38 is a cross sectional view similar to FIG. 23 for illustrating a state that the connector portion of the camera body and the connector portion of the imaging unit in the Sixth Example are joined.

Next, an imaging unit 10L (a camera body 1L and an imaging unit 2L) according to a sixth Example of the present invention will be described below. The dust-proof and waterproof (drip-proof) structures of the connector portion in the camera body 1L and the imaging unit 2L of the sixth Example are different from those of the first to fifth Examples, respectively. The camera body 1L is similar to the camera body 1I according to the third Example as shown in FIG. 38. Further, the imaging unit 2L is similar to the imaging unit 2K according to the fifth Example as shown in FIG. 38.

The camera body 1L and the imaging unit 2L according to the sixth Example, the imaging unit 2L is mounted/removed on/from the camera body 1L similar to another Examples. In a state that the imaging unit 2L is mounted on the camera body 1L, similar to the fifth Example, the left side face 2cK of the case 2AK abuts against the side wall portion 1CI or the sheet metal member 6I and the positioning of the imaging unit 2L in the right and left direction is made. Further, in a state that the imaging unit 2L is mounted on the concave portion 1A of the camera body 1L, the connector cover portion 59L of the connector portion 11L in the imaging unit 2L is loosely fitted into the fitting groove 57I of the connector portion 12 in the camera body 1L, the connector main body 60 of the connector portion 11L is properly connected to the connector main body 53 of the connector portion 12 by the guiding action of the pair of positioning holes 63, 63 and the pair of positioning protrusions 56a, 56a and thus the camera body 1L and the imaging unit 2L are electrically and communicatably connected with each other. In this instance, a leading end of the connector cover portion 59L of the connector portion 11L is brought into press-contact with the sealing member 58 provided on the fitting groove 57I of the connector portion 12L (the sealing member 58 is compressed). As such, it is possible to securely seal between the leading end of the connector cover portion 59L and the sealing member 58 by pressing the leading end of the connector cover portion 59L into contact with the sealing member 58.

Further, the peripheral portion of the connector portion 12, specially, in the side wall portion 1CI (the sheet metal member 6I) of the camera body 1L, a portion or portions corresponding to the periphery of an opening portion of the fitting groove portion 52I of the connector portion 12 is abut against the sealing member 58K provided around the periphery of the connector cover portion 59K of the connector portion 11L (the sealing member 58K is compressed). As such, it is possible to securely seal between the peripheral portion and the sealing member 58K by pressing the peripheral portion of the connector portion 12 contact with the sealing member 58K.

For this reason, in a press-contact portion or portions which surround(s) the periphery of the connector cover portion 59K, it is possible to prevent the dust, liquid and so on from being entered from the concave portion 1A of the camera body 1L inwardly of the fitting groove portion 52I of the connector portion 12 in the camera body 1L, and, in an annular press-contact portion or portions of the tip end of the connector cover portion 59K, it is also possible to prevent the dust, liquid and so on from being entered from the concave portion 1A of the camera body 1L inwardly of the connector cover portion 59 of the connector main body 60L of the connector portion 11L in the imaging unit 2L.

In the camera body 1L and the imaging unit 2L (the imaging device 10L) according to the sixth Example, essentially it is possible to obtain the similar advantageous merits to those of the camera body 1K and the imaging unit 2L according to the fifth Example. In addition thereto, due to double sealing structures, it is possible to obtain the further secure advantageous merits of dust-proof and waterproof (drip-proof).

Seventh Example

Next, an imaging unit 10M (a camera body 1M and an imaging unit 2M) according to a seventh Example of the present invention will be described below. The dust-proof and waterproof (drip-proof) structures of the connector portion in the camera body 1M and the imaging unit 2M of the seventh Example are different from those of the first to sixth Examples, respectively. The imaging unit 2M is similar to the imaging unit 2I according to the third Example (See FIG. 30). Further, since the camera body 1M is similar to the camera body 1K according to the third Example, in the essential structures of the camera body 1M and the imaging unit 2M according to the seventh Example, the same functional parts in the fifth Example are put on the same reference numerals as those of the fifth Example to thereby omit the detailed description thereabout.

Figure 39:
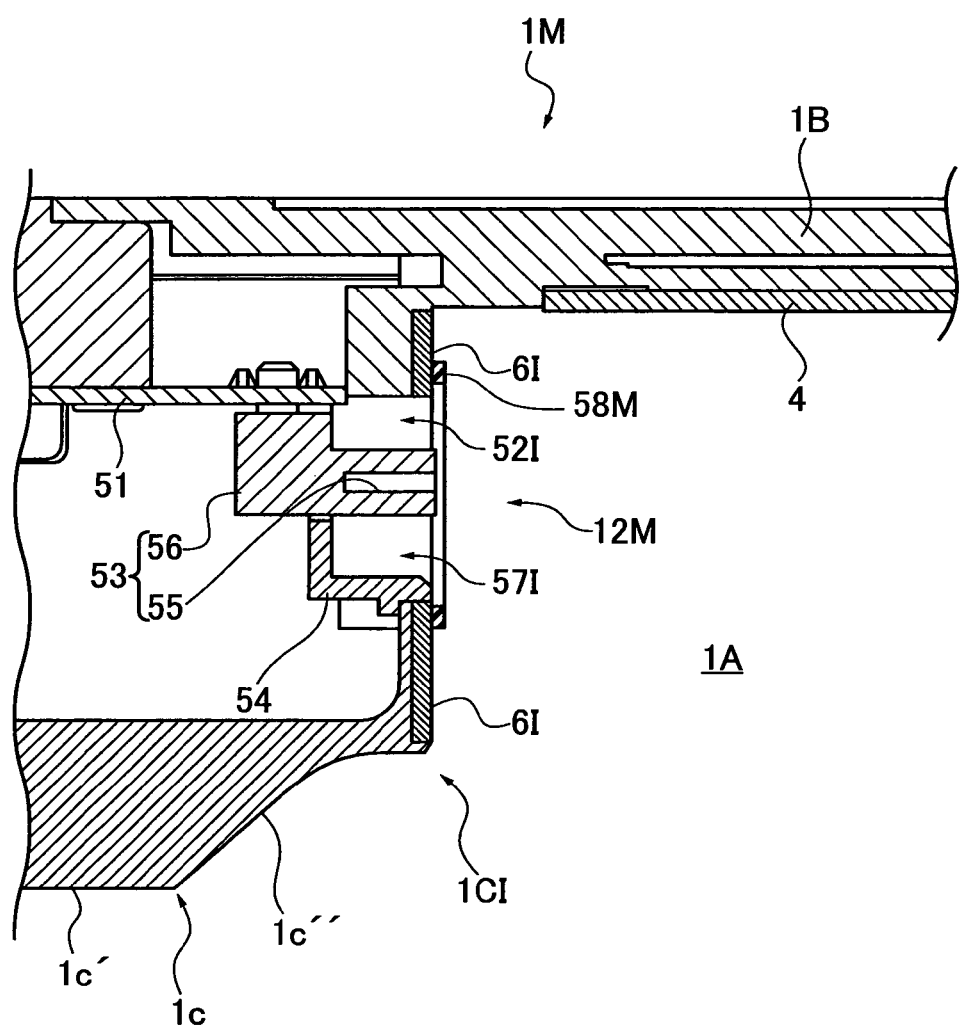
FIG. 39 is a cross sectional view similar to FIG. 34 for illustrating the camera body according to the Seventh Example.

As shown in FIG. 39, in a camera body 1M, the peripheral portion of a connector portion 2M, specifically, in the side wall portion 1c1 (the sheet metal member 6I) of the camera body 1M, at a portion or portions corresponding to the periphery of an opening portion of the fitting groove portion 1CI of the camera body 1M, a sealing member 58M is provided in such a manner that it surrounds the opening portion. The sealing member 58M is similar to those which are used for the connector portion of the camera body or the connector portion of the imaging unit in the first to sixth Examples. The sealing member 58M is positioned at a position in such a manner that it is abut against the left side face 2cI by abutting the left side face 2cI of the case 2AI with the side wall portion 1CI or the sheet metal member 6I when then imaging unit 2M is mounted on the camera unit 1M. The sealing member 58M is positioned at a position in such a manner that it is abut against the left side face 2cI by abutting the left side face 2cI of the case 2AI with the side wall portion 1CI or the sheet metal member 6I when the imaging unit 2M is properly mounted on the concave portion 1A of the camera body 1M. Herein, the sealing member 58M is, from the standpoint that it may be smaller if it may be abut against the left side wall 2cI, preferably close to an opening portion of the fitting groove portion 52I.

Figure 40:
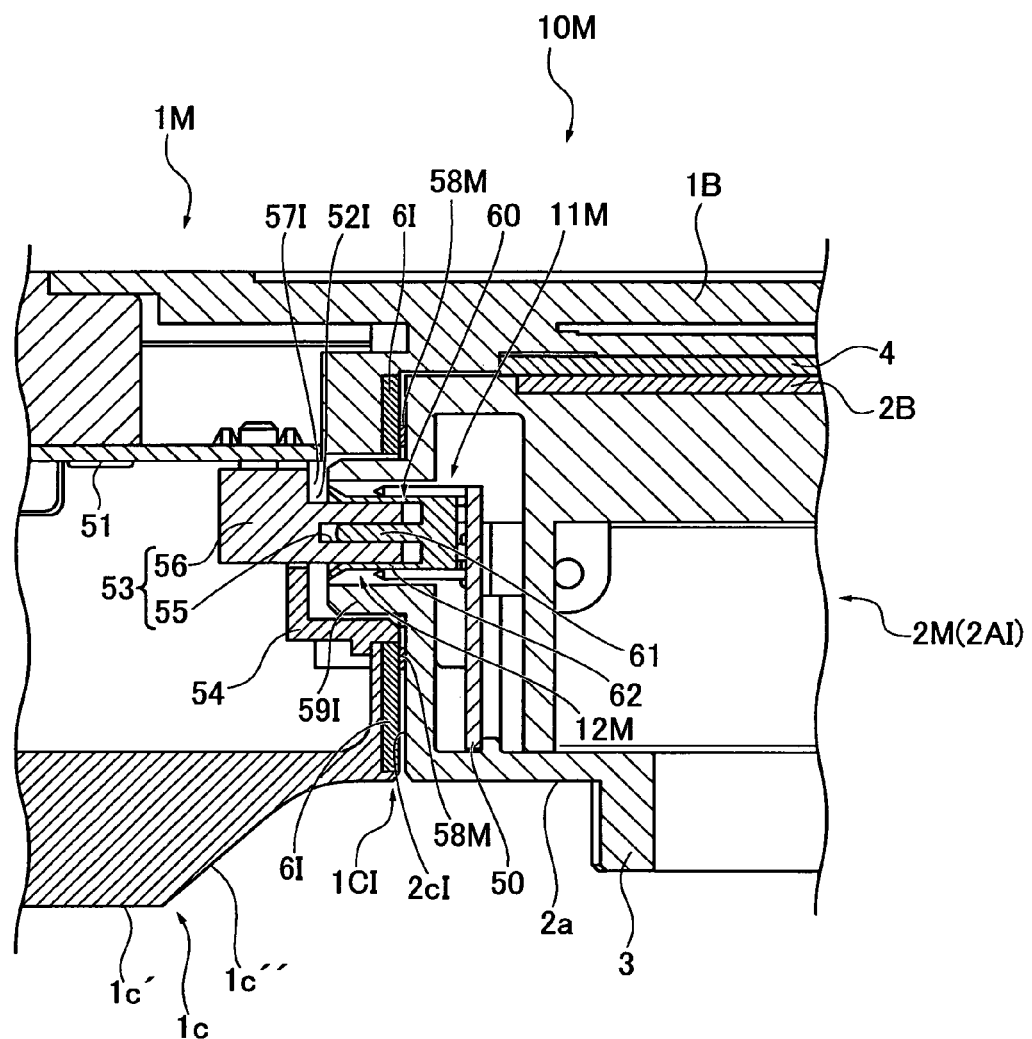
FIG. 40 is a cross sectional view similar to FIG. 37 for illustrating a state that the connector portion in the camera body and the connector portion in the imaging unit according to the Seventh Example are joined together.

As shown in FIG. 40, according the camera body 1M and the imaging unit 2M according to the seventh Example, the imaging unit 2M is mounted/removed on/from the camera body 1M similar to the fifth Example. In a state that the imaging unit 2M is mounted on the camera body 1M, similar to the fifth Example, the left side face 2cI of the case 2AI is abut against the side wall portion 1CI or the sheet metal member 6I and the positioning of the imaging unit 2M in the right and left direction is made. Further, in a state that the imaging unit 2M is mounted on the concave portion 1A of the camera body 1M, the connector cover portion 59I of the connector portion 11M in the imaging unit 2M is loosely fitted into the fitting groove 57I of the connector portion 12M in the camera body 1M, the connector main body 60 of the connector portion 11M is properly connected to the connector main body 53 of the connector portion 12M by the guiding action of the pair of positioning holes 63, 63 and the pair of positioning protrusions 56a, 56a and thus the camera body 1M and the imaging unit 2M are electrically and communicatably connected with each other. In this instance, in the periphery of the connector portion 11M, specifically, in the side wall portion 1CI (the sheet metal member 6I) of the camera body (1M), the sealing member 58M provided at a position corresponding to the periphery of the opening portion of the fitting groove portion 52I of the connector 12M is brought into press-contact with the periphery of the connector cover portion 59I of the connector portion 11M in the left side face 2cI of the case 2AI (the sealing member 58M is compressed). As such, it is possible to securely seal between the periphery and the sealing member 58M by pressing the periphery of the connector portion 11M contact with the sealing member 58M. For this reason, in a press-contact portion which surrounds the periphery of the opening portion of the fitting groove portion 52I, it is possible to prevent the dust or the liquid and so on from being entered from the concave portion 1A of the camera body 1M inwardly of the fitting groove portion 52I of the connector portion 12M in the camera body 1M.

In the camera body 1M and the imaging unit 2M (the imaging apparatus 10M) according to the seventh Example, basically, it is possible to obtain the similar advantageous merits to the camera body 1I and the imaging unit 2I according to the fifth Example. In addition thereto, since the sealing member 58M is provided on the side wall portion 1CI (the sheet metal portion 6I) in the camera body 1M and thus is easily disposed, the manufacturing cost can be reduced and the exchange is easy, thus it is possible to obtain the more secure advantageous merits of the dust-proof and waterproof (drip-proof).

(Locking Mechanism 24, a Variant of the Lock Mechanism 24')

Figure 41:
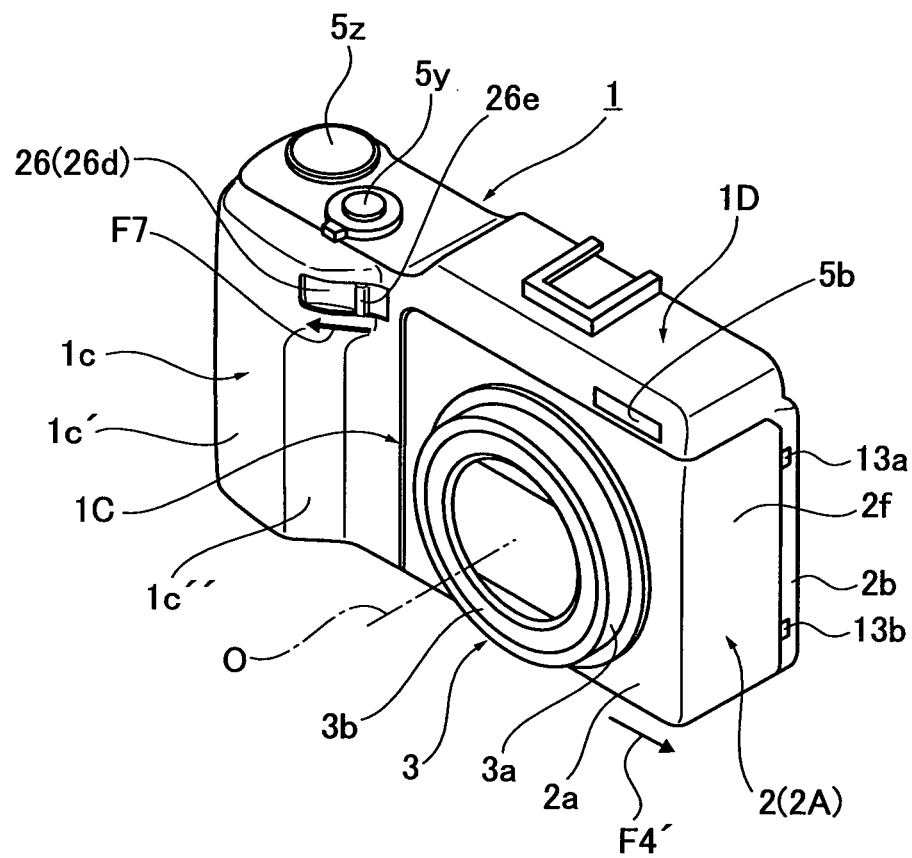
FIG. 41 is an external appearance view illustrating another variant example of the imaging unit according to the present invention.
Figure 42:
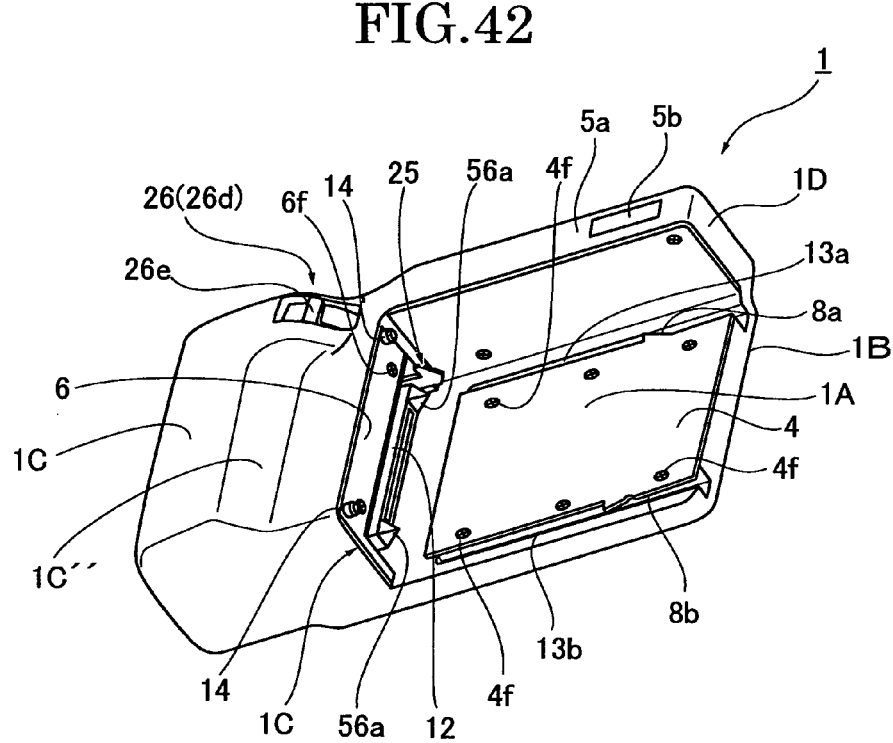
FIG. 42 is an external appearance view illustrating the camera body shown in FIG. 41.
Figure 43:
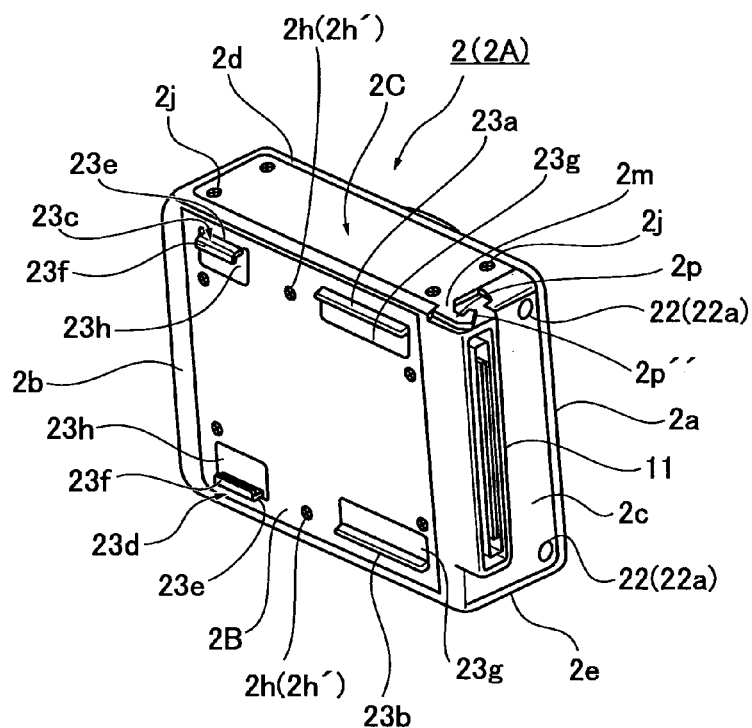
FIG. 43 is an external appearance view illustrating the imaging unit shown in FIG. 41.
Figure 44:
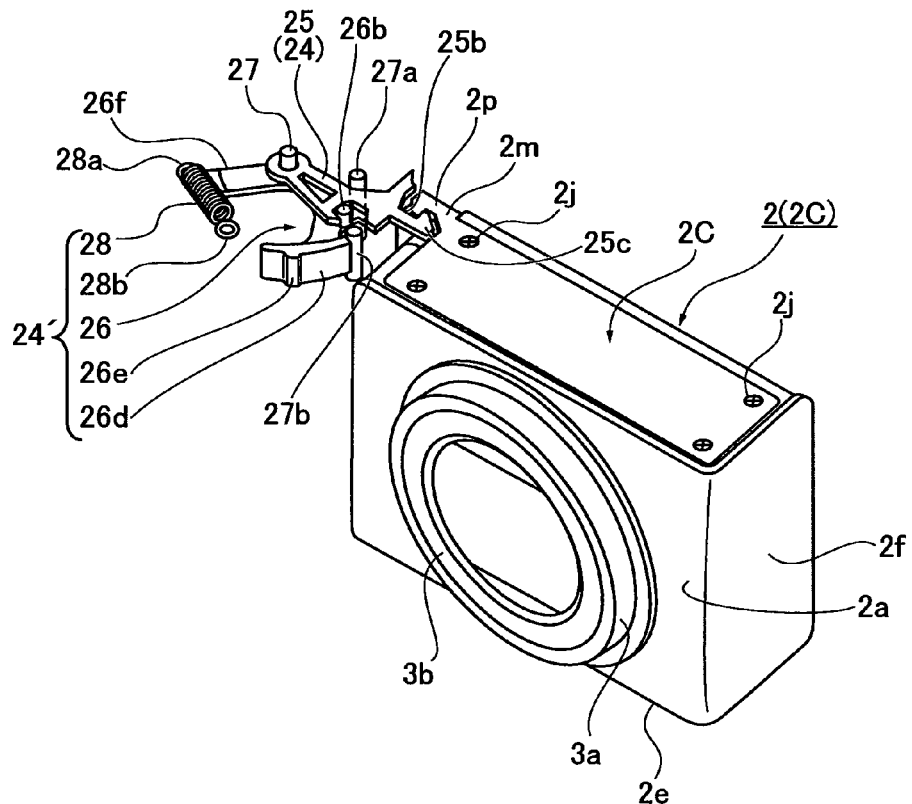
FIG. 44 is a perspective view for illustrating a meshing relationship of the locking member and the member to be locked shown in FIG. 42.
Figure 45:
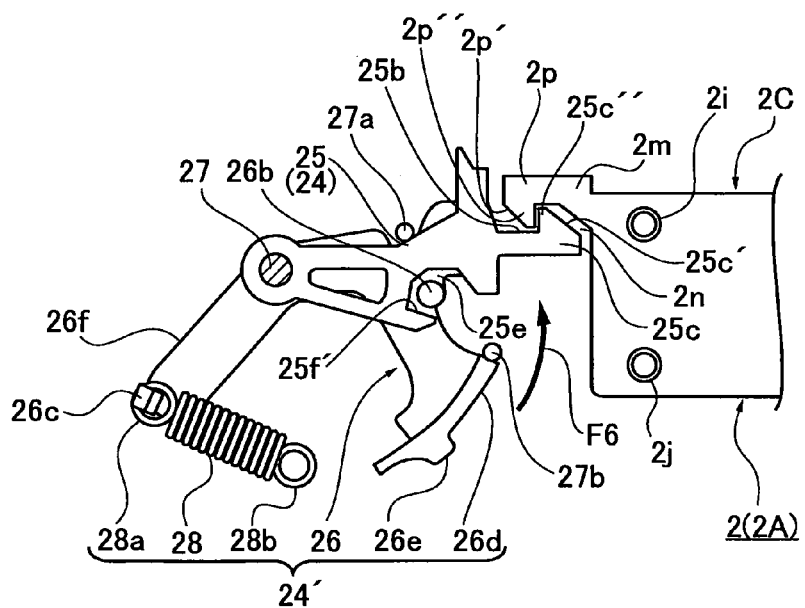
FIG. 45 is a partial enlarged view for illustrating a meshing relationship of the locking member and the member to be locked shown in FIG. 44.
Figure 46:
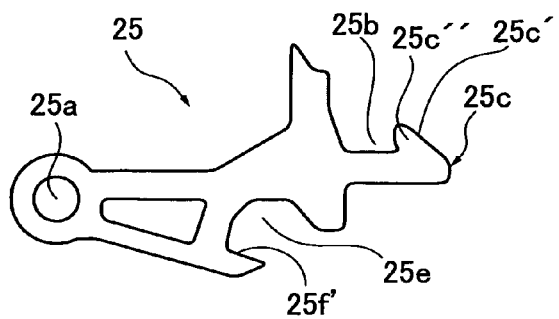
FIG. 46 is a plan view illustrating the locking member shown in FIG. 45.
Figure 47:
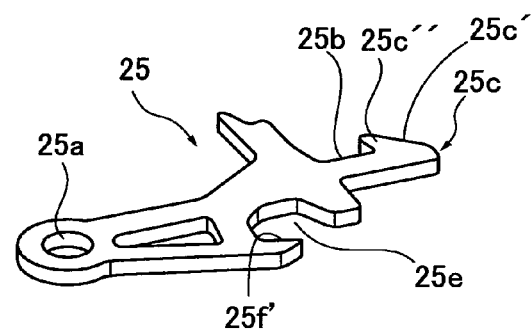
FIG. 47 is a perspective view illustrating the locking member shown in FIG. 46.
Figure 48:
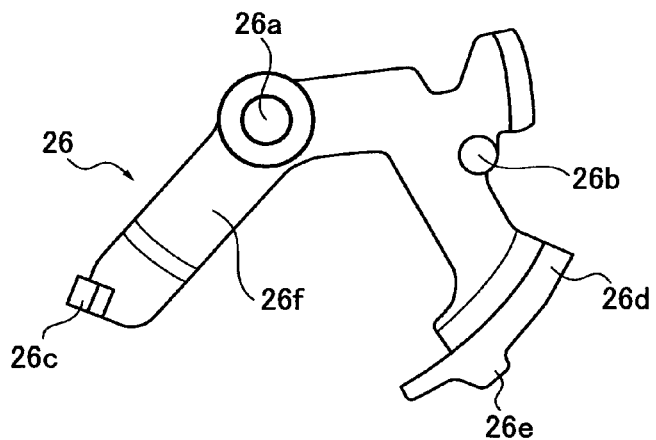
FIG. 48 is a plan view illustrating the unlocking member shown in FIG. 45.
Figure 49:
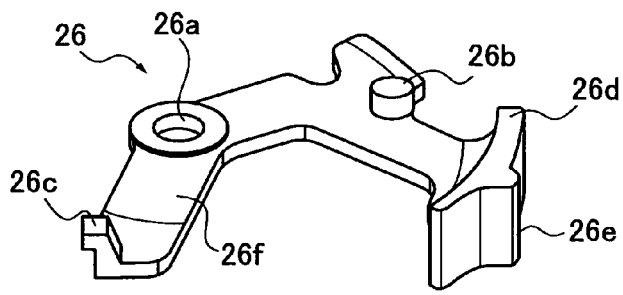
FIG. 49 is a plan view illustrating the unlocking member shown in FIG. 48.

In the locking mechanism 24 shown in FIGS. 5, and 13 to 18, the tip end 25c' of the lock claw 25c is configured to be directed toward a front side opposed to the back wall portion 1B, as shown in FIG. 5. The tip end 2P'' of the lock claw 2p shown in FIG. 6 is configured to be opposed to the tip end 25c' of the lock claw 25c On the contrary, in the imaging apparatus 10 shown in FIG. 41, the tip end 25c' of the lock claw 25c of the locking mechanism 24 is configured to be directed toward the back wall portion 1B as shown in FIG. 42. As shown in FIG. 43, the tip end 2P'' of the lock claw 2p of the imaging unit 2 is configured to be opposed to the tip end 25c'' of the lock claw 25c as shown in FIG. 42. Since the structure of the imaging unit 2 is identical to the imaging unit 2 shown in FIG. 6 except for the direction of the tip end 2P''' of the lock claw 2p, the same component are put on the same reference numerals to thereby omit the detailed description thereabout.

As such, in this example, since a state in which the upper wall portion 1D is positioned in the upper side and the lens system is used toward the subject which is located in the front side of the camera, is defined as a normal using state. Even if the photographer grasps the grip portion 1c by his right hand, since, in this normal using state, the right direction which is difficult for the user to operate is adapted to be an unlock operating direction, it is possible to reduce the possibility that the imaging unit 2 is fallen down from the camera body 1 due to the miss operation caused when using the camera.

Since the structure of the camera body 1 shown in FIG. 42 is identical to the camera body 1 shown in FIG. 6 except that the structures of the locking mechanism 24 and the unlocking mechanism 24' are different, the same component are put on the same reference numerals to thereby describe the structures of the locking mechanism 24 and the unlocking mechanism 24' with reference to the drawings of FIGS. 44 to 49.

Each locking member 25 shown in FIGS. 44 to 47 is one that each locking member 25 shown in FIGS. 13 to 16 is slightly modified. The main structure of each locking member 25 shown in FIGS. 44 to 47 is identical to those of each locking member 25 shown in FIGS. 13 to 16. Each unlocking member 26 shown in FIGS. 44 to 47 is one that each unlocking member 26 shown in FIGS. 13 to 16 is slightly modified. The main structure of each unlocking member 26 shown in FIGS. 44, 45, 47 and 48 is identical to those of each unlocking member 26 shown in FIGS. 13, 14, 17 and 18.

The locking member 25 shown in FIGS. 44 to 47 is formed with a notch 25e into which the unlock protrusion 26b of the unlocking member 26 shown in FIGS. 44, 45, 48, and 49 is inserted. The notch 25e is formed with the abutting wall 25f of the unlock protrusion 26b. The locking member 25 is rotatably urged by means of the rotational urging device toward a direction in which the tip end 25c'' of the lock claw 27 is directed toward the back wall portion 1B around the supporting shaft 27 as a fulcrum. The stopper 27a plays a role in controlling the rotation stopping position of the locking member 25 by means of a rotation urging device thereof. The locking claw 25c is maintained with the same being abut against the stopper by rotatably urging of the urging device, when the locking claw 25c is not engaged with the claw to be locked 2p. The unlocking operation member 26 is away from the stopper 27b when not operating.

The unlocking member 26 is formed with an arm portion 26f. A free end of the arm portion 26f is formed with an engagement protrusion 26c. One end 28a of a spring for unlocking 28 engages the engagement projection 26c. The other end 28b of the unlocking spring 28 engages the engagement projection (not shown) provided at a proper position inside the side wall portion 1C. The unlocking operation member 26 is rotatably urged around the supporting shaft 27 around the supporting shaft 27 as a fulcrum by means of the unlocking spring 28 in a direction toward which the unlock button 26d approaches the back wall portion 1B (a direction of an arrow F6 indicated in FIG. 45). The unlocking operation member 26 is abut against the stopper 27b when not operating. The stopper 27b plays a role in controlling the rotation stopping position of the unlocking operation member 26 by means of the unlocking spring 28. When operating the unlocking operation member 26, the unlocking operation member 26 is spaced away from the stopper 27b and rotated toward a direction approaching the stopper 27a. The rotating amount of the unlocking operation member 26 toward an operational direction is controlled by means of the stopper 27a.

With this arrangement, when the inclined wall 2p' of the claw to be locked 2p abuts against the inclined wall 25' of the locking claw 25c and the thus caused a component force in the inclined wall 25c' is greater than a rotational urging force of the locking member 25, the locking member 25 is rotated in a direction opposed to a direction (a direction opposed to an arrow F6) toward which the rotational urging force of the locking member 25 around the supporting shaft 27 operates.

Next, if the claw to be locked 2p gets over the locking claw 25c, the locking member 25 returns to its original position. As a result, the locking claw 25c enters the notch portion 2n and the claw to be locked 2p enters the notch portion 25b. Whereby, the locking claw 25c and the claw to be locked 2p are engaged with each other, the imaging unit 2 is locked against the camera body 1 in the right and left direction. When unlocking the imaging unit 2 against the camera body 1, the unlock button 26d is operated or shifted in a direction opposed to an urging direction (a direction indicated by an arrow F7 in FIG. 41) toward which the rotational urging force of the unlocking spring force 28 operates.

As such, according to this variant, in a normal use, since the left direction in which the photographer is easy to use is made an unlocking operation direction, it is possible to remove the imaging unit 2 from the camera body 1 without shifting the camera body 1 from one hand to the other hand and thus it is possible to make a swift exchange of the imaging unit 2.

By one action or moving the imaging unit 2 in a direction away from the side wall portion 1C, since the separation of the locking member and the member to be locked and the electrical connection by the connector portions 11 and 12 are completed almost at the same time, it is possible to briefly and easily perform the removing operation of the imaging unit 2 from the camera body 1.

Meanwhile, the unlock button 26d may be formed with a haunting protrusion as an unlock allowing portion which allows the action toward an operational direction for unlocking. If the apparatus in which the action toward an unlocking operational direction is allowed by the operation of the haunting protrusion in a haunting direction thereof is configured, it is possible to further reduce the risk due to the miss operation of the unlock button 26d. Namely, the operation of the unlocking operation member 26 is adapted to be composed of two actions, it is possible to further reduce the risk due to the miss operation of the unlock button 26d.

(Variant of the Imaging Unit 2)

If the apparatus is configured in such a manner that the back wall portion 1B of the camera body 1 is provided with the sheet metal member 4 shown in FIGS. 3, 4, 5, and 7, the back face of the imaging unit 2 is provided with the sheet metal member 2B shown in FIGS. 6 and 43, and both sheet metal member 4 and 2B are faced with each other, as well as the imaging unit 2 is slidably and removably mounted on the camera body 1, an abrasion sound is generated by the frictional contact of both sheet metals 4 and 2B. Further, an abrasion sound is generated by the frictional contact of the sliding contact ribs 23a, 23b, the upper edge wall 4a' and the lower edge wall 4a'.

There, in this variant, as shown in FIGS. 6 and 43, the back face side of the case 2A is equipped with devices described below. The detailed structure thereof will be described below with reference to FIGS. 50 to 57.

Figure 50:
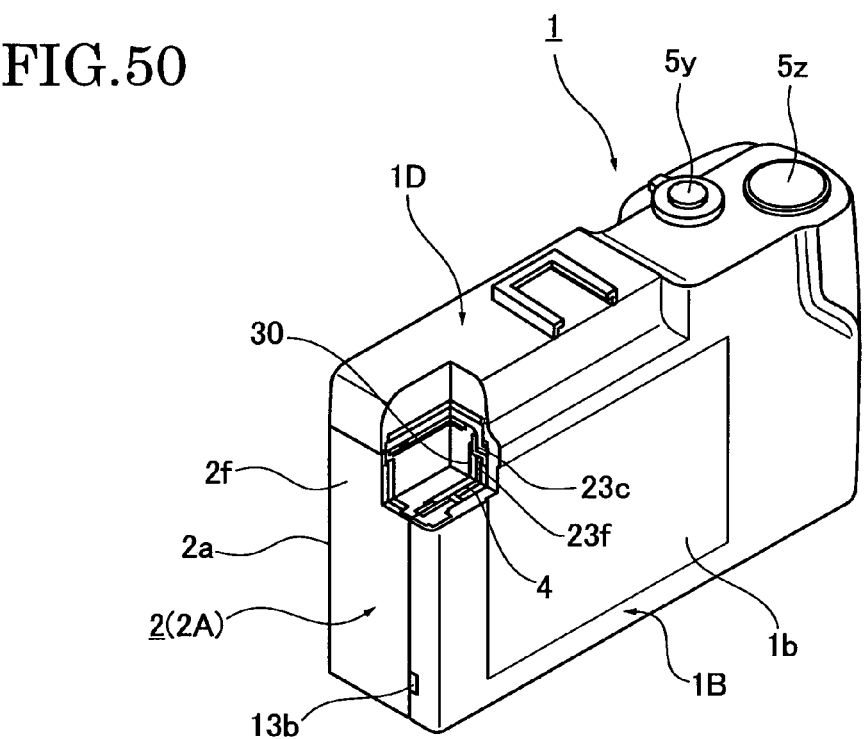
FIG. 50 is an explanatory view for illustrating a variant example of the mounting apparatus consisting of the camera body and the imaging unit and is an external appearance view partly braking a portion corresponding to the engagement claw of the sheet metal member in the imaging unit side and the engagement plate portion of the sheet metal member in the camera body side when viewed from the back side.
Figure 51:
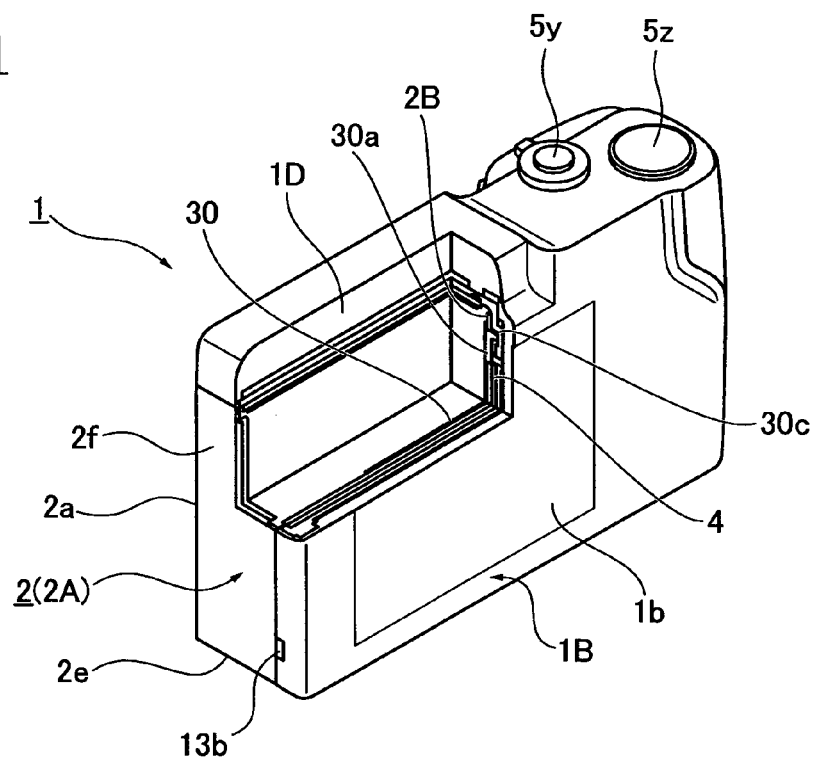
FIG. 51 is an explanatory view for illustrating a variant example of the mounting apparatus consisting of the camera body and the imaging unit and is an external appearance view partly braking a portion of the sliding rib of the resin plate in the imaging unit side when viewed from the back side.
Figure 52:
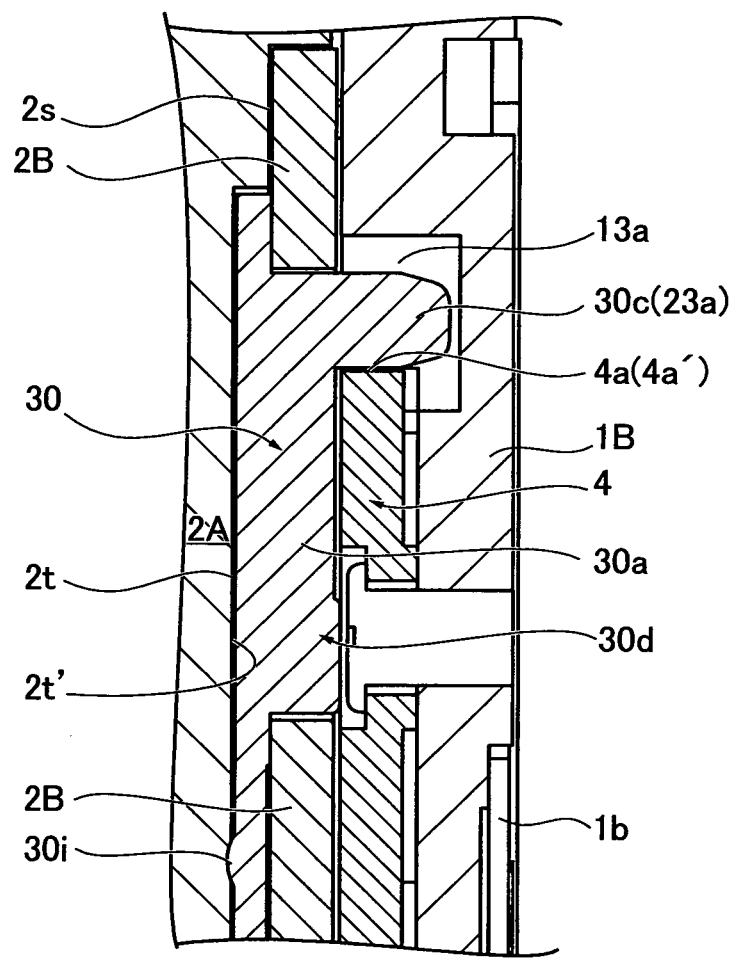
FIG. 52 is a partial enlarged view for illustrating a variant example of the imaging unit shown in FIGS. 1 and 44 and is a view corresponding to the partly broken portion shown in FIG. 51.
Figure 53:
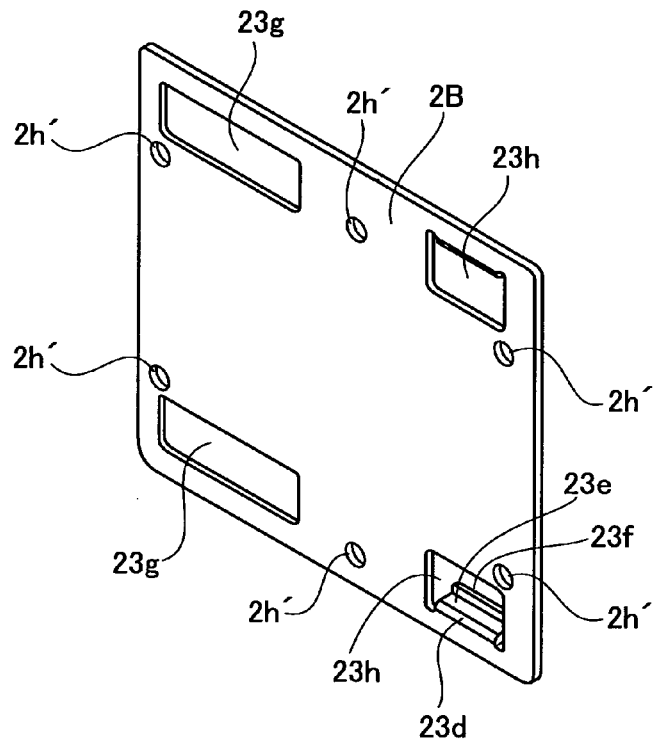
FIG. 53 is a perspective view illustrating the sheet metal member shown in FIG. 52 when viewed from a front side in the imaging unit.
Figure 54:
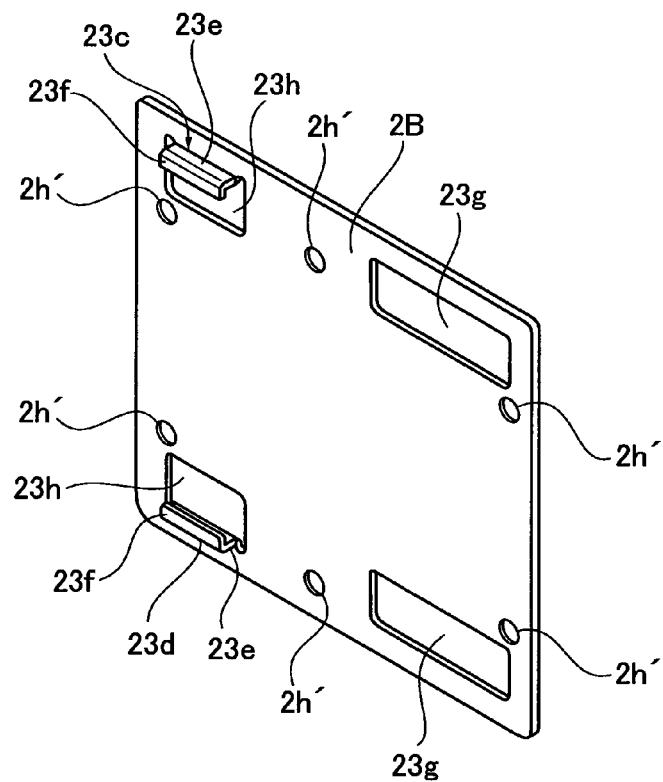
FIG. 54 is a perspective view illustrating the sheet metal member shown in FIG. 53 when viewed from a back side in the imaging unit.

FIGS. 50 and 51 show a perspective view illustrative of a portion of the back face of the case 2A in the imaging unit 2. At the back side of the case 2A are formed with a rectangular first recessed portion 2s and a rectangular second recessed portion 2t smaller than the first recessed portion 2s. The second recessed portion 2t is formed within the first recessed portion 2s. In the first recessed portion 2s, the sheet metal member 2B shown in FIGS. 53 and 54 is disposed. Since the sheet metal member 2B shown in FIGS. 53 and 54 uses the same structure as that of the sheet metal member 2B shown in FIG. 6 except for the sliding contact ribs 23a, 23b, the same components as those of the sheet metal member 2B shown in FIGS. 6 and 43 have the same reference numerals to thereby omit the detailed description thereabout.

Figure 55:
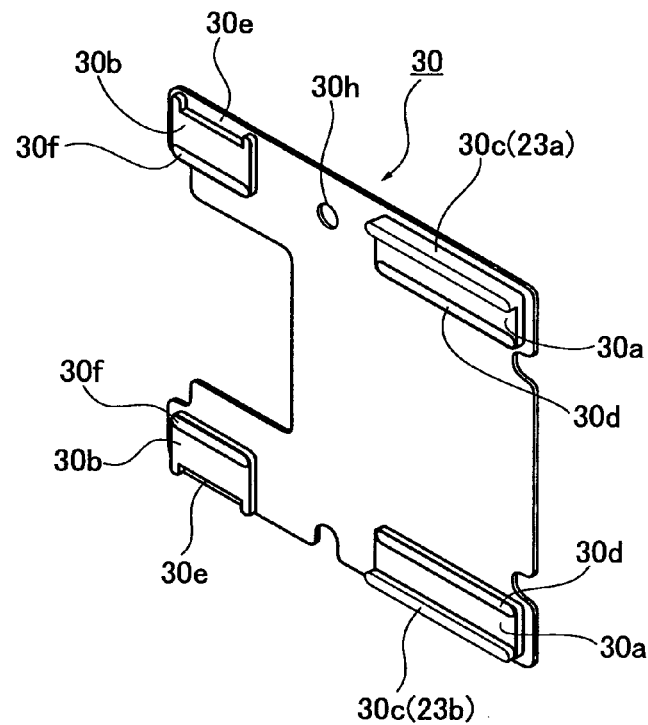
FIG. 55 is a perspective view illustrating the resin plate shown in FIG. 52 when viewed from a back side in the imaging unit.
Figure 56:
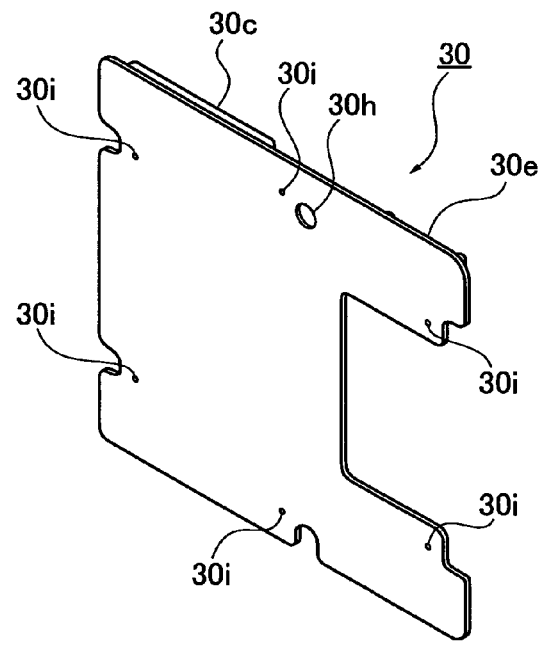
FIG. 56 is a perspective view illustrating the resin plate shown in FIG. 52 when viewed from a front side in the imaging unit.
Figure 57:
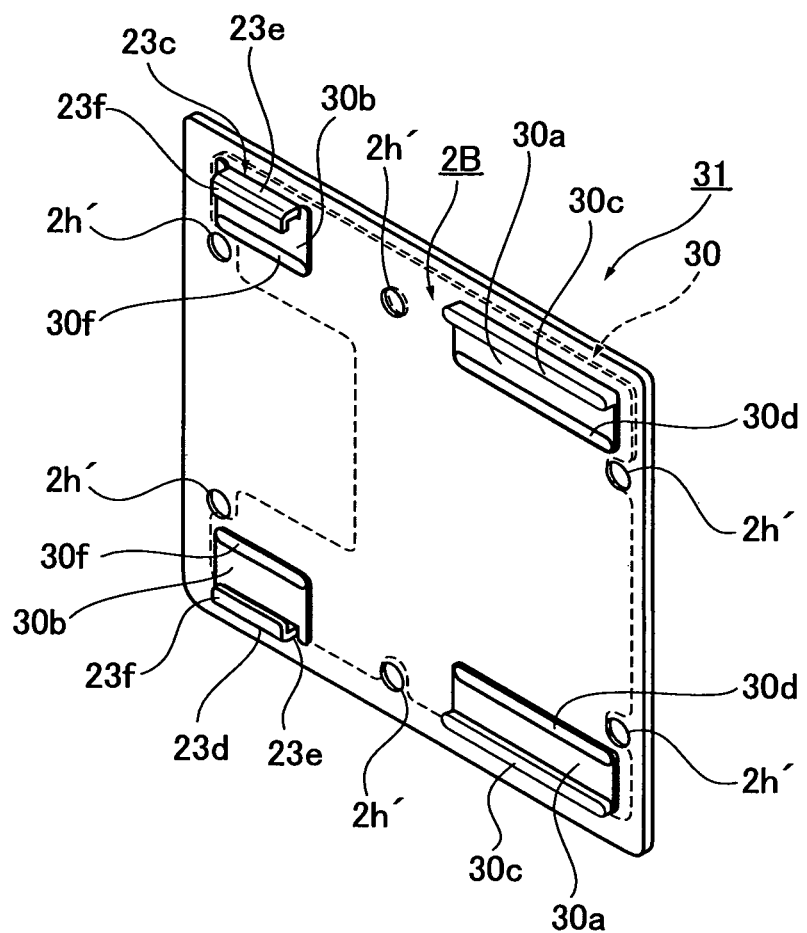
FIG. 57 is a perspective view illustrating a sheet metal member unit which are integrally formed from the sheet metal member shown in FIG. 54 and the resin plate shown in FIG. 55.

Within the second recessed portion 2t, a rectangular resin plate (a sheet or a film made of resin) 30 shown in FIGS. 55 and 56 is disposed. By fixing the resin plate shown in FIGS. 55 and 56 and the sheet metal member 2B by means of a stop screw to the back face 2b of the case 2A, the sheet metal member unit 31 as shown in FIG. 57 is composed. On one side face of the resin plate 30 are formed with a pair of rectangular thick portion 30b spaced away in the right and left direction from a pair of rectangular thick portion 30a. The pair of thick portion 30b is disposed corresponding to an elongate hole 23h. These thick portions 30a, 30b are configured to be insertable into the elongate holes 23g, 23h.

The thick portion 30a is formed with a projected body 30c which extends in the right and left direction and a contact face portion 30d which extends in the right and left direction. The projected body 30c plays a role as sliding contact portions 23a, 23b. The thick portion 30b is formed with a notch portion 30e in order to prevent the interference with the louvered portion 23e and a contact face portion 30f. The resin plate 30 is formed with an insertion hole 30h corresponding to a screw hole 2h'. On the other side of the resin plate 30 are formed with a plurality of semi-circular protrusions 30i at appropriate positions thereon as shown in FIG. 56. Each of the semi-circular protrusions 30i abuts against a wall portion 2t' which composes the second recessed portion 2t and plays a role in preventing curving of the resin plate 30 due to the dimensional tolerance in a thickness direction of the sheet metal member unit 31.

As such, in this variant, since the sliding contact ribs 23a, 23b are composed of the projected portion made of resin 30c, if the imaging unit 2 is configured in such a manner that it is mounted/removed on/from the camera body 1 by sliding the imaging unit 2 in the right and left direction, it is possible to reduce the abrasion sound due to the frictional contact of the sliding ribs 23a, 23b, the upper edge wall 4a', and the lower edge wall 4b'. Further, since the contact face portions made of resin 30d, 30f slide to the sheet metal member 2B, it is also possible to reduce the abrasion sound due to the frictional contact of the sheet metal member 4 and the sheet metal member unit 31.

Further, when, the apparatus is configured to reduce the abrasion sound when the imaging unit 2 is mounted/removed on/from the camera body 1 by sliding the imaging unit 2 in the right and left direction, by using the resin plate 30 of the sheet metal unit 31, if the imaging unit 2 is forcibly pressed against the back wall portion 1B of the camera body 1, the resin plate 30 elastically deforms due to the dimensional tolerance and the resin plate 30 curves to generate a flapping sound.

On the contrary, in this variant, since the plurality of semicircular protrusions 30i are formed at appropriate positions and thus the contact face portions 30d, 30f of the resin plate 30 are securely pressed against the sheet metal member 4 or the back wall portion 1B by devising that the thickness of the resin plate 30 is substantially thicker than the depth of the recessed portion 2t, from the viewpoint of the dimensional tolerance, it is possible to prevent the curving and the elastic deformation due to the dimensional tolerance.

In the above mentioned each Examples and Variants, although it is configure in such a manner that the imaging unit 2 is approached to the camera body 1 from an arrow F3, next, moved from the right to the left and the imaging unit 2 and the camera body 1 are electrically connected, it may be allowable that the imaging unit 2 and the camera body 1 are electrically connected by moving the imaging unit 2 from the right to the left.

(Description of Electric Components Installed in Camera Body and Imaging Unit)

Next, electric components installed in the camera body 1 and the imaging unit 2 will be described with reference to FIG. 58.

Figure 58:
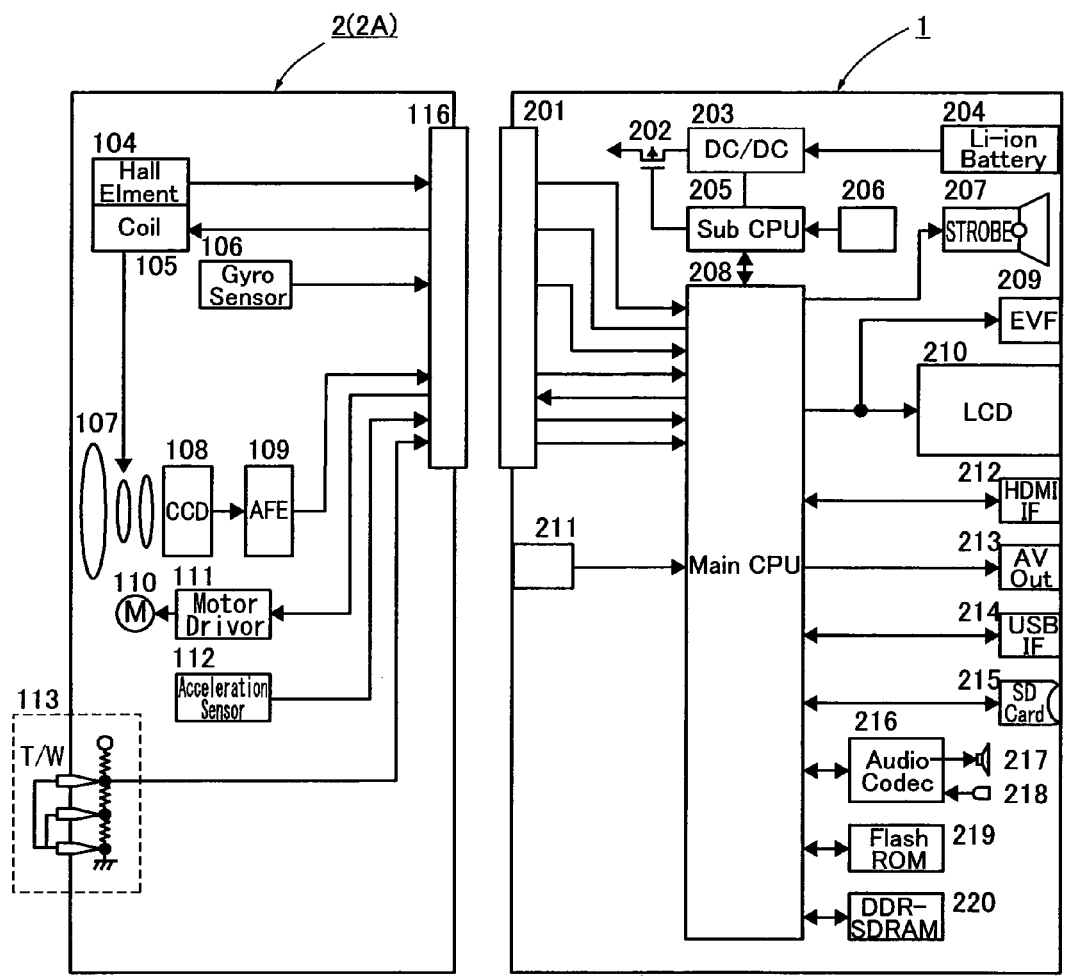
FIG. 58 is a circuit diagram illustrating one example of electrical components built in the imaging unit shown in FIGS. 1 and 41.

As shown in FIG. 58, for example, the camera body 1 includes a lithium ion battery 204, a strobe light source 207 (5b), an electronic viewfinder device 209, a liquid crystal display device (LCD) 210, a high-definition multimedia interface (HDMI) 212, an audio-video (AVOut) output terminal 213, a USB interface (USBIF) 214, an SD card interface (SD card) 215, an audio codec circuit (Audio codec) 216, a speaker 217, a microphone 218, a flash ROM 219, a DDR-SDRAM 220, a main CPU 208, operating switches 206 and 211, a sub CPU 205, a DC/DC power circuit 203, a switching element 202, and a connector terminal 201 as the connector 12.

These components constitute part of electric components having publicly-known functions required for a digital camera as an imaging apparatus. The operating switch 206 is a release shutter switch 5y, for example. Meanwhile, the operating switch 211 is an operating key used for operating the liquid crystal display device (LCD) 210 and the like, for example. The liquid crystal display device (LCD) 210 is provided on the back face portion 1B, for example. The operating switch 211 is provided in an appropriate position on the back face portion 1B.

The case 2a of the imaging unit 2 includes an imaging lens unit 107 as an optical system, an imaging device 108, an AFE circuit 109, a hall element 104, a driving coil (Coil) 105, a gyro sensor 106, a motor driver 111, a driving motor (M) 110, an acceleration detection sensor 112, a tele/wide detection switch 113, and a connector terminal 116 as the connector 11.

These components also constitute part of electric components having publicly-known functions for a digital camera as an imaging apparatus 10. The imaging lens unit 107 includes multiple lenses, and some of those multiple lenses are located in the lens barrel 3. The first Example describes the configuration in which the driving motor (M) 110 and the motor driver 111 are provided in the imaging unit 2. Instead, these components may be provided in the camera body 1.

Here, an electric power is supplied from the camera body 1 to the imaging unit 2. For example, the hall element 104, the driving coil 105, and the gyro sensor 106 constitute part of an image stabilization mechanism. Signals from this image stabilization mechanism are inputted to the main CPU 208 via the connector terminals 116 and 201, and the main CPU 208 executes image stabilization processing based on these signals. The image stabilization processing is processing to correct blurs of an image to be projected on a receiving surface of the imaging device, the blurs caused by a camera shake. For example, this processing may be conducted so as to drive the imaging device in a direction opposite to a direction of a camera shake detected with the gyro sensor 106. Alternatively, the processing may be conducted by driving some of optical elements in the imaging lens unit 107 in the same direction as the direction of the camera shake detected with the gyro sensor 106. Image signals from the imaging device 108 are inputted to the main CPU 208 via the AFE circuit 109, and are displayed on the LCD 210 and the like after undergoing predetermined image processing.

A switching signal from the tele/wide detection switch 113 is inputted to the main CPU 208 via the connector terminals 116 and 201. The main CPU 208 controls the motor driver 111 and the driving motor 110 on the basis of switching signals from the tele/wide detection switch 113, the operating switch 211, and the like, thereby controlling drive of the imaging lens unit 107. A detection output from the acceleration detection sensor 112 is inputted to the main CPU 208 via the connector terminals 116 and 201. The main CPU 208 controls tilt of an image to be displayed on the LCD 210 on the basis of the detection output from the acceleration detection sensor 112. A degree of the tilt of the imaging unit 2 relative to a horizontal line is displayed on the LCD 210 on the basis of the detection output from the acceleration detection sensor 112. The degree of the tilt of the imaging unit 2 relative to the horizontal line may be indicated with a numerical value or displayed with an image. These electrical components are mounted on the electrical equipment base.

When operating the operation switch 206, the imaging unit 2 photographs the subject and converts the photographed image of the subject to an image data. The connector terminal 116 transfers this image data to a main CPU.

Figure 59:
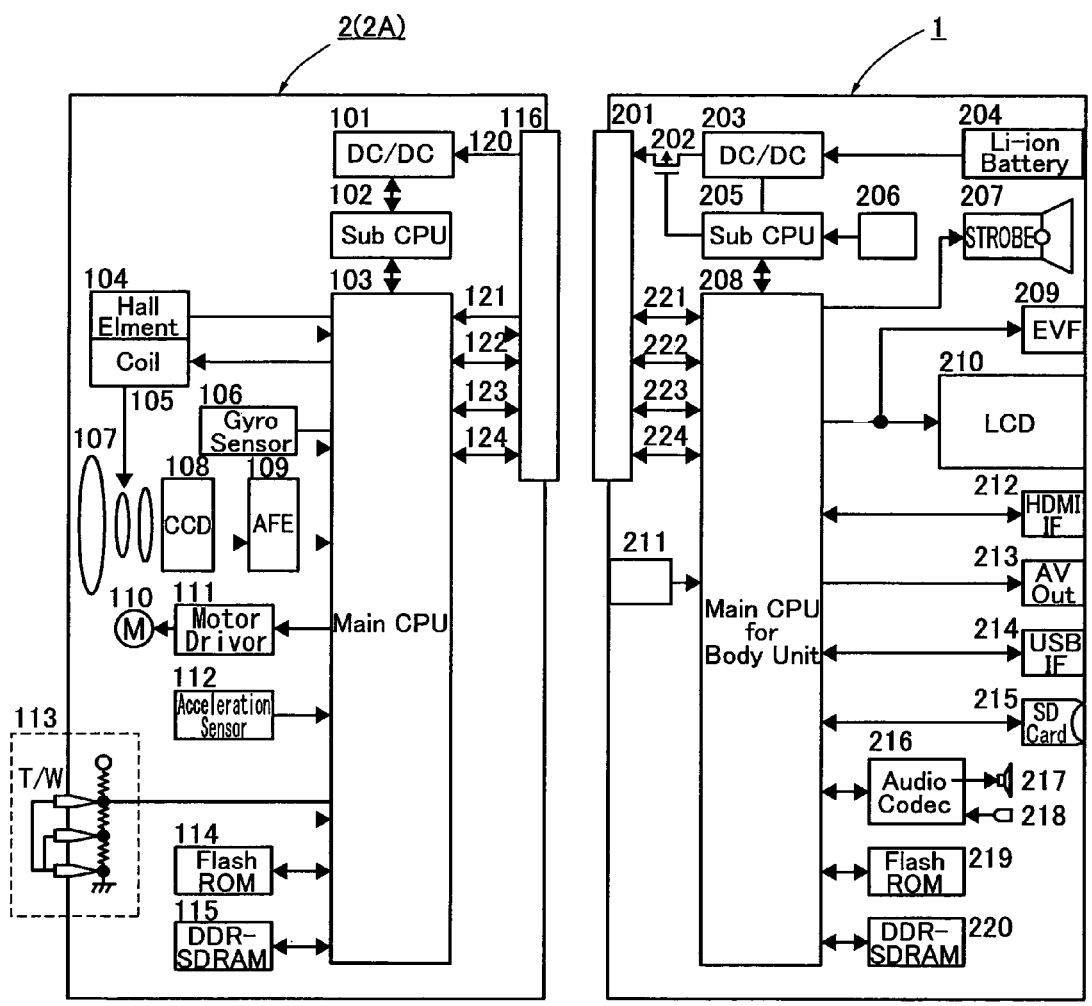
FIG. 59 is a circuit diagram illustrating another example of the electrical components built in the imaging unit shown in FIGS. 1 and 41.

As shown in FIG. 59, the imaging unit 2 or 2' may be provided with a DC/DC power circuit 101, a sub CPU 102, a main CPU 103, a flash ROM 114, and a DDRSDRAM 115, and may be configured to perform image processing with the main CPU 103 and then to transmit an image processing signal to the main CPU 208 via the connector terminals 116 and 201. It is also possible to apply a configuration perform compression processing into a format such as JPEG with the main CPU 103 and then to transmit the compressed image data to the main CPU 208 via the connector terminals 116 and 201. When the imaging unit 2 or 2' is configured to perform the image processing or the compression processing as described above, it is possible to transmit stable images with less noises to the main CPU 208 of the camera body 1. The main CPU 208 of the camera body 1 monitors a state of connection of a given pin (a camera body side connection detecting pin) of the connector 12. When the main CPU 208 detects that the camera body side connection detecting pin is connected to an imaging unit-side connection detecting pin, the main CPU 208 starts communication and power transmission (supply) between the connector 11 and the connector 12. Here, the communication and the power transmission may be immediately started upon detection of connection of the connection detecting pins, or the communication and the power transmission may be started after a lapse of a predetermined time period. Alternatively, when the connection detecting pin detects the connection, the communication and the power transmission may be started in response to an operation of the operation part provided on the camera body 1 for starting the communication and the power transmission. Moreover, it is also possible to provide a locked state detector configured to detect whether the locking mechanism is set to a locked state and to start the communication and the power transmission when the locked state detector detects that the locking mechanism is set to the locked state.

As described above, according to the Example of the present invention, it is possible to attach or detach, to and from the same camera body 1, the imaging units 2 and 2' respectively provided with the lens barrels 3 and 3' having the different sizes and with the imaging devices having the different sizes. The lens barrel 3' of the imaging unit 2' protrudes upward from the case 2a' as shown in FIG. 1B in comparison with the lens barrel 3 of the imaging unit 2. Here, it is preferable to design the camera body 1 and the imaging units 2 and 2' so that the lower faces of the cases 2a and 2a' of the imaging units 2 and 2' are flush with the lower face of the camera body 1 when the imaging unit 2 or 2' is attached to the camera body 1.

Specifically, in this case, the concave portion 1A of the camera body 1 is open on three sides so as to relax the size restriction of the imaging unit 2 to the camera body 1. Accordingly, it is possible to install a large-sized highly-sensitive imaging device or a small-sized imaging device in the imaging unit 2 and to attach or detach various imaging units 2 having different lens barrels or imaging devices to and from the common camera body 1 to meet the needs of a customer. Moreover, since the lens barrel 3 of the imaging unit 2 can be more freely designed in size as compared to the related art, it is possible to offer various imaging units as interchangeable lens group units ranging from a single focus lens to a high magnification zoom lens. Accordingly the customer can upgrade the imaging apparatus by purchasing only a new imaging unit 2 in accordance with a progress in the imaging device 108

Since the concave portion 1A of the camera body 1 is opened on two sides of the right side and the lower side, it is possible to mount the imaging unit having a different size in the right, left, up and low directions. Thus, since the size restriction of the imaging unit 2 to the camera body 1 is relaxed, it is possible to install a large-sized highly-sensitive imaging device or a small-sized imaging device in the imaging unit 2 and to attach or detach the imaging units 2 having different lens barrels 3 or imaging devices to and from the common camera body 1 to meet the needs of a customer. Moreover, since the lens barrel 3 of the imaging unit 2 can be more freely designed in size as compared to the related art, it is possible to offer various imaging units as interchangeable lens group units ranging from a single focus lens to a high magnification zoom lens. Accordingly the customer can upgrade the imaging apparatus by purchasing only a new imaging unit 2 in accordance with a progress in the imaging device 108

Further, since 68-pin bay connectors are used for the connectors 11 and 12 configured to perform the communication between the camera body 1 and the imaging unit 2, it is possible to transfer large-capacity image data in a short time period. Meanwhile, in order to perform the communication between the camera body 1 and the imaging unit 2, it is also possible to apply other methods including, for example, a radio communication method, an optical communication method, a contact communication method performing communication by means of abutment instead of engagement, and the like.

(Arrangement of the Connector Base and the Electrical Equipment Base)

First Embodiment

Figure 60:
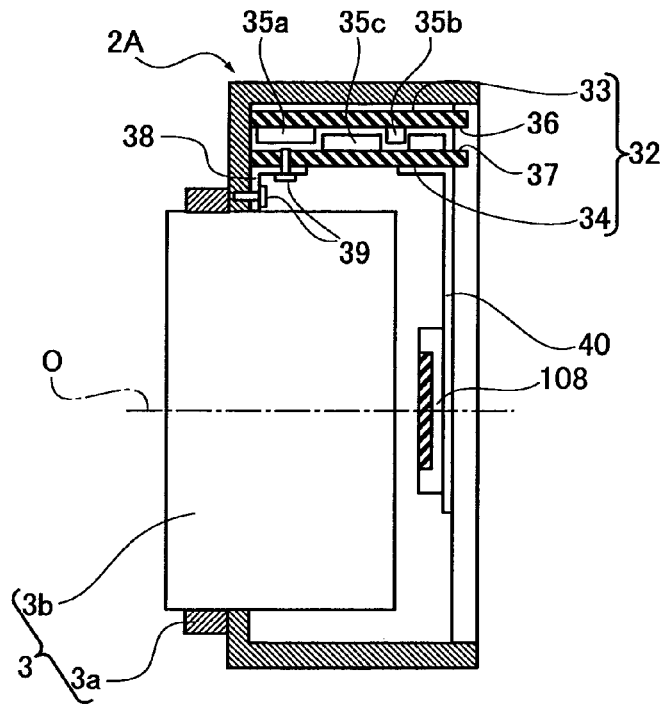
FIG. 60 is a schematic view illustrating a first embodiment of an electrical equipment base installed inside the case of the imaging unit shown in FIGS. 1 and 41.

FIG. 60 is a schematic view illustrating a first embodiment of the arrangement between a connector base and an electrical equipment base. Inside the case 2A is provided with the electrical equipment base 32. At a back side of the case 2A is provided with a camera shake correction mechanism. The shake correction mechanism is provided with an imaging element 108. In this FIG. 60, the detailed structure of the shake correction mechanism is omitted for the purpose of simplifying the explanation.

The electrical equipment base 32 is comprised of two divided bases of a first divided base 33 and a second divided base 34. The first divided base 33 and the second divided base 34 are disposed parallel to the optical axis O. Herein, the first divided base 33 and the second divided base 34 are disposed with they being stacked up and down with each other. Each of the divided bases 33, 34 is provided with mounted components 35a, 35b, 35c and so on. The mounted component 35a is, for example, an image processing chip. The mounted component 35b is, for example, a flash ROM. The mounted component 35a is, for example, an image processing circuit.

Herein, the mounting parts 35a, 35b mounted on the first divided base 33 and the mounting part 35c mounted on the second divided base 4 are disposed with the bases on each of which these mounting parts are mounted being faced with each other in alternate manner so as not to interfere with each other. Whereby, it is possible to prevent the increase of the thickness due to the overlapping of the mounting parts mounted on the divided bases 33 and 34. The first divided base 33 is electrically connected via a connector between the bases (not shown) to the second divided base 34. In the back face of the case 2A are formed with fitting grooves 36 and 37 into which the side portions are fitted. The second divided base 34 is fixed to the case 2A be means of the fitting groove 37 and the L-shaped fitting member 38. Further, the reference numeral 39 shows a stop screw. The first divided base 33 is fixed to the second divided base 34 by means of the fitting groove 36 and the plate connector.

The second divided base 34 and the imaging element 108 are electrically connected via a flexible print circuit board 40. Further, a mounting base to which the connector portion 11 is attached and the second divided base 34 are electrically connected via a flexible print circuit board (not shown).

If the electrical equipment base 32 is divided into two divided structures of the first divided base 33 and the second divided base 34, it is possible to enlarge the area in which the mounting parts are disposed. Further, since the first divided base 33 and the second divided base 34 are disposed parallel to the optical axis and the movable barrel 3b and the imaging element 108 are disposed in such a manner that their center axis coincide with the optical axis, it is possible to shorten the length of the case 2A in a direction along the optical axis O.

If the first divided base 33 and the second divided base 34 are disposed in an overlapped manner, since the divided bases are overlapped with each other in such a manner that mounted parts disposed in the second divided base 34 is positioned between mounted parts disposed in the first divided base 33, it is possible to prevent the increase of thickness in an up-and-down direction of the case 2A due to the overlap of the divided bases 33, 34.

Further, since the imaging element 108 is configured to be separated from the electrical equipment base 32, it is possible to facilitate the positional adjustment of the imaging element 108 to the optical axis O of the lens system. Further, if the imaging element 108 is directly mounted on the electrical equipment base 32, the structure of the shake correction mechanism becomes complicated. However, according to this first example, since the imaging element 108 can be directly driven, it is possible to simplifying the shake correction mechanism structure.

Figure 61:
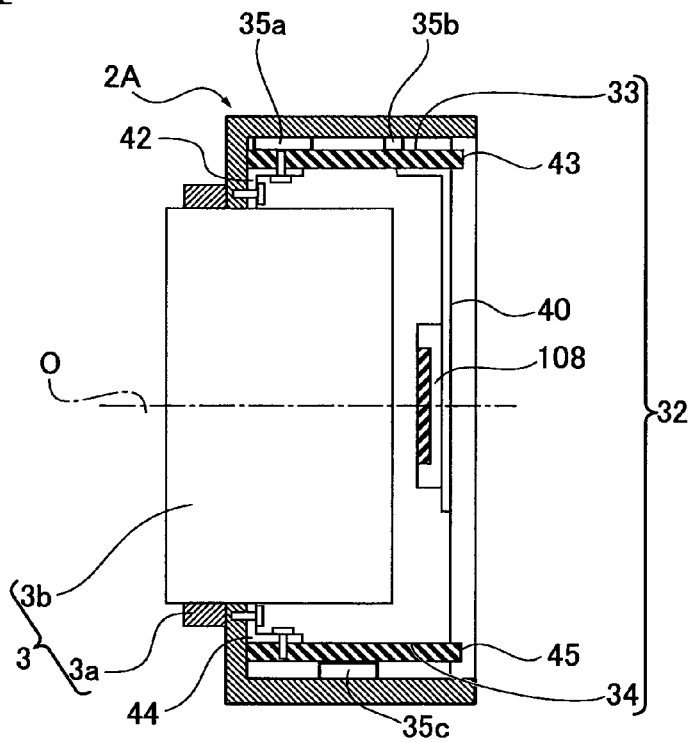
FIG. 61 is a schematic view illustrating a second embodiment of the electrical equipment base installed inside the case of the imaging unit shown in FIGS. 1 and 41.
Figure 62:
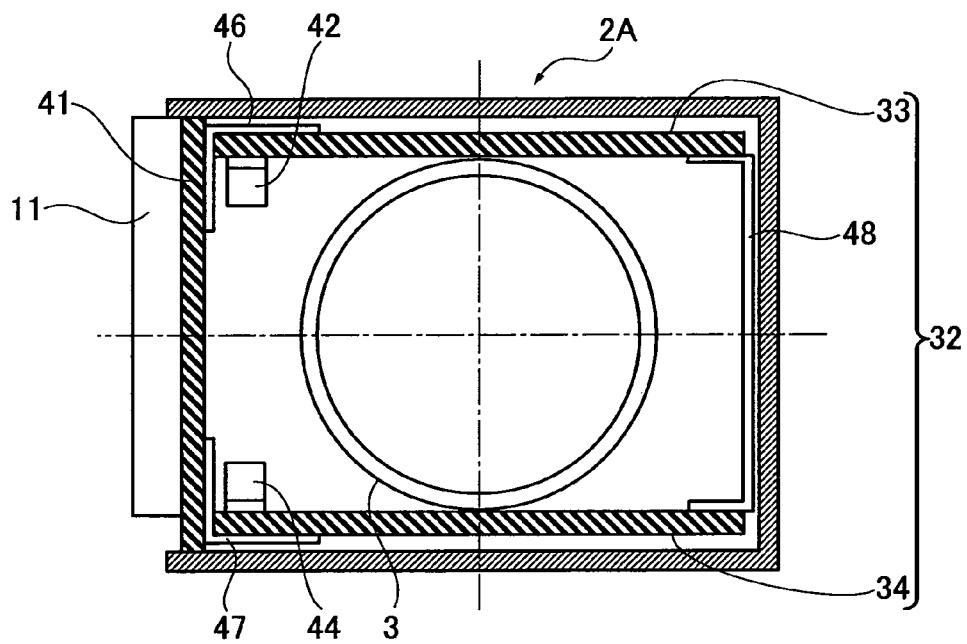
FIG. 62 is a schematic view illustrating the electrical equipment base when viewed from the front side.

As shown in FIGS. 61 and 62, the arrangement in which the electrically equipment base 32 is elaborately designed will be described below.

Second Embodiment

As shown in FIGS. 61 and 62, in this second example, the first divided base 33 and the second divided base 34 are disposed in an up-and-down with they sandwiching a movable barrel 3b. The first divided base 33 is fixed within the case 2A be means of a L-shaped mounting member 42 and a fitting groove 43. The second divided base 34 is fixed within the case 2A be means of a L-shaped mounting member 44 and a fitting groove 45.

The mounting components 35a, 35b such as the image processing chip and so on are disposed in the first divided base 33. The mounting component 35c which composes a power source is disposed in the second divided base 34. The first divided base 33 and the connector base 41 are electrically connected via the flexible circuit board 46 as shown in FIG. 62. The second divided base 34 and the connector base 41 are electrically connected via a lead wire 47. As such, since the connector base 41 and the divided bases 33 and 34 are independently composed, if the connector portion 11 is out of order, the connector portion 11 is easy to exchange.

Since the flexible print circuit board 48 is disposed along the inner surface of the right wall of the case 2A which lies in a side apart from the connector base 41, it is possible to reduce that the influences due to electrical noises generated in the connector portion 11 prevails via the flexible print circuit board 48 to the first divided base 33.

Figure 63:
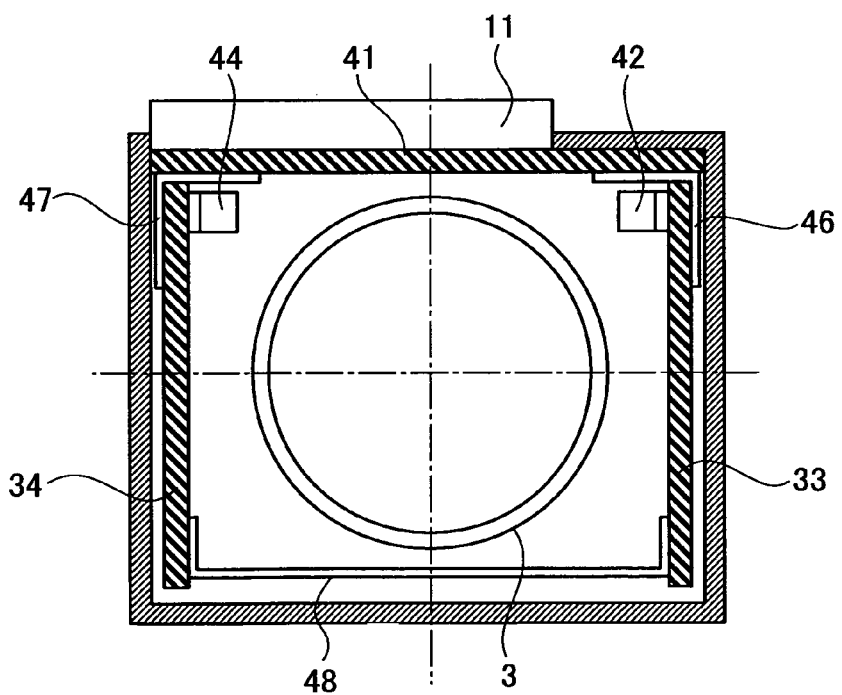
FIG. 63 is a schematic view illustrating another embodiment in which the electrical equipment base is differently arranged as shown in FIG. 62.

In this second example, although the explanation refers to the case in which the connector portion 11 and the connector base 41 are disposed in the left side of the case 2A, as shown in FIG. 63, it is possible to make an arrangement in which the connector portion 11 and the connector base 41 are disposed above the case 2A and the divided bases 33 and 34 are disposed in the right and left side as the movable barrel 3b being a border therebetween. The structure shown in FIG. 63 has the similar advantageous merits to those of the structures shown in FIGS. 61 and 62. Meanwhile, if the arrangement in which the connector portion 11 and the connector base 41 are disposed is employed, the structure of the camera body 1 needs to be changed corresponding to the structure of the case 2A shown in FIG. 62.

Another Embodiments

Figure 64:
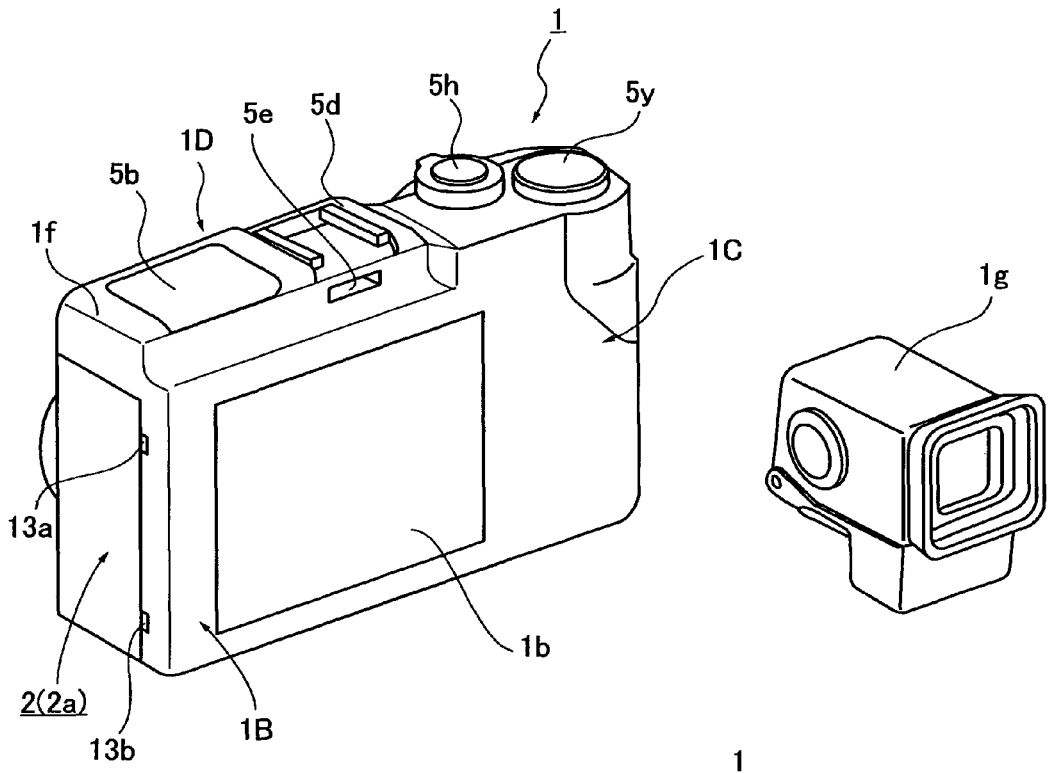
FIG. 64 is an external appearance view illustrating a state when the camera body is viewed from the back side and prior to mounting the electrical view finder on the camera body.
Figure 65:
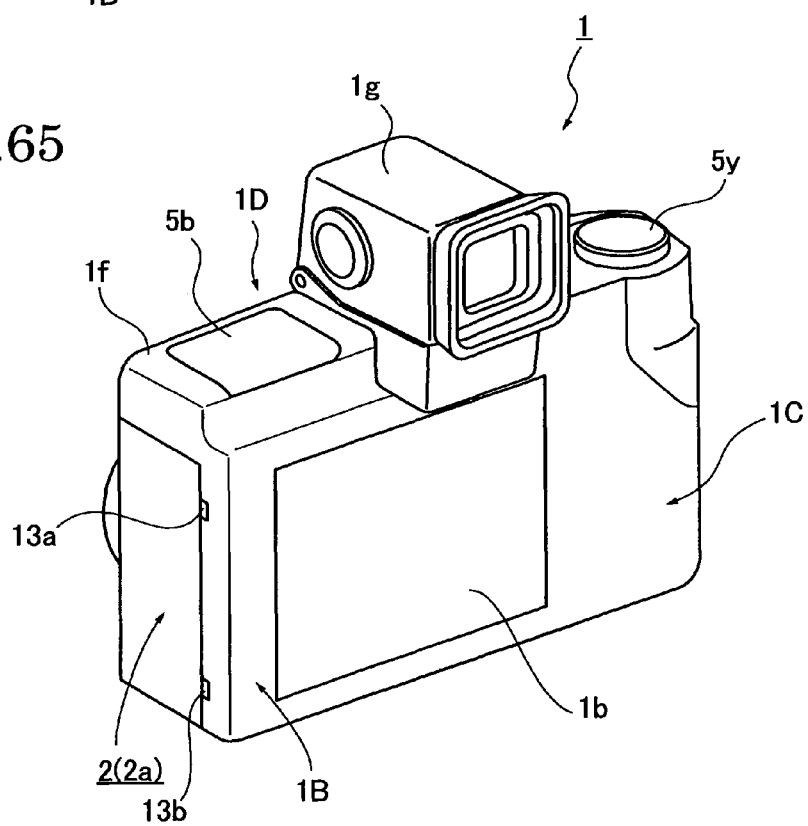
FIG. 65 is an external appearance view illustrating a state when the camera body is viewed from the back side and the electrical view finder is mounted on the camera body.
Figure 66:
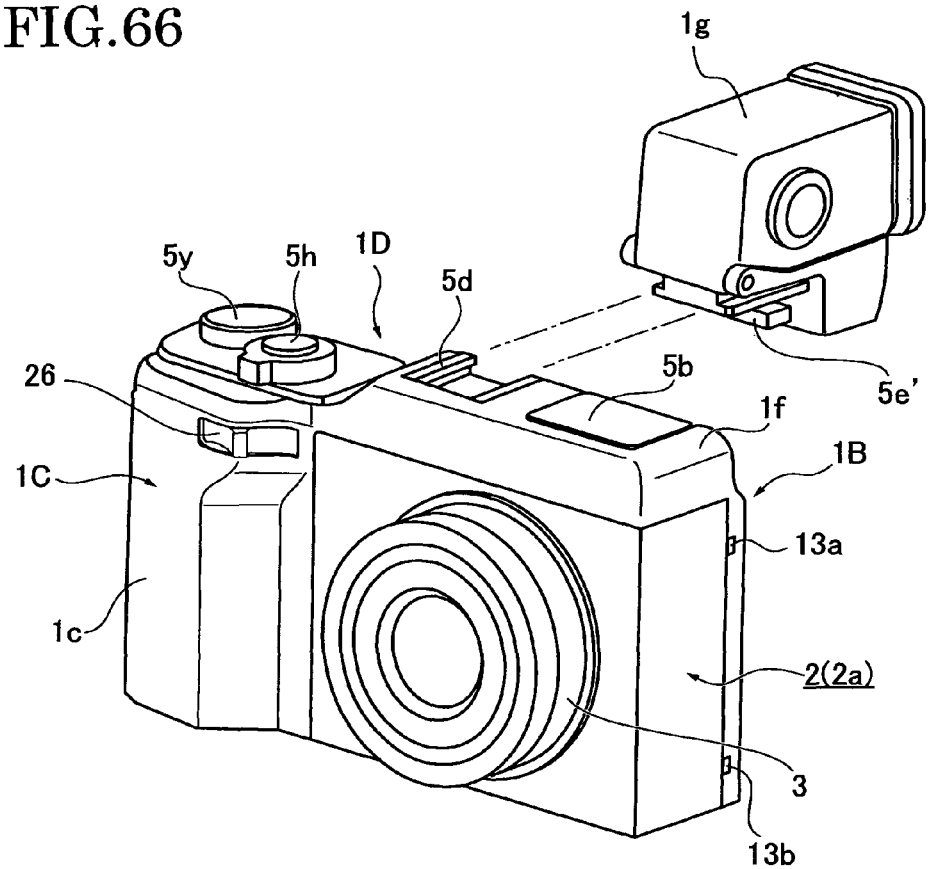
FIG. 66 is an external appearance view illustrating a state when the camera body is viewed from the front side and prior to mounting the electrical view finder on the camera body.

As explained above although the preferred Example of the present invention has been described, the present invention is not limited thereto, for example, as shown in FIGS. 64 to 67, the arrangement in which a hot shoe portion 5d on which a strobe device and an electrical view finder 1g are mountable, a connector terminal for electrical view finder 5e, a pop-up type strobe emitting portion 5b, and a mode dial switch 5h may be provided. Meanwhile, the electrical view finder connector terminal 5e shown in FIG. 64 is composed of a female type connector. A connector terminal for electrical view finder 5e' as a male type connector shown in FIG. 66 is fitted into the electrical view finder connector terminal 5e.

Figure 67:
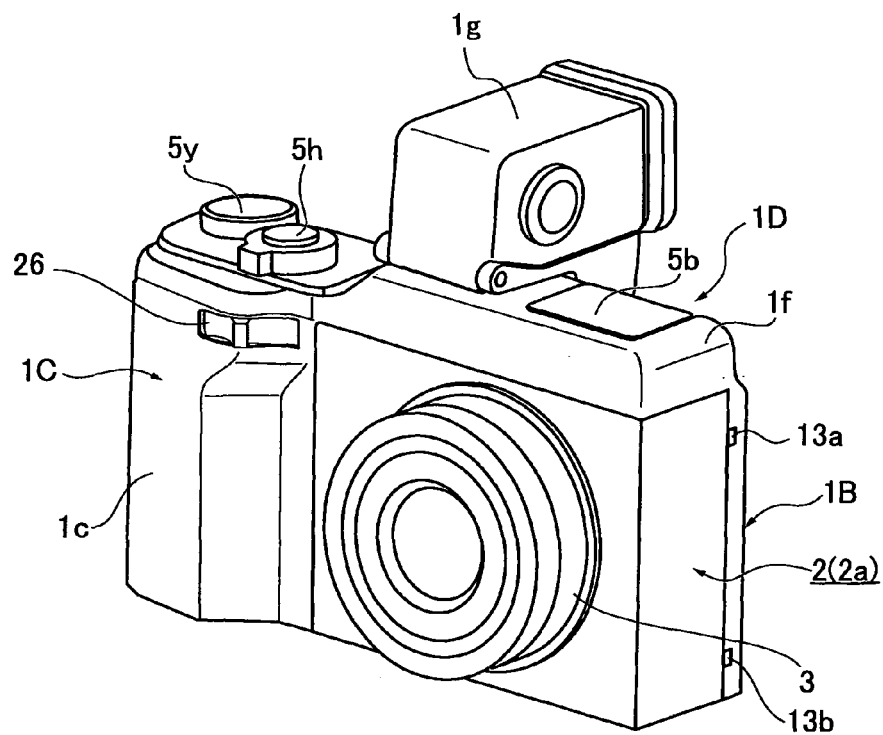
FIG. 67 is an external appearance view illustrating a state when the camera body is viewed from the back side and the electrical view finder is mounted on the camera body.

Meanwhile, in FIGS. 64 to 67, FIG. 64 shows a state in which the camera body 1 is viewed from the back side and prior to mounting the electrical view finder on the camera body 1, FIG. 65 shows a state in which the camera body 1 is viewed from the back side and the electrical view finder is mounted on the camera body 1, FIG. 66 shows a state in which the camera body 1 is viewed from the front side and prior to mounting the electrical view finder on the camera body 1, and FIG. 67 shows a state in which the camera body 1 is viewed from the front side and the electrical view finder is mounted on the camera body 1.

As mentioned above, although each of the Examples and their Variants have been described, the apparatus according to the present invention can be formed by appropriately combining the constituent features of each of the Examples.

Meanwhile, although the above mentioned each of the Examples is provided only at both connector portions with the dust-proof and waterproof (drip-proof) structures, it is possible to enhance the advantageous merits of dust-proof and waterproof (drip-proof) in a state (the imaging apparatus) that the imaging unit is mounted on the camera body (the concave portion).

Further, according to the above mentioned each of the Examples, although the fitting groove portions are formed in the camera body by using the connector cover member, the connector may be disposed in the camera body side so as to enable the connection with the connector portion of the imaging unit mounted on the concave portion (the connector main body (in the unit side)) (so as to communicate with the concave portion) and thus the present invention is not limited to the above mentioned each of the Examples.

Further, in the Fifth and Sixth Examples, it is configured in such a manner that the sealing is made by press contacting the side wall portion of the camera body against the sealing member. In the Seventh Example, although it is configured in such a manner that the sealing is made by press contacting the left side face of the case in the imaging unit against the sealing member, the press contact portion or portions may be provided with a rib or ribs as in the Second or Fourth Examples (the press contact portion or portions which surround(s) the periphery of the opening portion of the fitting groove portion 52I of the connector portion 12M or the annular portion or portions around the periphery of the connector cover portion). In this case, it is possible to obtain the similar advantageous effects to those in the Second and Fourth Examples.

According to a camera body of one aspect of the present invention, it is possible to provide a camera which is not likely to cause miss operation and facilitate the mount/removal of the imaging unit.

According to a camera body of another aspect of the present invention, it is possible to seal between the connector portion and the connector portion of the imaging unit in the fitting groove, since the sealing member provided in the fitting groove is compressed when the imaging unit is mounted on the concave portion. For this reason, it is possible to enhance the durability of the camera body, in particular, the body side connector portion (the unit side connector portion connected thereto) and electrical components and portions which communicate therewith.

According to an imaging unit of another aspect of the present invention, it is possible to seal between the connector portion and the connector portion of the imaging unit in the fitting groove by pressing the leading end of the unit side cover portion contact with the sealing member provided in the fitting groove when the imaging unit is mounted on the concave portion. For this reason, it is possible to enhance the durability of the camera body, in particular, the body side connector portion (the unit side connector portion connected thereto) and electrical components and portions which communicate therewith.

According to an imaging apparatus of another aspect of the present invention, when the camera body 1 is viewed from a front face, since the unlocking operation member is provided at a similar position and level in compared with that of a mounting/removing button at an exchanging barrel unit of a single-lens reflex camera, if user accustomed to the conventional exchanging lens type single-lens reflex camera uses the camera, it is possible to reduce the risk of miss operation. Accordingly, it is possible to provide an imaging apparatus in which the risk due to the miss operation is reduced and the imaging apparatus is easily attached/detached to/from the camera body.

According to an imaging apparatus of another aspect of the present invention, when the imaging unit is mounted on the camera body (the concave portion) and thus the body side connector portion and the unit side connector portion are electrically connected, since the leading end of the unit side connector cover portion is compressed, it is possible to surely obtain the advantageous merits of the dust-proof and waterproof (drip-proof) only by mounting the imaging unit on the camera body. For this reason, it is possible to enhance the durability of the imaging unit and the camera body, in particular, the unit side connector portion and the body side connector portion connected thereto and electrical components and portions which communicate therewith.

According to an imaging apparatus of another aspect of the present invention, when the imaging unit is mounted on the camera body (the concave portion) and thus the body side connector portion and the unit side connector portion are electrically connected, since, in the side wall portion, the periphery around the opening portion of the main body installing portion is brought into press contact with the sealing member, it is possible to surely obtain the advantageous merits of the dust-proof and waterproof (drip-proof) only by mounting the imaging unit on the camera body. For this reason, it is possible to enhance the durability of the imaging unit and the camera body, in particular, the unit side connector portion and the body side connector portion connected thereto and electrical components and portions which communicate therewith.

According to an imaging apparatus of another aspect of the present invention, when the camera body (the concave portion) and the imaging unit are mounted with each other, since the waterproof member which is disposed between faces opposed with each other is compressed, it is possible to surely obtain the advantageous merits of the dust-proof and waterproof (drip-proof) only by mounting the imaging unit on the camera body.

In the aforementioned Examples, the concave portion or the housing part has a rectangular shape in which a front wall, one of opposite side walls, and a back wall are opened, and consequently, the concave portion or the housing part is formed by one side wall, an upper wall and a back wall. The concave portion or the housing part is not limited to such a configuration. For example, the concave portion or the housing part may be formed to have at least a back wall, and a rock mechanism may be provided on the back wall. Furthermore, the concave portion or the housing part is not limited to the rectangular shape, and may be formed to have a circular outer circumferential portion. In this case, the circular outer circumferential portion is configured to have openings formed from one side and down directions, and the openings are communicated adequately, thereby a body portion having a concave portion or a housing part in which an imaging unit is contained can be provided.

Although the preferred some examples of the present invention have been described, it should be understood that the present invention is not limited to these some examples, various modifications and changes can be made to the examples without departing from the scope and spirit of the invention.

The invention claimed is:
1. A camera body comprising:
a concave portion on/from which an imaging unit is attachably and detachably mounted/removed, the imaging unit being provided in a rectangular case with an optical system, an imaging device and a unit side connector portion, and
a body side connector portion which is connectable to the unit side connector portion, the camera body being integrated with the imaging unit and used as an imaging apparatus for photographing the subject,
wherein the concave portion includes three wall portions of a back wall portion which a back face of the case faces, a side wall portion which a left side face of the case faces, and an upper wall portion which an upper face of the case faces, when the imaging unit is mounted on the concave portion when viewed from the subject side in a direction of an optical axis of the optical system,
wherein the camera body includes a locking member for locking the imaging unit in cooperation with a locking member to be locked formed in the imaging unit,
wherein an unlocking operation member for unlocking a lock of the camera body and the imaging unit by the locking member is disposed in an intersection portion of the side wall portion and the upper wall portion, and
wherein at least three wall portions of the concave portion are opened.

2. The camera body as claimed in claim 1, further includes a grip portion which is connected to the side wall portion and is grasped by a user, wherein the grip portion includes a grip protruding portion which expands in a direction toward the subject along the optical axis of the optical system, and wherein the unlocking operation member is positioned above the grip portion if a side of the unlocking operation member in which the upper wall portion exists is defined as an upper side.

3. The camera body as claimed in claim 2, wherein the grip portion is formed with a grip concave portion which is adjacent to the grip protruding portion, and the grip concave portion is positioned in a side lower than that of the unlocking operation member if a side in which the upper wall portion exists is defined as an upper side.

4. The camera body as claimed in claim 2, wherein the locking member is moved by moving the imaging unit toward the side wall portion, to thereby engage the locking member and the member to be locked.

5. The camera body as claimed in claim 4, wherein the locking member is unlocked by operating the unlocking operation member toward a right direction in a state that the imaging unit is mounted on the concave portion and when the imaging unit is viewed from a front side.

6. The camera body as claimed in claim 4, wherein the locking member is locked by operating the unlocking operation member toward a left direction in a state that the imaging unit is mounted on the concave portion and when the imaging unit is viewed from a front side.

7. The camera body as claimed in claim 2, wherein the body side connector portion includes a body side connector main body which is electrically connectable to the unit side connector portion due to the imaging unit being approached in order to mount the imaging unit, a portion for installing the main body in which the body side connector main body is positioned and is formed inwardly of the side wall portion so as to form an annular fitting groove which surrounds a periphery of the body side connector main body when viewed from the concave portion, and a sealing member within the main body installing portion and provided around the periphery of the body side connector main body.

8. The camera body as claimed in claim 1, wherein a leading end of the unit side connector cover portion is brought into press contact with the sealing member when the imaging unit is mounted on the concave portion and thus the body side connector main body and the unit side connector main body are electrically connected.

9. The camera body as claimed in claim 1, wherein a waterproof member is disposed at any of locations in which the imaging unit is opposed to the camera body when the imaging unit approaches the camera body, and wherein the waterproof member is compressed by the camera body and the imaging unit when the imaging unit is mounted on the camera body.

10. An imaging apparatus comprising:
an imaging unit in which an optical system and an imaging device are provided, and wherein the imaging unit includes a rectangular case, and wherein the rectangular case includes a back face, a left side face, an upper face, a front face, a right side face, and a lower face, the back and front faces being parallel to each other and on opposite sides of the rectangular case, the left side and right side faces being parallel to each other and on opposite sides of the rectangular case, and the upper and lower faces being parallel to each other and on opposite sides of the rectangular case, and
a camera body formed with a concave portion, the imaging unit being attached to the camera body and mounted within the concave portion of the camera body, and the imaging unit being detachable from the camera body and being removable from the concave portion, and
wherein the imaging apparatus is configured to photograph a subject image,
wherein the concave portion includes a back wall portion which the back face of the case faces, a side wall portion which the left side face of the case faces, and an upper wall portion which the upper face of the case faces, viewed from the subject side in a direction of an optical axis of the optical system,
wherein the camera body and imaging unit each include a locking member, the locking members being configured to cooperate with each other to lock the imaging unit to the camera body, and wherein the locking members are disposed in an intersection portion of the side wall portion and the upper wall portion,
wherein the camera body includes an unlocking member for unlocking the imaging unit from the camera body, and wherein the unlocking member is disposed in an intersection portion of the side wall portion and the upper wall portion, and
wherein at least three wall portions of the concave portion are opened, such that the concave portion is open in directions facing outwardly from the front face, right side face, and lower face of the rectangular case of the imaging unit.

11. The imaging apparatus as claimed in claim 10, wherein the camera body is provided at the side wall portion with a body side connector portion and a left side face of the case is provided with a unit side connector portion which is electrically connected to the body side connector to perform the electrical communication, and wherein the body side connector portion and the unit side connector portion are connected by moving the imaging unit to a direction toward which the imaging unit approaches the side wall portion.

12. The imaging apparatus as claimed in claim 11, wherein either the imaging unit or the camera body includes an engagement groove which extends in a direction toward which the imaging unit approaches the side wall portion and an engagement urging member, and either the imaging unit or the camera body includes an engagement fixing member which is inserted into the engagement groove, and wherein the engagement urging member urges the engagement fixing member toward the optical axis of the optical system when the imaging unit approaches the side wall portion in a state that the engagement fixing member is inserted into the engagement groove.

13. The imaging apparatus as claimed in claim 10, wherein a plurality of the fixing members and the engagement groove are formed, respectively, at least two engagement fixing grooves among the engagement fixing grooves are formed in a spaced manner toward a direction perpendicular to a direction toward which the imaging unit approaches the side wall portion.

14. An imaging apparatus comprising an imaging unit in which an optical system and an imaging device are provided, a camera body formed with a concave portion on/from which the imaging unit is attachably and detachably mounted/removed, the imaging apparatus photographing the subject image by mounting the imaging unit on the camera body,
wherein the concave portion includes three walls of a back wall portion which a back face of the case faces, a side wall portion which a left side face of the case faces, and an upper wall portion which an upper face of the case faces, when the imaging unit is mounted on the concave portion viewed from the subject side in a direction of an optical axis of the optical system,
wherein the apparatus includes a locking member for locking the imaging unit in cooperation with a locking member to be locked formed in the imaging unit,
wherein an unlocking member for unlocking a lock of the camera body and the imaging unit by means of the locking member is disposed in an intersection portion of the side wall portion and the upper wall portion,
wherein at least three wall portions which compose the concave portion, are opened, and
wherein a back face of the case are formed with a pair of engagement claws which are spaced in an upward and downward direction and faces with each other, and a pair of sliding contact ribs which are spaced in the upward and downward direction and faces with each other, as well as extends in a left and right direction, and wherein the case is formed at a back face with a recess in the back face side, a sheet metal unit made of a sheet metal member and a resin plate is provided in the back face side recess, the sheet metal member is formed with the pair of engagement claws, and the resin plate is formed with the pair of sliding contact ribs and a contact face portion which contacts the sheet metal member of the camera body.

15. The imaging apparatus as claimed in claim 14, wherein the resin plate is formed with a pair of semi-circular small protrusions which prevent the resin plate from being curved due to the dimensional tolerance in a direction opposed to the face with which the pair of sliding contact ribs are formed.

* * * * *